United States Patent
Mark et al.

(10) Patent No.: US 12,521,935 B2
(45) Date of Patent: Jan. 13, 2026

(54) METHOD FOR MINIMIZING STRESS-RELATED DEFORMATIONS IN 3D PRINTED AND SINTERED PARTS

(71) Applicant: MARKFORGED, INC., Watertown, MA (US)

(72) Inventors: Gregory Thomas Mark, Brookline, MA (US); Rick Bryan Woodruff, Somerville, MA (US)

(73) Assignee: MARKFORGED, INC, Waltham, MA (US)

( * ) Notice: Subject to any disclaimer, the term of this patent is extended or adjusted under 35 U.S.C. 154(b) by 670 days.

(21) Appl. No.: 16/674,246

(22) Filed: Nov. 5, 2019

(65) Prior Publication Data

US 2020/0114422 A1 Apr. 16, 2020

Related U.S. Application Data

(63) Continuation-in-part of application No. 15/976,009, filed on May 10, 2018, now Pat. No. 10,464,131, (Continued)

(51) Int. Cl.
*B29C 64/118* (2017.01)
*B22F 1/10* (2022.01)
(Continued)

(52) U.S. Cl.
CPC .............. *B29C 64/118* (2017.08); *B22F 1/10* (2022.01); *B22F 1/142* (2022.01); *B22F 3/1025* (2013.01);
(Continued)

(58) Field of Classification Search
CPC ...... B22F 10/10; B22F 1/0059; B22F 1/0085; B22F 3/1025; B22F 10/40; B22F 2998/10;
(Continued)

(56) References Cited

U.S. PATENT DOCUMENTS 2,844,489 A 7/1958 Gemmer
3,186,957 A 6/1965 Stiles
(Continued)

FOREIGN PATENT DOCUMENTS

CN 101422963 A 5/2009
CN 101642809 2/2010
(Continued)

OTHER PUBLICATIONS

RU-2288073, machine translation. (Year: 2006).*
(Continued)

*Primary Examiner* — John A Hevey
(74) *Attorney, Agent, or Firm* — PEARL COHEN ZEDEK LATZER BARATZ LLP

(57) ABSTRACT

A method for printing three-dimensional parts includes building a three-dimensional part by printing counter-wound slices. By winding adjacent slices in alternating directions, offsetting stored torques can be produced for each printed slice. The stored torques then neutralize one another during the debinding and sintering process, reducing part twists and deformations.

10 Claims, 53 Drawing Sheets

Related U.S. Application Data which is a continuation of application No. 15/831,995, filed on Dec. 5, 2017, now Pat. No. 10,828,698, and a continuation of application No. 15/829,486, filed on Dec. 1, 2017, now abandoned, and a continuation of application No. 15/829,472, filed on Dec. 1, 2017, now abandoned, and a continuation of application No. 15/829,500, filed on Dec. 1, 2017, now abandoned.

(60) Provisional application No. 62/863,176, filed on Jun. 18, 2019, provisional application No. 62/575,219, filed on Oct. 20, 2017, provisional application No. 62/545,966, filed on Aug. 15, 2017, provisional application No. 62/519,138, filed on Jun. 13, 2017, provisional application No. 62/505,081, filed on May 11, 2017, provisional application No. 62/489,410, filed on Apr. 24, 2017, provisional application No. 62/480,331, filed on Mar. 31, 2017, provisional application No. 62/442,395, filed on Jan. 4, 2017, provisional application No. 62/430,902, filed on Dec. 6, 2016, provisional application No. 62/429,711, filed on Dec. 2, 2016.

(51) Int. Cl.
| | | |
|---|---|---|
| *B22F 1/142* | (2022.01) | |
| *B22F 3/10* | (2006.01) | |
| *B22F 10/18* | (2021.01) | |
| *B22F 10/38* | (2021.01) | |
| *B33Y 10/00* | (2015.01) | |
| *B33Y 70/00* | (2020.01) | |
| *B22F 10/12* | (2021.01) | |
| *B22F 10/14* | (2021.01) | |
| *B22F 10/80* | (2021.01) | |
| *B22F 12/10* | (2021.01) | |
| *B22F 12/20* | (2021.01) | |
| *B22F 12/53* | (2021.01) | |

(52) U.S. Cl.
CPC .............. *B22F 10/18* (2021.01); *B33Y 10/00* (2014.12); *B33Y 70/00* (2014.12); *B22F 10/12* (2021.01); *B22F 10/14* (2021.01); *B22F 10/385* (2021.01); *B22F 10/80* (2021.01); *B22F 12/10* (2021.01); *B22F 12/20* (2021.01); *B22F 12/53* (2021.01)

(58) Field of Classification Search
CPC ....... B22F 3/1021; B33Y 10/00; B33Y 70/00; B33Y 70/10; Y02P 10/25; B29C 64/40; B29C 64/118
See application file for complete search history.

(56) References Cited

U.S. PATENT DOCUMENTS

| | | | |
|---|---|---|---|
| 3,837,825 A | 9/1974 | Loxley et al. | |
| 4,225,344 A | 9/1980 | Fujimori et al. | |
| 4,550,412 A | 10/1985 | Holcombe et al. | |
| 4,569,862 A | 2/1986 | Arai et al. | |
| 4,914,255 A | 4/1990 | Avidan et al. | |
| 4,963,709 A | 10/1990 | Kimrey, Jr. | |
| 5,011,638 A | 4/1991 | Pinkhasov | |
| 5,073,526 A | 12/1991 | Enloe et al. | |
| 5,160,765 A | 11/1992 | Rotman et al. | |
| 5,182,056 A | 1/1993 | Spence et al. | |
| 5,182,170 A | 1/1993 | Marcus et al. | |
| 5,198,159 A | 3/1993 | Nakamura et al. | |
| 5,198,489 A | 3/1993 | Sterzel et al. | |
| 5,204,055 A | 4/1993 | Sachs et al. | |
| 5,216,616 A | 6/1993 | Masters | |
| 5,242,098 A | 9/1993 | Hardwick | |
| 5,257,657 A | 11/1993 | Gore | |
| 5,286,573 A | 2/1994 | Prinz et al. | |
| 5,288,443 A | 2/1994 | Lee | |
| 5,337,961 A | 8/1994 | Brambani et al. | |
| 5,366,679 A | 11/1994 | Streicher | |
| 5,387,380 A | 2/1995 | Cima et al. | |
| 5,496,682 A | 3/1996 | Quadir et al. | |
| 5,503,785 A | 4/1996 | Crump et al. | |
| 5,531,958 A | 7/1996 | Krueger | |
| 5,555,481 A | 9/1996 | Rock et al. | |
| 5,598,200 A | 1/1997 | Gore | |
| 5,617,911 A | 4/1997 | Sterett et al. | |
| 5,669,433 A | 9/1997 | Sterett et al. | |
| 5,697,043 A | 12/1997 | Baskaran et al. | |
| 5,738,817 A * | 4/1998 | Danforth ............... | B22F 1/0059 264/603 |
| 5,745,834 A | 4/1998 | Bampton et al. | |
| 5,774,779 A | 6/1998 | Tuchinskiy | |
| 5,796,207 A | 8/1998 | Safari et al. | |
| 5,798,469 A | 8/1998 | Nufer | |
| 5,818,149 A | 10/1998 | Safari et al. | |
| 5,848,350 A | 12/1998 | Bulger | |
| 5,900,207 A | 5/1999 | Danforth et al. | |
| 5,906,863 A | 5/1999 | Lombardi et al. | |
| 5,997,795 A | 12/1999 | Danforth et al. | |
| 6,004,500 A | 12/1999 | Safari et al. | |
| 6,008,281 A | 12/1999 | Yang et al. | |
| 6,049,160 A | 4/2000 | Safari et al. | |
| 6,082,297 A | 7/2000 | Pollock et al. | |
| 6,193,922 B1 | 2/2001 | Ederer | |
| 6,202,734 B1 | 3/2001 | Sackinger et al. | |
| 6,344,426 B1 | 2/2002 | Hata et al. | |
| 6,352,669 B1 | 3/2002 | Cooper et al. | |
| 6,375,874 B1 | 4/2002 | Russell et al. | |
| 6,397,922 B1 | 6/2002 | Sachs et al. | |
| 6,447,712 B1 | 9/2002 | Dogan et al. | |
| 6,558,606 B1 | 5/2003 | Kulkarni et al. | |
| 6,589,471 B1 | 7/2003 | Khoshnevis | |
| 6,682,684 B1 | 1/2004 | Jamalabad et al. | |
| 6,803,003 B2 | 10/2004 | Rigali et al. | |
| 6,830,643 B1 | 12/2004 | Hayes | |
| 6,884,486 B2 | 4/2005 | Estrin et al. | |
| 7,108,827 B1 | 9/2006 | Hata et al. | |
| 7,144,548 B2 | 12/2006 | Billiet et al. | |
| 7,364,686 B2 | 4/2008 | Kritchman et al. | |
| 7,378,052 B2 | 5/2008 | Harryson | |
| 7,628,857 B2 | 12/2009 | Kritchman et al. | |
| 7,942,987 B2 | 5/2011 | Crump et al. | |
| 8,047,251 B2 | 11/2011 | Khoshnevis | |
| 8,158,255 B2 | 4/2012 | Yokoyama et al. | |
| 8,245,757 B2 | 8/2012 | Crump et al. | |
| 8,523,331 B2 | 9/2013 | Houben | |
| 8,586,493 B2 | 11/2013 | Kaga et al. | |
| 8,721,032 B2 | 5/2014 | Kuznetsov et al. | |
| 8,871,355 B1 | 10/2014 | Mears et al. | |
| 9,027,378 B2 | 5/2015 | Crump et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,327,448 B2 | 5/2016 | Shah et al. | |
| 9,370,896 B2 | 6/2016 | Mark | |
| 9,399,323 B1 | 7/2016 | Lu et al. | |
| 9,403,725 B2 | 8/2016 | Khoshnevis | |
| 9,545,669 B2 | 1/2017 | Åklint et al. | |
| 9,643,281 B1 | 5/2017 | Memmen et al. | |
| 9,744,722 B2 * | 8/2017 | Rodgers ............... | B29C 64/336 |
| 9,815,118 B1 | 11/2017 | Schmitt et al. | |
| 9,833,839 B2 | 12/2017 | Gibson et al. | |
| 10,183,442 B1 | 1/2019 | Miller | |
| 11,173,550 B2 | 11/2021 | Mark | |
| 2001/0050448 A1 | 12/2001 | Kubo et al. | |
| 2002/0015654 A1 | 2/2002 | Das et al. | |
| 2002/0108949 A1 | 8/2002 | Gedevanishvili et al. | |
| 2002/0165304 A1 | 11/2002 | Mulligan et al. | |
| 2002/0171177 A1 | 11/2002 | Kritchman et al. | |
| 2003/0180636 A1 | 9/2003 | Kanga et al. | |
| 2003/0185698 A1 | 10/2003 | Wang et al. | |

(56) References Cited

U.S. PATENT DOCUMENTS

| | | |
|---|---|---|
| 2003/0205573 A1 | 11/2003 | Okumura et al. |
| 2004/0182202 A1 | 9/2004 | Geving et al. |
| 2004/0183055 A1 | 9/2004 | Chartier et al. |
| 2004/0187714 A1 | 9/2004 | Napadensky et al. |
| 2004/0207124 A1 | 10/2004 | Kritchman et al. |
| 2004/0239009 A1 | 12/2004 | Collins et al. |
| 2005/0058837 A1 | 3/2005 | Farnworth et al. |
| 2005/0123433 A1 | 6/2005 | Li et al. |
| 2005/0242473 A1 | 11/2005 | Newell et al. |
| 2005/0249627 A1 | 11/2005 | Wang et al. |
| 2006/0251536 A1 | 11/2006 | Kelly |
| 2007/0003426 A1 | 1/2007 | Lu et al. |
| 2008/0039312 A1 | 2/2008 | Natsuhara et al. |
| 2008/0179433 A1 | 7/2008 | Pfeffer et al. |
| 2008/0206561 A1 | 8/2008 | Yokoyama et al. |
| 2008/0211124 A1 | 9/2008 | Zagagi et al. |
| 2008/0248277 A1 | 10/2008 | Yokoyama et al. |
| 2008/0277841 A1 | 11/2008 | Natsuhara et al. |
| 2009/0039570 A1 | 2/2009 | Clark |
| 2009/0148813 A1 | 6/2009 | Sun et al. |
| 2009/0314391 A1 | 12/2009 | Crump et al. |
| 2010/0028645 A1 | 2/2010 | Maguire et al. |
| 2010/0034983 A1 | 2/2010 | Fuwa et al. |
| 2010/0193998 A1 | 8/2010 | Crump et al. |
| 2010/0294571 A1 | 11/2010 | Belnap et al. |
| 2011/0070394 A1* | 3/2011 | Hopkins ............... B29C 48/21 428/80 |
| 2011/0176277 A1 | 7/2011 | Kaga et al. |
| 2011/0176952 A1 | 7/2011 | Kruzhanov et al. |
| 2012/0018926 A1 | 1/2012 | Mannella et al. |
| 2012/0087823 A1 | 4/2012 | Joshi et al. |
| 2013/0011603 A1 | 1/2013 | Yasukochi |
| 2013/0075957 A1 | 3/2013 | Swanson et al. |
| 2013/0112366 A1 | 5/2013 | Mottin et al. |
| 2014/0251481 A1 | 9/2014 | Kroll et al. |
| 2014/0265032 A1 | 9/2014 | Teicher et al. |
| 2014/0271961 A1 | 9/2014 | Khoshnevis |
| 2014/0291886 A1 | 10/2014 | Mark et al. |
| 2014/0300017 A1 | 10/2014 | Wighton et al. |
| 2014/0371895 A1 | 12/2014 | Sadusk et al. |
| 2015/0035209 A1 | 2/2015 | Shah et al. |
| 2015/0056317 A1 | 2/2015 | Chen |
| 2015/0066178 A1 | 3/2015 | Stava |
| 2015/0080495 A1 | 3/2015 | Heikkila |
| 2015/0084222 A1 | 3/2015 | Heston et al. |
| 2015/0093465 A1 | 4/2015 | Page |
| 2015/0125334 A1 | 5/2015 | Uetani et al. |
| 2015/0145168 A1 | 5/2015 | Rodgers et al. |
| 2015/0145169 A1 | 5/2015 | Liu et al. |
| 2015/0165687 A1 | 6/2015 | Ho et al. |
| 2015/0165691 A1 | 6/2015 | Mark et al. |
| 2015/0183167 A1 | 7/2015 | Molinari et al. |
| 2015/0197862 A1 | 7/2015 | Engel et al. |
| 2015/0202825 A1 | 7/2015 | Cordingley |
| 2015/0239179 A1 | 8/2015 | Goto et al. |
| 2015/0266092 A1 | 9/2015 | Andersson et al. |
| 2015/0273577 A1 | 10/2015 | Vader et al. |
| 2015/0273582 A1 | 10/2015 | Crump et al. |
| 2015/0283298 A1 | 10/2015 | Kaplan et al. |
| 2015/0306664 A1 | 10/2015 | Klint et al. |
| 2015/0336219 A1 | 11/2015 | Bruck et al. |
| 2016/0009027 A1 | 1/2016 | Martin |
| 2016/0022383 A1 | 1/2016 | Abels et al. |
| 2016/0023373 A1 | 1/2016 | Demuth et al. |
| 2016/0024293 A1 | 1/2016 | Nestle et al. |
| 2016/0039006 A1 | 2/2016 | Amstutz et al. |
| 2016/0052166 A1 | 2/2016 | Hartmann |
| 2016/0061381 A1 | 3/2016 | Kotliar |
| 2016/0075084 A1 | 3/2016 | Sakura |
| 2016/0089720 A1 | 3/2016 | Kamakura et al. |
| 2016/0096327 A1 | 4/2016 | Fry et al. |
| 2016/0108483 A1 | 4/2016 | Meyer et al. |
| 2016/0229128 A1 | 8/2016 | Dayagi et al. |
| 2016/0236293 A1 | 8/2016 | Chang et al. |
| 2016/0238324 A1 | 8/2016 | Butcher et al. |
| 2016/0243619 A1 | 8/2016 | Gothait et al. |
| 2016/0245710 A1 | 8/2016 | Twelves, Jr. et al. |
| 2016/0256925 A1 | 9/2016 | Heikkila |
| 2016/0271696 A1 | 9/2016 | Kamakura |
| 2016/0311165 A1 | 10/2016 | Mark et al. |
| 2016/0311167 A1 | 10/2016 | Gunther et al. |
| 2016/0332236 A1 | 11/2016 | Stoyanov |
| 2017/0021452 A1 | 1/2017 | Tanaka et al. |
| 2017/0028475 A1 | 2/2017 | Heikkila |
| 2017/0028651 A1 | 2/2017 | Versluys et al. |
| 2017/0113413 A1 | 4/2017 | Iwase et al. |
| 2017/0129012 A1 | 5/2017 | Ishida et al. |
| 2017/0129173 A1 | 5/2017 | Mantell et al. |
| 2017/0173692 A1 | 6/2017 | Myerberg et al. |
| 2017/0173868 A1 | 6/2017 | Mark |
| 2017/0196666 A1 | 7/2017 | Bohm et al. |
| 2017/0232674 A1 | 8/2017 | Mark |
| 2017/0252973 A1 | 9/2017 | Clark et al. |
| 2017/0297097 A1 | 10/2017 | Gibson et al. |
| 2017/0297100 A1 | 10/2017 | Gibson et al. |
| 2017/0297102 A1 | 10/2017 | Chin et al. |
| 2017/0297111 A1 | 10/2017 | Myerberg et al. |
| 2017/0312822 A1 | 11/2017 | Kimblad |
| 2017/0326789 A1 | 11/2017 | Kimblad et al. |
| 2017/0334137 A1* | 11/2017 | Nystrom ............... B29C 64/118 |
| 2017/0334140 A1 | 11/2017 | Andersson et al. |
| 2017/0355138 A1 | 12/2017 | Mark |
| 2018/0000138 A1 | 1/2018 | Kelleher et al. |
| 2018/0001381 A1 | 1/2018 | Kimblad et al. |
| 2018/0071819 A1 | 3/2018 | Connor et al. |
| 2018/0134029 A1 | 5/2018 | Myerberg et al. |
| 2018/0154437 A1 | 6/2018 | Mark |
| 2018/0154439 A1 | 6/2018 | Mark |
| 2018/0154574 A1 | 6/2018 | Mark |
| 2018/0154580 A1 | 6/2018 | Mark |

FOREIGN PATENT DOCUMENTS

| | | |
|---|---|---|
| CN | 101642809 A | 2/2010 |
| CN | 203876241 | 10/2014 |
| CN | 203876241 U | 10/2014 |
| CN | 104416903 A | 3/2015 |
| CN | 104582939 A | 4/2015 |
| CN | 204772942 | 11/2015 |
| CN | 204772942 U | 11/2015 |
| CN | 105108154 A | 12/2015 |
| CN | 105408091 A | 3/2016 |
| CN | 105705319 | 6/2016 |
| CN | 105705319 A | 6/2016 |
| DE | 19538257 A1 | 4/1996 |
| DE | 10311446 A1 | 4/2004 |
| DE | 102007033715 A1 | 1/2009 |
| EP | 0479219 A1 | 4/1992 |
| EP | 0764487 | 3/1997 |
| EP | 0764487 A1 | 3/1997 |
| EP | 1400340 A1 | 3/2004 |
| EP | 1486318 A2 | 12/2004 |
| EP | 2359964 A1 | 8/2011 |
| EP | 2857179 A1 | 4/2015 |
| EP | 3067186 A1 | 9/2016 |
| EP | 3117982 A1 | 1/2017 |
| GB | 2302836 | 2/1997 |
| GB | 2302836 A | 2/1997 |
| GB | 2532470 A | 5/2016 |
| JP | 2003212561 | 7/2003 |
| JP | 2003212561 A | 7/2003 |
| JP | 2009236375 A | 10/2009 |
| JP | 2015131479 A | 7/2015 |
| JP | 2016065284 A | 4/2016 |
| JP | 7146757 B2 | 10/2022 |
| KR | 20140069021 A | 6/2014 |
| KR | 101762667 B1 | 7/2017 |
| RU | 2288073 C2 * | 11/2006 ............. B22F 3/008 |
| WO | 2004009281 A1 | 1/2004 |
| WO | 2004050323 | 6/2004 |
| WO | 2004050323 A1 | 6/2004 |
| WO | 2009032228 A2 | 3/2009 |
| WO | 2009039159 A2 | 3/2009 |
| WO | 2013010108 | 1/2013 |

(56) References Cited

FOREIGN PATENT DOCUMENTS

| | | | |
|---|---|---|---|
| WO | 2013010108 A1 | 1/2013 |
| WO | 2014152798 A1 | 9/2014 |
| WO | 2014204570 A2 | 12/2014 |
| WO | 2015007966 A1 | 1/2015 |
| WO | 2015056230 A1 | 4/2015 |
| WO | 2015177348 A1 | 11/2015 |
| WO | 2015185502 A1 | 12/2015 |
| WO | 2016003275 A1 | 1/2016 |
| WO | 2016004985 A1 | 1/2016 |
| WO | 2016079193 A1 | 5/2016 |
| WO | 2016079495 A1 | 5/2016 |
| WO | 2016081499 A1 | 5/2016 |
| WO | 2016109111 A1 | 7/2016 |
| WO | 2016113213 A1 | 7/2016 |
| WO | 2016118151 A1 | 7/2016 |
| WO | 20160124432 A1 | 8/2016 |
| WO | 2016139287 A1 | 9/2016 |
| WO | 2017059866 A2 | 4/2017 |
| WO | 2017152142 A1 | 9/2017 |
| WO | 2017180314 A1 | 10/2017 |
| WO | 2018017330 A1 | 1/2018 |
| WO | 2018102021 A1 | 6/2018 |
| WO | 2018189062 A1 | 10/2018 |

OTHER PUBLICATIONS

"3D printed PM filled filaments could replace MIM", Materials Today, Apr. 14, 2015, www.materialstoday.com/metal-procesing/news/3d-printed-pm-filled-filaments-could-replace-mim/.
"AMUG: XJet Presenting NanoParticle Jetting Metal 3D Printing Process to Large Crowd", 3DPrint.com, Apr. 6, 2016, https://3dprint.com/128448/amug-xjet-metal-3d-printer/.
"Caution Advised on 3D Printed Metal Proposal", The Molding Blog, Apr. 14, 2015, http://www.themoldingblog.com/2015/04/14/proceed-with-caution-on-3d-printed-metal-parts/.
"ColorFabb beta tests new PLA Bronze & BambooFill filament for 3D printers", 3ders.org, May 12, 2014, http://www.3ders.org/articles/20140512-colorfabb-beta-testing-new-pla-bronze-bamboofill-filament-for-3d-printers.html.
"ExOne:Digital Part Materialization/Industrial 3D Printing", YouTube, https://www.youtube.com/channel/UC2AGWEWI1iF0mCeggzUyqNA [retrieved from the Internet on Jun. 6, 2018].
"Filament lets you 3D print pure metal objects with your desktop 3D printer", 3ders.org, Jun. 30, 2016, http://www.3ders.org//articles/20160630-filamet-lets-you-3d-print-pure-metal-objects-with-your-desktop-3d-printer.html.
"How can I avoid YSZ green ceramic material from sticking to the crucible during sintering?", ResearchGate, https://www.researchgate.net/post/How_can_I_avoid_YSZ_green_ceramic_material_from_sticking_to_the_crucible_during_sintering [retrieved from the Internet on Jun. 1, 2018].
"Matterfab's 3D Metal Printer", YouTube, published on Jul. 18, 2014, https://www.youtube.com/watch?v=wRXymDoYoWQ.
"Metal Injection Molding Turns the Volume Up, and Down", Photo Labs, Inc., 2014 (4 pages).
"Modules of Furnace," Published on Apr. 6, 2015, https://www.youtube.com/watch?v=zWk48KhQEec.
"PM and MIM—Touching Your Life, Part 1", YouTube, published on Mar. 22, 2013, https://www.youtube.com/watch?v=0o_PiLJK0W0.
"PM and MIM—Touching Your Life, Part 2", YouTube, published on Mar. 22, 2013, https://www.youtube.com/watch?v=shA65PATHxs.
"Ricoh makes metal injection molding obsolete with new highly efficient metal 3D printer", 3ders.org, Jun. 24, 2016, http://www.3ders.org/articles/20160624-ricoh-makes-metal-injection-molding-obsolete-with-new-highly-efficient-metal-3d-printer.html.
"Ricoh's new method metal 3D printer, coating material particles with resin in advance", MONOist, 2016, http://monoist.atmarkit.co.jp/mn/articles/1606/24/news057.html#l_sp_160624dms_ricoh_02.jpg.
"Separator Powder Sheets", C12 Advanced Technologies, LLC, http://www.c12materials.com/separatorpowdersheets.html [retrieved from the Internet on Jun. 4, 2018].
"Setter-Plates / Kiln Furniture" Data Sheet, Kerafol, Jul. 20, 2017.
"Sinterhad Filaments—3D Printing Products for Today's Emerging Industrial Additive Manufacturing Markets," May 5, 2015, https://web.archive.org/web/20150505052938/http://sinterhardfilaments.com:80/.
"Sinterhard Filaments—Introduction," May 6, 2015, https://web.archive.org/web/201505060055339/http://sinterhardfilaments.com:80/?page_id=9.
"Sinterhard," Published on Apr. 6, 2015, https://www.youtube.com/watch?v=wHVP7vPqOGk&t+560s.
"Toll Debinding & Sintering Services," DSH Technologies, LLC, Oct. 31, 2015, web archived at: https://web.archive.org/web/20151031133248/http://www.dshtech.com:80/tolldebinding.htm.
"Two-material/two-color powder metal injection molding", Metal Injection Molding Handbook, A volume in Woodhead Publishing Series in Metals and Surface Engineering, 2012, Chapter 14, p. 343.
"XJet Demos Metal Jet 3D Printing Live at RAPID 2016", Engineering.com, May 24, 2016, https://www.engineering.com/3DPrinting/3DPrintingArticles/ArticleID/12207/XJet-Demos-Metal-Jet-3D-Printing-Live-at-RAPID-2016.aspx.
"Xjet to develop world's first direct 3D metal jetting system for custom metal manufacturing", 3ders.org, Nov. 10, 2015, http://www.3ders.org/articles/20151109-xjet-to-develop-worlds-first-direct-3d-metal-printing-jetting-system.html.
"XJet Website", XJet, Mar. 2016, https://webarchive.org/web/20160307151914/http://www.xjet3d.com/technology.
U.S. Appl. No. 62/322,760 Specification, filed Apr. 14, 2016 (Year: 2016).
U.S. Appl. No. 62/432,298 Specification, filed Dec. 9, 2016 (Year: 2016).
U.S. Appl. No. 62/473,372 Specification, filed Mar. 18, 2017 (Year: 2017).
Adames, J. M., "Characterization of Polymeric Binders for Metal Injection Molding (MIM) Process," A Dissertation Presented to the Graduate Faculty of the University of Akron, Dec. 2007, pp. 237.
Agarwala et al., "Fused Deposition of Ceramics and Metals: An Overview", Center for Ceramic Research, Rutgers University; AlliedSignal Research and Technology, 1996, pp. 385-389.
Agarwala, M. et al., "Structural quality of parts processed by fused deposition", Rapid Prototyping Journal, vol. 2, No. 4, 1996, pp. 4-19.
Agarwala, M.K., "Fused Deposition of Ceramics (FDC) for Structural Silicon Nitride Components", Center for Ceramic Research and Dept. of Mechanical Engineering, Rutgers—The State University; AlliedSignal Inc., 1996, pp. 335-344.
Agrawal, Dinesh , "Microwave Sintering of Ceramics, Composites, Metals, and Transparent Materials", Journal of Materials Education vol. 19(4.5 & 6), 1997, 9 Pages.
Asiabanpour, B. et al., "Advancements in the SIS process", Texas State University, University of Southern California, Aug. 13, 2003, pp. 25-38.
Attia, U. et al., "A review of micro-powder injection moulding as a microfabrication technique", Journal of Micromechanics and Microengineering, 21, (2011) 043001, 22 pages.
Burkhardt, Carlo et al., "Fused Filament Fabrication (FFF) of 316L Green Parts for the MIM process", World PM2016-AM-Deposition Technologies 2016, 7 Pages.
Clancy, R. et al., "Fused Deposition of Ceramics: Progress Towards a Robust and Controlled Process for Commercialization", AlliedSignal, Inc. Research and Technology, 2008, pp. 185-194.
Clemens Lieberwirth, Arne Harder and Hermann Seitz, "Extrusion Based Additive Manufacturing of Metal Parts", Journal of Mechanics Engineering and Automation 7 (2017) 79-83.
Deckers, J. et al., "Additive Manufacturing of Ceramics: A Review", Journal of Cermaic Science and Technology; vol. 5, No. 4, 2014, pp. 245-260.

(56) References Cited

OTHER PUBLICATIONS

Garcia, Javier H., "Development of Binder Systems Based on CAB for Power Injection Moulding (PIM) and Micro Power Injection Moulding (u-PIM) of Zircon and Invar Powers", Jan. 27, 2013, 305 Pages.
Gibson et al. "Additive Manufacturing Technologies," Spring Science+Business Media, LLC 2010, (Year: 2010).
Griffith, Michelle L. et al., "Freeform Fabrication of Ceramics via Stereolithography", J.Am. Ceram. Soc., 79 [10] 2601-608, Mar. 1996, 8 pages.
Hartkop, David, "MiniMetalMaker—3D print with metal clay", https://www.indiegogo.com/projects/minimetalmaker-3d-print-with-metal-clay#/2015, 3 pages.
Haselhuhn, A. et al., "In situ formation of substrate release mechanisms for gas metal arc weld metal 3-d printing", 2015, pp. 50-59.
Haselhuhn, A. et al., "Substrate Release Mechanisms for Gas Metal Arc Weld 3-D Aluminum Metal Printing", 3D Printing & Additive Manufacturing, 1(4), 2014, pp. 204-209.
Hidy, G. "Chapter 1 Introduction", aerosols, an industrial and environmental science, 1984, 1-16 pages.
Hildreth, O. et al., "Dissolvable Metal Supports for 3D Direct Metal Printing", 3D Printing and Additive Manufacturing, vol. 3, No. 2, 2016, pp. 91-97.
Hiller, J., "Digital Materials: Voxel Design, Rapid Assembly, Structural Properties, and Design Methods", A Dissertation Prestented to the Faculty of the Graduate School of Cornell University, 2011.
Jafari, M.A. et al., "A novel system for fused deposition of advanced multiple ceramics", Rapid Prototyping Journal, vol. 6, No. 3, 2000, pp. 161-174.
Jakus, Adam E. et al., "Metallic Architectures from 3D-Printed Powder-Based Liquid Inks", Adv. Funct. Mater, DOI: 10.1002/adfm.201503921, 2015 pp. 6985-6995.
Khoshnevis, B. et al., "SIS—A New SFF Method Based on Powder Sintering", University of Southern California, 2003, pp. 440-447.
"Fused quartz", Wikipedia, Jan. 24, 2020, https://en.wikipedia.org/wiki/Fused_quartz. (Year: 2020).
Baojun Zhu et al: "Mathematical model for condensed-solvent debinding process of PIM", Journal of Materials Processing Technology, vol. 142, No. 2, Nov. 1, 2003 (Nov. 1, 2003), pp. 487-492, XP055569090, NL, ISSN: 0924-0136, DOI: 10.1016/S0924-0136(03)00648-4.
Cocco et al. "Introduction to Fluidization" AICHE Nov. 2014 p. 21-29 (Year: 2014).
Extended European Search Report from corresponding Euorpean Application No. 20206034.9 dated Mar. 26, 2021.
U.S. Appl. No. 62/395,289, filed Sep. 15, 2016, priority document for US 2018/0071819 (Year: 2016).
U.S. Appl. No. 62/407,318, filed Oct. 12, 2016, priority document for US 2018/0071819 (Year: 2016).
Klar. Powder Metallurgy. Metals Handbook Desk Edition, Second Edition. ASM International. 1998. 876-891. (Year: 1998).
Kollenberg, W. 2014. "Ceramics and Multi-Material 3D Printing." Keramische Zeitschrift 4: 233-6 [English Abstract on front of the Patent].
Kollenberg, W., "Keramik und Multi-Material 3D-Druck", Keramische Zeitschrift, Apr. 2014, pp. 233-236.
Kovacs, B., "Sinterhard Metal or Ceramic Filled Filaments for 3D Printing—Kickstarter," Apr. 10, 2015 Update, https://www.kickstarter.com/projects/1093108121/sinterhard-metal-filled-filaments-for-3d-printing/post/1194731.
Kovacs, B., "Sinterhard Metal or Ceramic Filled Filaments for 3D Printing—Kickstarter," Apr. 11, 2015 Update, https://www.kickstarter.com/projects/1093108121/sinterhard-metal-filled-filaments-for-3d-printing/post/1196404.
Kovacs, B., "Sinterhard Metal or Ceramic Filled Filaments for 3D Printing—Kickstarter," Apr. 14, 2015 Update, https://www.kickstarter.com/projects/1093108121/sinterhard-metal-filled-filaments-for-3d-printing/post/1198099.
Kovacs, B., "Sinterhard Metal or Ceramic Filled Filaments for 3D Printing—Kickstarter," Apr. 20, 2015 Update, https://www.kickstarter.com/projects/1093108121/sinterhard-metal-filled-filaments-for-3d-printing/post/1200082.
Kovacs, B., "Sinterhard Metal or Ceramic Filled Filaments for 3D Printing—Kickstarter," Apr. 24, 2015 Update, https://www.kickstarter.com/projects/1093108121/sinterhard-metal-filled-filaments-for-3d-printing/post/1209077.
Kovacs, B., "Sinterhard Metal or Ceramic Filled Filaments for 3D Printing—Kickstarter," Apr. 26, 2015 Update, https://www.kickstarter.com/projects/1093108121/sinterhard-metal-filled-filaments-for-3d-printing/post/1210585.
Kovacs, B., "Sinterhard Metal or Ceramic Filled Filaments for 3D Printing—Kickstarter," Apr. 26, 2015, 2nd Update, https://www.kickstarter.com/projects/1093108121/sinterhard-metal-filled-filaments-for-3d-printing/post/1212021.
Kovacs, B., "Sinterhard Metal or Ceramic Filled Filaments for 3D Printing—Kickstarter," Apr. 28, 2015 Update, https://www.kickstarter.com/projects/1093108121/sinterhard-metal-filled-filaments-for-3d-printing/post/1212903.
Kovacs, B., "Sinterhard Metal or Ceramic Filled Filaments for 3D Printing—Kickstarter," Apr. 30, 2015 Update, https://www.kickstarter.com/projects/1093108121/sinterhard-metal-filled-filaments-for-3d-printing/post/1214989.
Kovacs, B., "Sinterhard Metal or Ceramic Filled Filaments for 3D Printing—Kickstarter," Apr. 30, 2015, 2nd Update, https://www.kickstarter.com/projects/1093108121/sinterhard-metal-filled-filaments-for-3d-printing/post/1216618.
Kovacs, B., "Sinterhard Metal or Ceramic Filled Filaments for 3D Printing—Kickstarter," Apr. 9, 2015 Update, https://www.kickstarter.com/projects/1093108121/sinterhard-metal-filled-filaments-for-3d-printing/post/1190938.
Kovacs, B., "Sinterhard Metal or Ceramic Filled Filaments for 3D Printing—Kickstarter," Aug. 17, 2015 Update, https://www.kickstarter.com/projects/1093108121/sinterhard-metal-filled-filaments-for-3d-printing/post/1326705.
Kovacs, B., "Sinterhard Metal or Ceramic Filled Filaments for 3D Printing—Kickstarter," Aug. 29, 2016 Update, https://www.kickstarter.com/projects/1093108121/sinterhard-metal-filled-filaments-for-3d-printing/post/1667406.
Kovacs, B., "Sinterhard Metal or Ceramic Filled Filaments for 3D Printing—Kickstarter," Jan. 6, 2016 Update, https://www.kickstarter.com/projects/1093108121/sinterhard-metal-filled-filaments-for-3d-printing/post/1459873.
Kovacs, B., "Sinterhard Metal or Ceramic Filled Filaments for 3D Printing—Kickstarter," Jul. 24, 2015 Update, https://www.kickstarter.com/projects/1093108121/sinterhard-metal-filled-filaments-for-3d-printing/post/1304221.
Kovacs, B., "Sinterhard Metal or Ceramic Filled Filaments for 3D Printing—Kickstarter," Jul. 4, 2015 Update, https://www.kickstarter.com/projects/1093108121/sinterhard-metal-filled-filaments-for-3d-printing/post/1259628.
Kovacs, B., "Sinterhard Metal or Ceramic Filled Filaments for 3D Printing—Kickstarter," Jun. 10, 2015 Update, https://www.kickstarter.com/projects/1093108121/sinterhard-metal-filled-filaments-for-3d-printing/post/1259492.
Kovacs, B., "Sinterhard Metal or Ceramic Filled Filaments for 3D Printing—Kickstarter," Oct. 26, 2015 Update, https://www.kickstarter.com/projects/1093108121/sinterhard-metal-filled-filaments-for-3d-printing/posts/1394824.
Kovacs, B., "Sinterhard Metal or Ceramic Filled Filaments for 3D Printing—Kickstarter," Oct. 9, 2015, https://web.archive.org/web/20151009063620/https://www.kickstarter.com/projects/1093108121/sinterhard-metal-filled-filaments-for-3d-printing/description.
Kovacs, B., "Sinterhard Metal or Ceramic Filled Filaments for 3D Printing—Kickstarter," Oct. 9, 2015, Update Summary, https://web.archive.org/web/20151009063620/https://www.kickstarter.com/projects/1093108121/sinterhard-metal-filled-filaments-for-3d-printing/updates.
Krassenstein, Brian, "Mini Metal Maker, Affordable Metal Clay 3D Printer, Relaunches on Indiegogo to Fund Mass Production", https://3dprint.com/48292/mini-metal-maker-3d-print/, 2013, 6 Pages.

(56) References Cited

OTHER PUBLICATIONS

Kukla, Christian et al., "Effect of Particle Size on the Properties of Highly-Filled Polymers for Fused Filament Fabrication", NPL—Jul. 20, 2016, 5 pages.

Kukla, Christian et al., "Properties for PIM Feedstocks Used in Fused Filament Fabrication", World PM2016-AM—Deposition Technologies 2016, 5 Pages.

Kumar, S. et al., "Composites by rapid prototyping technology", Materials and Design 31, 2010, pp. 850-856.

Lee et al., ed. "Production sintering practices," ASM Handbook, vol. 7, ASM International, 1998, 468-503, (Year: 1998).

Lieberwirth, C. et al., "Extrusion Based Additive Manufacturing of Metal Parts", Journal of Mechanics Engineering and Automation 7, 2017, pp. 79-83.

Lombardi, J. et al., "Issues Associated with EFF & FDM Ceramic Filled Feedstock Formulation", Advanced Ceramics Research, Inc.; University of Arizona, Arizona Materials Laboratories, 1997, pp. 457-464.

Martens, T. et al., "Direct Sinter Bonding of Metal Injection-Molded Parts to Solid Substrate Through Use of Deformable Surface Microfeatures", Journal of Micro and Nano-Manufacturing, Mar. 2013, vol. 1 (9 pages).

McMains S. et al, "Rapid Prototyping of Solid-Three Dimensional Parts", Computer Science Division, Department of Electrical Engineering and Computer Science, 1995, 61 pages.

McNulty, T. et al., "Development of a Binder Formulation for Fused Deposition of Ceramics", Rutgers University, Department of Ceramic and Materials Engineering, 1998, pp. 613-620, https://sffsymposium.engr.utexas.edu/Manuscripts/1998/1998-70-McNulty.pdf.

Michaels, S., "Production of Metal Parts Using the Three Dimensional Printing Process", Massachusetts Institute of Technology, Department of Mechanical Engineering, 1993 (88 pages).

Molitch-Hou, Michael, XJet Releases New Metal and Ceramic 3D Printers, Engineering.com, Nov. 11, 2017, https://www.engineering.com/3DPrinting/3DPrintingArticles/ArticleID/15986/XJet-Releases-New-Metal-and-Ceramic-3D-Printers.aspx.

Nickels, Liz, "Crowdfunding metallurgy," Metal Power Report, vol. 71, No. 5, Sep./Oct. 2016, Special Feature, pp. 324-327.

Nishiyabu, K., "Powder space holder metal injection molding (PSH-MIM) of micro-porous metals", Woodhead Publishing Limited, 2012, pp. 349-390.

O'Neal, Bridget, "Aluminum & Steel 3D Printer Filaments on Their Way—Sinterhard Launces Kickstarter Campaign", Apr. 7, 2015, https://3dprint.com/56373/sinterhard-kickstarter/.

Onagoruwa, S., Bose, S., and Bandyopadhyay, A. 2001. "Fused Deposition of Ceramics (FDC) and Composites." In Proc. SFF, 224-31.

Park, Mansoo et al., "Accelerated sintering in phase-separating nanostructured alloys", Nature Communications | 6:6858 | DOI: 10.1038/ncomms7858 |www.nature.com/naturecommunications Apr. 22, 2015, 6 pages.

Peterson, K. et al., "Macro-Meso-Microsystems Integration in LTCC: LDRD Report", Sandia Report, Sandia National Laboratories, Mar. 2007 (90 pages).

Peterson, K.A. et al., "Novel Microsystem Applications with New Techniques in Low-Temperature Co-Fired Ceramics", International Journal of Applied Ceramic Technology, vol. 2, No. 5, 2005, pp. 345-363.

Petros, M., "The Extension of Selective Inhibition Sintering (SIS) to High Temperature Alloys", A Dissertation Presented to the Faculty of the USC Graduate School, University of Southern California, Aug. 2016 (121 pages).

Ponche et al., "A new global approach to design for additive manufacturing", Virtual and Physical Prototyping, Taylor & Francis, 2012 7 (2), pp. 93-105.

Porter, "Effects of binder systems for metal injection moulding," Master's Thesis, Lulea University of Technology, 2003, (Year: 2003).

Riecker, S. et al., "Fused Deposition Modeling-Opportunities for Cheap Metal AM", World PM2016-AM—Deposition Technologies, 2016, 6 Pages.

Scheithauer, U., Slawik, T., Schwarzer, E., Richter, H.-J., Moritz, T., and Michaelis, A. 2015. "Additive Manufacturing of Metal-Ceramic-Composites by Thermoplastic 3D-Printing (3DTP)." Journal of Ceramic Science and Technology 6(2): 125-32.

Seluga, K., "Three Dimensional Printing by Vector Printing of Fine Metal Powders", Massachusetts Institute of Technology, Department of Mechanical Engineering, Aug. 2001, pp. 1-96.

Shah, Ramille N. et al., "3D-Printing of Energy Devices Using Particle-Based Inks", Northwestern University, Querrey Institute for BioNanotechnology Institute for Sustainability and Energy at Northwestern Aug. 2014, 5 Pages.

Specification Sheet: Alloy 17-4PH. Sandmeyer Steel Company. Apr. 2018. (Year: 2018).

Stanimirovic, Z. et al., "Ceramic Injection Molding, Some Critical Issues for Injection Molding", Dr. Jian Wang (Ed.), ISBN: 978-953-51-0297-7, InTech (2012), pp. 131-148, Available from: http://www.intechopen.com/books/some-critical-issues-for-injection-molding/ceramic-injection-molding.

Stanimirovic, Z. et al., "Ceramic Injection Molding, Some Critical Issues for Injection Molding," Published online 23, Mar. 2012, pp. 131-149.

Tay, B.Y. et al., "Solid freeform fabrication of ceramics", International Materials Reviews, vol. 48, No. 6, 2003, pp. 341-370.

Taylor, Shannon L. et al., "Iron and Nickel Cellular Structures by Sintering of 3D-Printed Oxide or Metallic Particle Inks", Advanced Engineering Materials, DOI: 10.1002/adem.201600365, Sep. 16, 2016, 8 pages.

Torabi, P. et al., "Selective Inhibition Sintering; The Process for Consumer Metal Additive Manufacturing," Mary Ann Liebert, Inc., vol. 1, No. 3, 2014, pp. 152-155.

Van Biezen, Michel, Mechanical Engineering: Trusses, Bridges & Other Structures (1 of 34) What is a Truss? YouTube, Published Jan. 20, 2016. https://www.youtube.com/watch?v=AXI_CoLAHm4. (Year: 2016).

Wang, H. et al., "Modifying Polyacetal Binder Based Feedstock to Improve Quality of MIM Parts", Materials Technology Laboratory, CANMET, Department of Natural Resources Canada, 1987, pp. 18-45 to 18-55.

Wang, H. et al., "Modifying Polyacetal Binder Based Feedstock to Improve Quality of MIM Parts," Metal Powder Industries Federation, American Powder Metallurgy Institute Internationa, 1997, pp. 18-55.

Williams, C., "Design and Development of a Layer-Based Additive Manufacturing Process for the Realization of Metal Parts of Designed Mesostructure", Georgia Institute of Technology, Apr. 2008 (422 pages).

Wu et al., "Solid freeform fabrication of metal components using fused deposition of metals", Materials and Design, 23 (2002), pp. 97-105.

Yoo, H., "Reactive Binders for Metal Parts Produced by Three Dimensional Printing", Massachusetts Institute of Technology, Department of Mechanical Engineering, May 1997, pp. 1-106.

Zaleski, Andrew, "Why 3D-Printing Companies Should be Watching This Startup", Dec. 1, 2015, http://fortune.com/2015/12/01/3d-printing-metals-xjet/.

Zhang, J. et al., "Selective Separation Sintering (SSS) a New Layer Based Additive Manufacturing Approach for Metals and Ceramics", University of Southern California, Department of Industrial and Systems Engineering, 2015, pp. 71-79.

U.S. Appl. No. 62/322,760 Specification, 30 pages, filed Apr. 14, 2016 (Year: 2016).

* cited by examiner

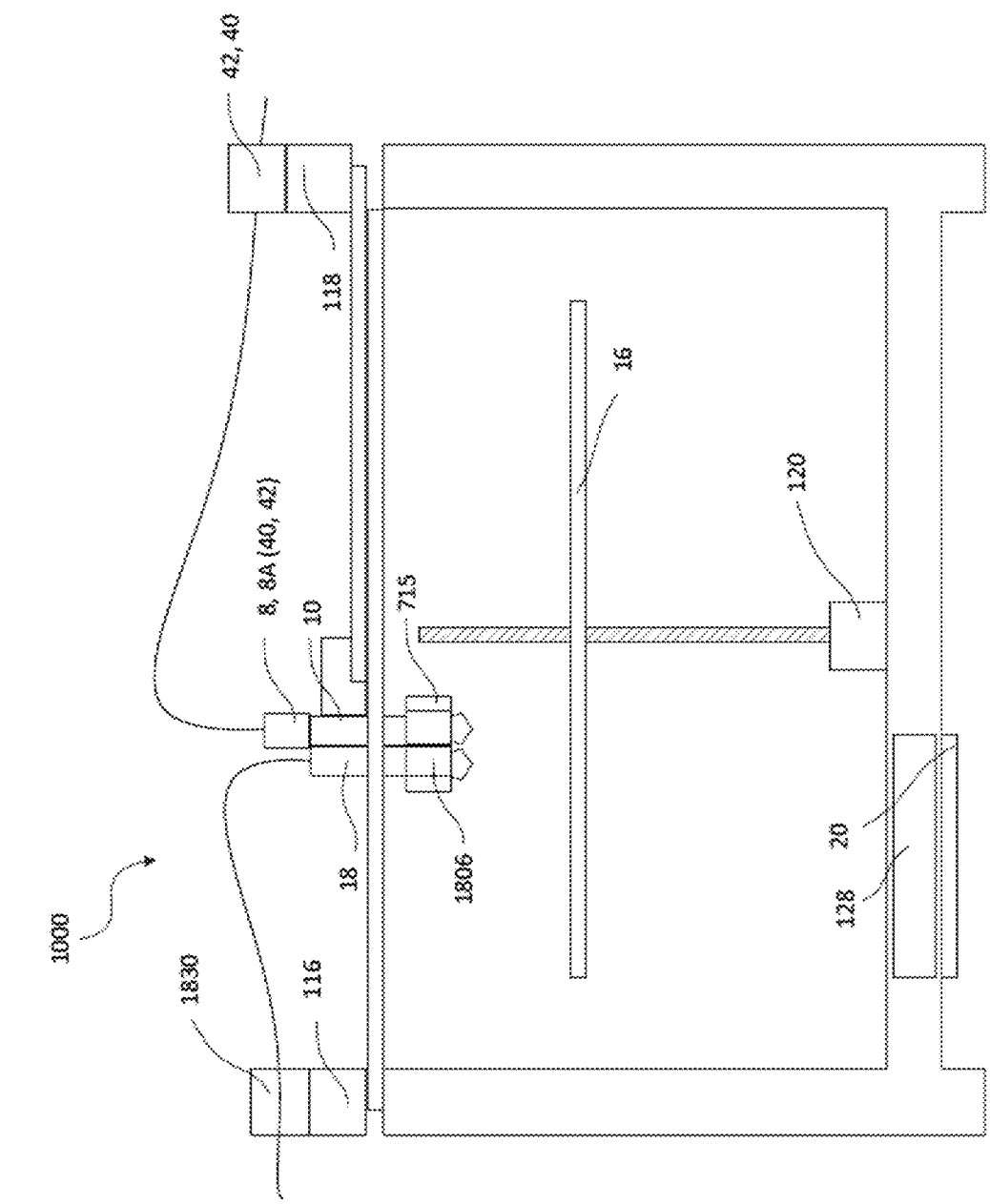

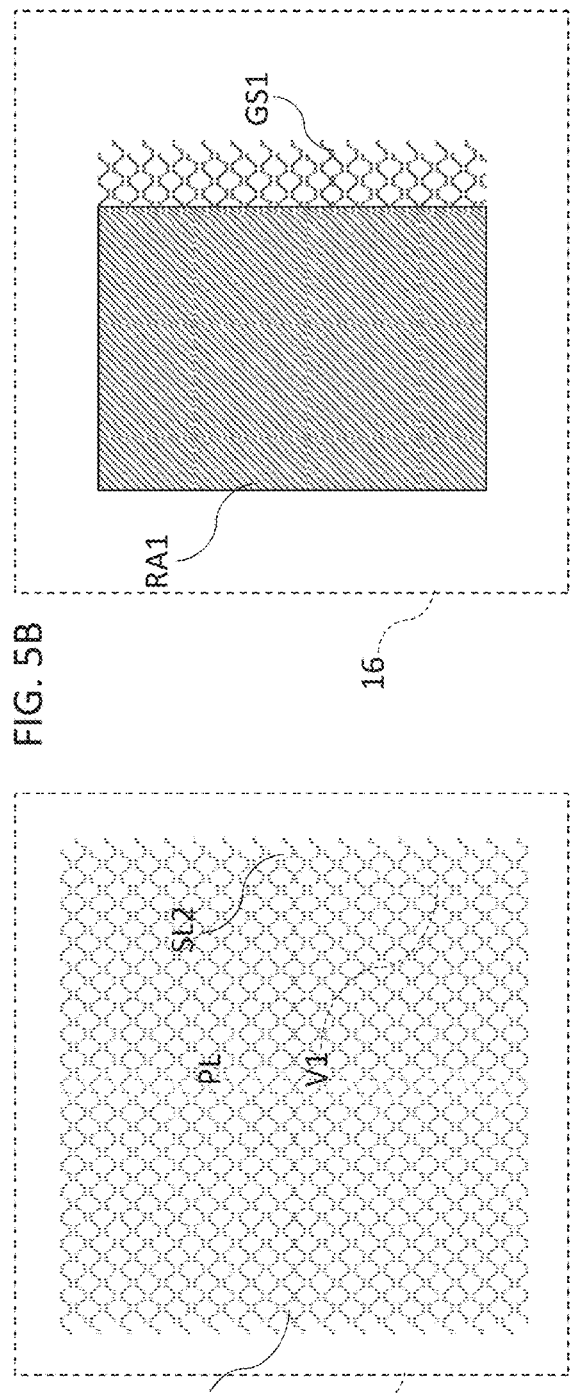
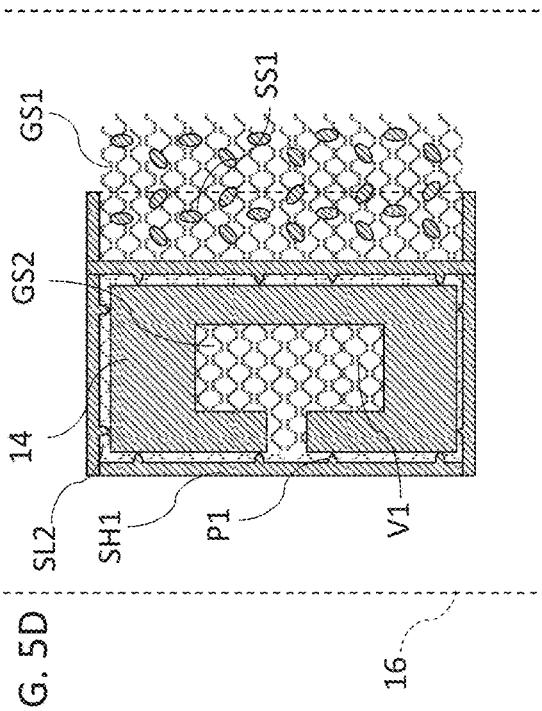
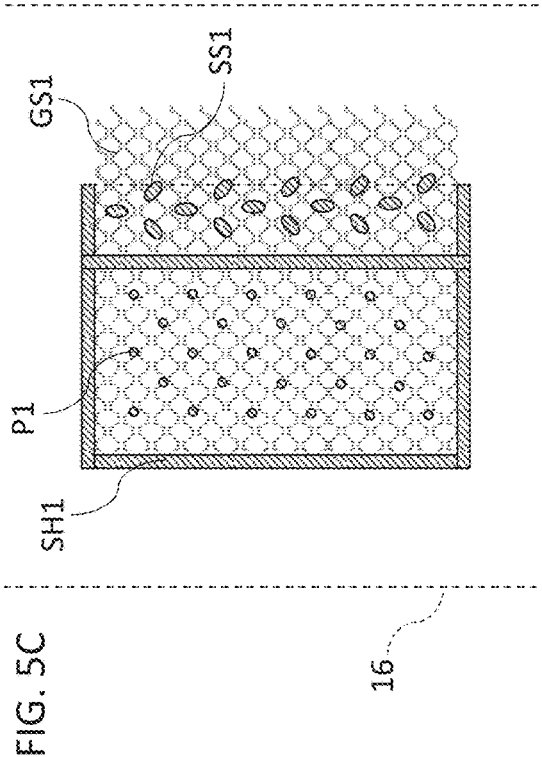

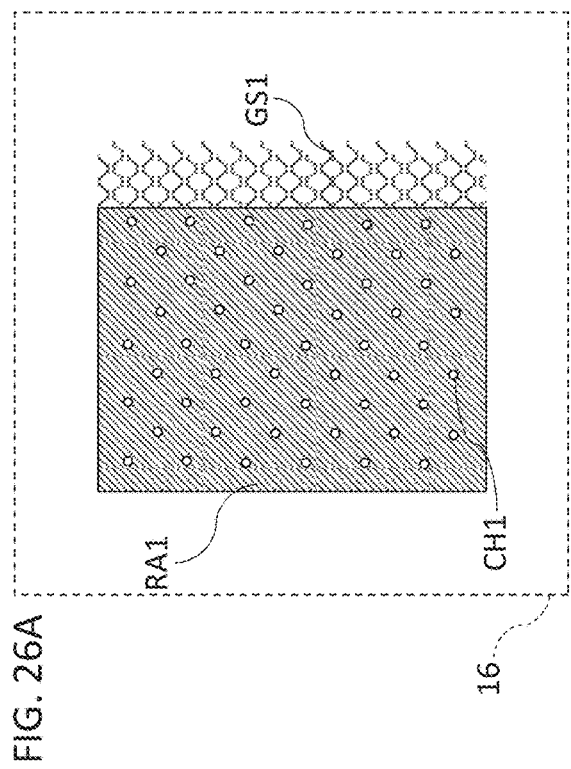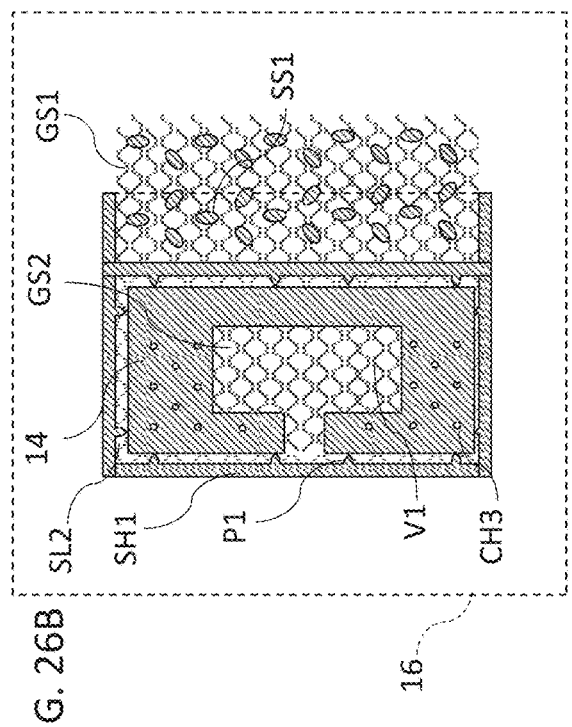

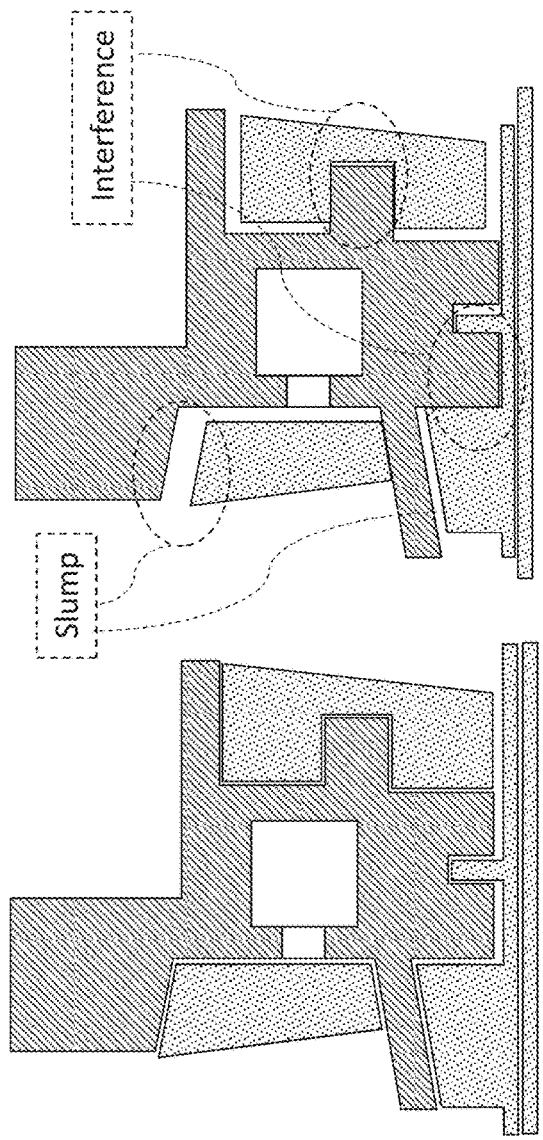
FIG. 33A
FIG. 33B
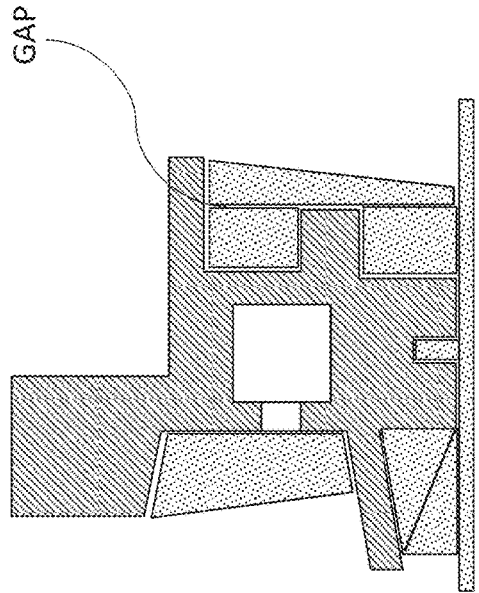
FIG. 33D
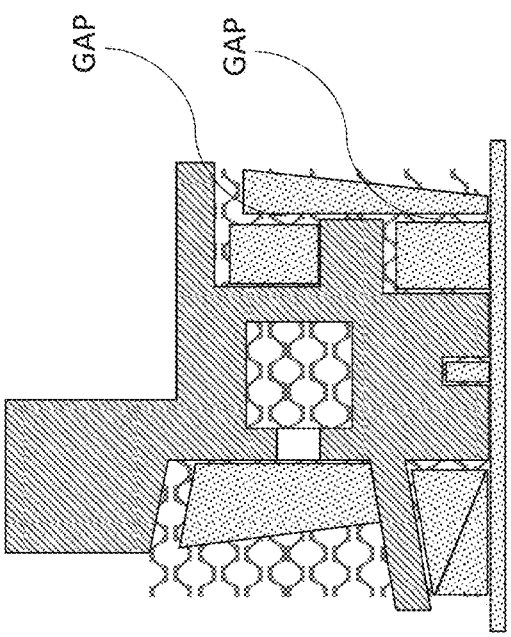
FIG. 33C

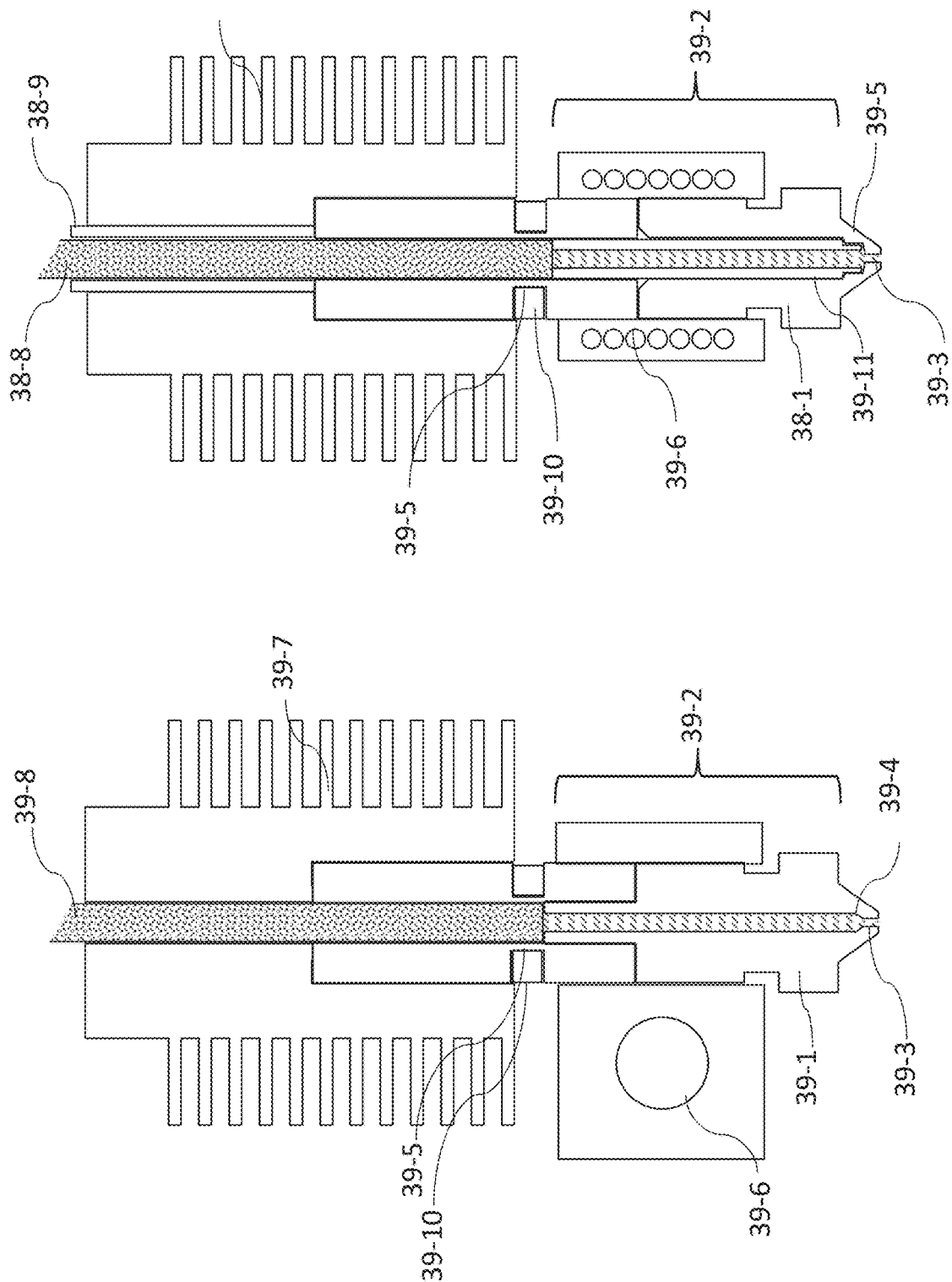

METHOD FOR MINIMIZING STRESS-RELATED DEFORMATIONS IN 3D PRINTED AND SINTERED PARTS

CROSS-REFERENCE TO RELATED APPLICATIONS

This application claims the benefit under 35 U.S.C. § 119(e) of U.S. provisional application Ser. No. 62/863,176 filed Jun. 18, 2019, entitled "METHOD FOR MINIMIZING STRESS-RELATED DEFORMATIONS IN 3D PRINTED AND SINTERED PARTS", the disclosure of which is herein incorporated by reference herein in its entirety. This application is also a continuation-in-part of U.S. patent application Ser. No. 15/976,009 filed May 10, 2018 [now U.S. Pat. No. 10,464,131], entitled "RAPID DEBINDING VIA INTERNAL FLUID CHANNELS", the disclosure of which is herein incorporated by reference herein in its entirety. U.S. patent application Ser. No. 15/976,009 claims the benefit under 35 U.S.C. § 119(e) of U.S. provisional application Ser. No. 62/505,081 filed May 11, 2017, entitled "RAPID DEBINDING VIA INTERNAL FLUID CHANNELS"; 62/519,138 filed Jun. 13, 2017, entitled "COMPENSATING FOR BINDER-INTERNAL STRESSES IN SINTERABLE 3D PRINTED PARTS"; 62/545,966 filed Aug. 15, 2017, entitled "BUBBLE REMEDIATION IN 3D PRINTING OF METAL POWDER IN SOLUBLE BINDER FEEDSTOCK"; and 62/575,219 filed Oct. 20, 2017, entitled "3D PRINTING INTERNAL FREE SPACE WITH A SINTERABLE POWDER FEEDSTOCK", the disclosures of which are herein incorporated by reference in their entireties. U.S. patent application Ser. No. 15/976,009 is also a continuation of each of U.S. patent application Ser. No. 15/829,472 filed on Dec. 1, 2017, entitled "SINTERING ADDITIVELY MANUFACTURED PARTS WITH A DENSIFICATION LINKING PLATFORM"; Ser. No. 15/829,486 filed on Dec. 1, 2017, entitled "STRESS RELAXATION IN ADDITIVELY MANUFACTURED PARTS"; Ser. No. 15/829,500 filed on Dec. 1, 2017, entitled "ADDITIVELY MANUFACTURED PARTS WITH DEBINDING ACCELERATION"; and Ser. No. 15/831,995 filed on Dec. 5, 2017, entitled "ADDITIVE MANUFACTURING WITH HEAT-FLEXED MATERIAL FEEDING", the disclosures of which are herein incorporated by reference in their entireties.

FIELD

Aspects relate to managing and minimizing stress-related deformations in three-dimensional (3D) printed parts.

BACKGROUND

Additive manufacturing, or 3D printing, is a class of technologies for the direct fabrication of physical products from a 3D computer model by a layered manufacturing process. In contrast to material removal processes in traditional machining, the 3D printing process adds material layer by layer to construct products.

SUMMARY

In a fused deposition additive manufacturing system, a 3D part or model may be printed from a digital representation of the 3D part in a layer-by-layer manner by extruding a flowable part material along toolpaths. The part material is extruded through an extrusion tip carried by a print head of a 3D printing device or system and is deposited as a sequence of roads on a substrate in a build plane. The extruded part material fuses to previously deposited part material and is then solidified. The position of the print head relative to the substrate is then incremented along one or more print axes, and the process can then be repeated to form a 3D part resembling the digital representation.

Some 3D printers are used to produce runs of identical parts in the tens, hundreds, or thousands. Uniformity between the parts is desired, where printed structures each have identical geometries that also match the geometrical dimensions set out in the 3D computer model.

An improved method for printing three-dimensional parts is provided herein. The method includes building a three-dimensional part by printing counter-wound slices. By winding adjacent slices in alternating directions, offsetting stored torques can be produced for each printed slice. The stored torques then neutralize one another during the debinding and sintering process, reducing part twists and deformations.

At least one aspect of the invention is directed to a method for building a part with a deposition-based additive manufacturing system including a print head configured to deposit a composite material, the method comprising: moving the print head in a first winding direction to deposit the composite material in a pattern that follows at least one first toolpath in a first layer of a part, the first winding direction producing a first stored torque in the first layer; and moving the print head in a second winding direction to deposit the composite material in a pattern that follows at least one second toolpath in a second layer of the part, the second layer being adjacent the first layer and the second winding direction producing a second stored torque in the second layer that offsets the first stored torque.

According to one embodiment, the second winding direction is a retrograde direction of the first winding direction.

In some embodiments, the method further comprises moving the print head in the first winding direction to deposit the composite material in a pattern that follows at least one third toolpath in a third layer of the part, the third layer being adjacent to the second layer. In various embodiments, moving the print head in the first winding direction to deposit the composite material in the pattern that follows the at least one third toolpath in the third layer produces a third stored torque in the third layer, the third stored torque offsetting the second stored torque. In some embodiments the method further comprises moving the print head in the second winding direction to deposit the composite material in a pattern that follows at least one fourth toolpath in a fourth layer, the fourth layer being adjacent to the third layer. In various embodiments, moving the print head in the second winding direction to deposit the composite material in the pattern that follows the at least one fourth toolpath in the fourth layer produces a fourth stored torque in the fourth layer, the fourth stored torque offsetting the third stored torque.

According to one embodiment, the at least one first toolpath forms an outer perimeter of the first layer.

In some embodiments, the at least one second toolpath forms an outer perimeter of the second layer.

According to one embodiment, the method further comprises depositing, with the print head, the composite material by extruding the composite material through an extrusion nozzle.

In some embodiments, the method further comprises converting the composite material into a flowable state before the composite material is extruded through the extrusion nozzle.

According to one embodiment, the composite material includes metal dispersed spheres, plastic dispersed spheres, or powder and a matrix of binding polymers and/or waxes.

According to another embodiment, the composite material includes a polymer-based binder and a powdered sinterable metal.

In some embodiments, the method further comprises debinding the polymer-based binder to form a shape-retaining brown part. In various embodiments, the method further comprises sintering the shape-retaining brown part to densify the shape-retaining brown part. In some embodiments, the method further comprises neutralizing, during the sintering of the shape-retaining brown part, the first stored torque with the second stored torque as the composite material relaxes. In various embodiments, neutralizing the first stored torque with the second stored torque includes reducing brown part twist and deformation.

According to one embodiment, the second layer is stacked on top of the first layer.

At least one aspect of the invention is directed to a method for building a green part with a deposition-based additive manufacturing system, the method comprising the steps of: depositing a first layer of the green part in a first direction along at least one first toolpath, the first layer including a polymer and a powdered sinterable metal; and depositing a second layer of the green part in a second direction retrograde to the first direction and along at least one second toolpath, the second layer including the polymer and the powdered sinterable metal, wherein depositing the second layer of the green part includes depositing the second layer of the green part in the second direction such that a directional stress in the second layer would offset a directional stress in the first layer as the directional stresses in the first and second layers relax due to the polymer being removed from the first layer and the second layer.

In some embodiments, the method further comprises debinding the polymer of the green part to form a shape-retaining brown part and sintering the shape-retaining brown part to densify the shape-retaining brown part. In various embodiments, the method further comprises neutralizing, during the sintering of the shape-retaining brown part, the directional stress in the first layer with the directional stress in the second layer as the shape-retaining brown part relaxes.

According to one embodiment, the second direction is a retrograde direction of the first direction.

In some embodiments, the method further comprises moving a print head in the first direction to deposit the polymer and the powdered sinterable metal in a pattern that follows at least one third toolpath in a third layer of the green part, the third layer being adjacent to the second layer. In various embodiments, moving the print head in the first direction to deposit the polymer and the powdered sinterable metal in the pattern that follows the at least one third toolpath in the third layer produces a directional stress in the third layer, the directional stress in the third layer offsetting the directional stress in the second layer. In some embodiments the method further comprises moving the print head in the second direction to deposit the polymer and the powdered sinterable metal in a pattern that follows at least one fourth toolpath in a fourth layer, the fourth layer being adjacent to the third layer. In various embodiments, moving the print head in the second direction to deposit the polymer and the powdered sinterable metal in the pattern that follows the at least one fourth toolpath in the fourth layer produces a directional stress in the fourth layer, the directional stress in the fourth layer offsetting the directional stress in the third layer.

According to one embodiment, the at least one first toolpath forms an outer perimeter of the first layer.

In some embodiments, the at least one second toolpath forms an outer perimeter of the second layer.

According to one embodiment, the method further comprises depositing, with the print head, the polymer and the powdered sinterable metal by extruding the polymer and the powdered sinterable metal through an extrusion nozzle.

In some embodiments, the method further comprises converting the polymer and the powdered sinterable metal into a flowable state before the polymer and the powdered sinterable metal are extruded through the extrusion nozzle.

According to one embodiment, the polymer and the powdered sinterable metal include metal dispersed spheres, plastic dispersed spheres, or powder and a matrix of binding polymers and/or waxes.

According to another embodiment, the polymer and the powdered sinterable metal include a polymer-based binder and a powdered sinterable metal.

In some embodiments, the method further comprises neutralizing the directional stress in the first layer with the directional stress in the second layer including reducing brown part twist and deformation.

According to one embodiment, the second layer is stacked on top of the first layer.

BRIEF DESCRIPTION OF DRAWINGS

FIG. 1A is a schematic representation of three-dimensional metal printer.

FIGS. 5A-5D are schematic sections through the diagram of FIG. 4.

FIG. 26A and FIG. 26B correspond to FIGS. 5B and 5D, respectively, and show alternative selected sections through FIG. 4 for the purpose of discussing printing and other process steps.

FIGS. 33A-33D, exaggerated in scale, show part shapes including either or both of convex or concave shapes (protrusions, cavities, or contours).

FIGS. 39A and 39B show a MIM material extrusion nozzle assemblies in cross-section.

DETAILED DESCRIPTION

Figure 1B:
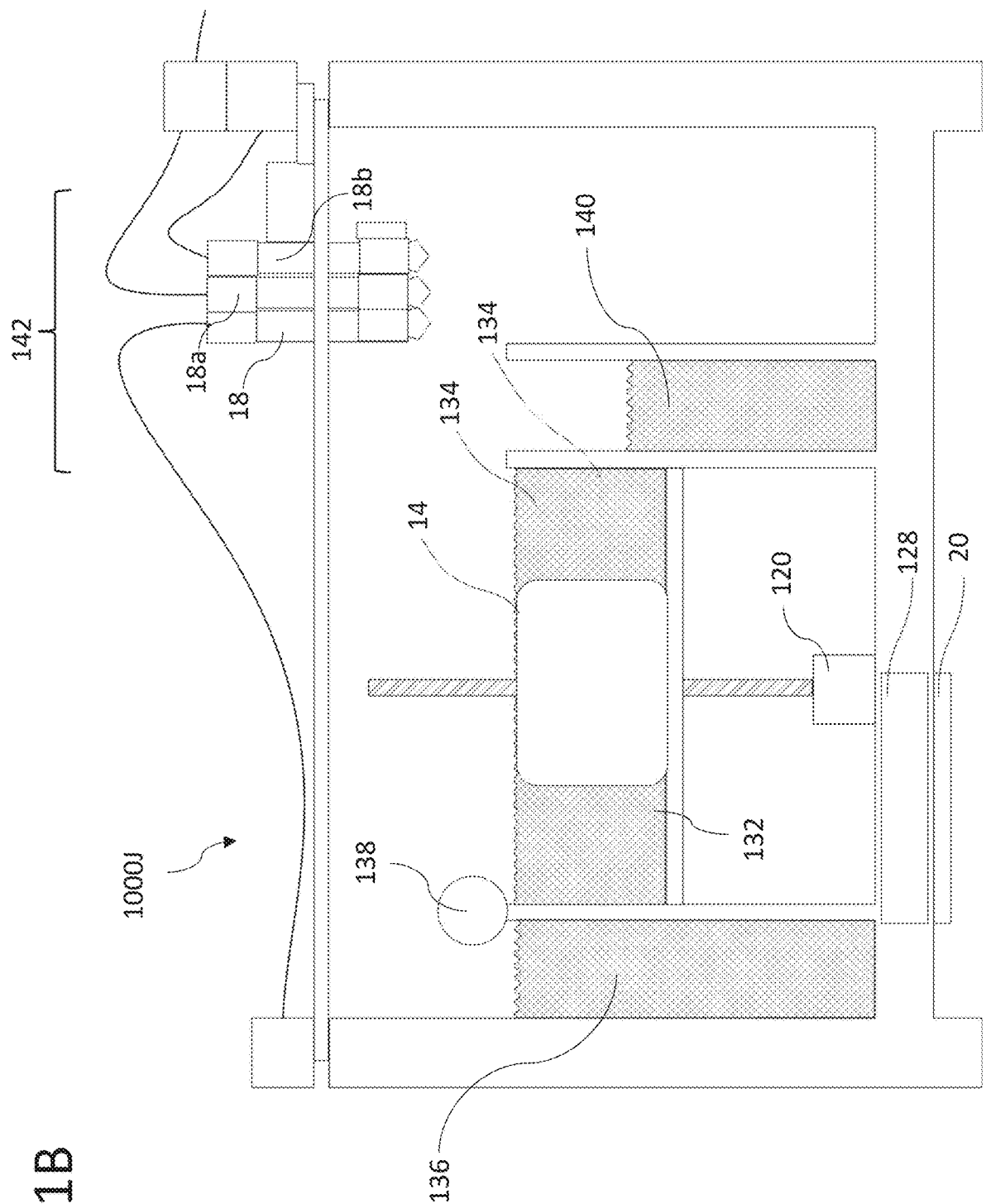
FIG. 1B is a schematic representation of a three-dimensional metal printer, representing a binder jetting/powder bed printing approach.

This patent application incorporates the following disclosures by reference in their entireties: U.S. patent application Ser. Nos. 61/804,235; 61/815,531; 61/831,600; 61/847,113; 61/878,029; 61/880,129; 61/881,946; 61/883,440; 61/902,256; 61/907,431; and 62/080,890; 14/222,318; 14/297,437; and Ser. No. 14/333,881, may be referred to herein as "Composite Filament Fabrication patent applications" or "CFF patent applications". Although the present disclosure discusses various metal or ceramic 3D printing systems, at least the mechanical and electrical motion, control, and sensor systems of the CFF patent applications may be used as discussed herein. In addition, U.S. Pat. Nos. 6,202,734; 5,337,961; 5,257,657; 5,598,200; 8,523,331; 8,721,032, and U.S. Patent Publication No. 20150273577, are incorporated herein by reference in their entireties. Further, U.S. Patent Application Nos. 62/429,711, filed Dec. 2, 2016; 62/430,902, filed Dec. 6, 2016; 62/442,395, filed Jan. 4, 2017; 62/480,331, filed Mar. 31, 2017; 62/489,410, filed Apr. 24, 2017; 62/505,081, filed May 11, 2017; 62/519,138, filed Jun. 13, 2017; 62/545,966, filed Aug. 15, 2017; 62/575,219, filed Oct. 20, 2017; and Ser. No. 15/722,445, filed Oct. 2, 2017 include related subject matter and are incorporated herein by reference in their entireties.

In 3D printing, in general, overhanging or jutting portions of a part may require removable and/or soluble and/or dispersing supports underneath to provide a facing surface for deposition. In metal printing, in part because metal is particularly dense (e.g., heavy), removable and/or soluble and/or dispersing supports may also be helpful to prevent deformation, sagging, during mid- or post-processing—for example, to preserve shape vs. drooping or sagging in potentially deforming environments like high heat.

Printing a sinterable part using a 3D printing material including a binder and a ceramic or metal sintering material is aided by support structures that are able to resist the downward pressure of, e.g., extrusion, and locate the deposited bead or other deposition in space. A release layer intervening between the support structures and the part includes a higher melting temperature material—ceramic or high temperature metal, for example, optionally deposited with a similar (primary) matrix or binder component to the model material. The release layer does not sinter, and permits the part to "release" from the supports. Beneath the release layer, the same model material as the part is used for the support structures, promoting the same compaction/densification during sintering. This tends to mean the part and the supports will shrink uniformly, maintaining dimensional accuracy of the part. At the bottom of the support, a release layer may also be printed. In addition, the support structures may be printed in sections with release layers between the sections, such that the final sintered support structures will readily break into smaller subsections for easy removal, optionally in the presence of mechanical or other agitation. In this way, a large support structure can be removed from an internal cavity via a substantially smaller hole. In addition, or in the alternative, a further method of support is to print soluble support material that is removed in the debinding process. For catalytic debind, this may be Delrin (POM) material.

One method to promote uniform shrinking or densification is to print a ceramic release layer as the bottom most layer in the part. On top of the sliding release layer (analogous to microscopic ball bearings) a thin sheet of metal—e.g., a raft—may be printed that will uniformly shrink with the part, and provide a "shrinking platform" or "densification linking" platform to hold the part and the related support materials in relative position during the shrinking or densification process. Optionally staples or tacks, e.g., attachment points, connect and interconnect (or link as densification linking) the model material portions being printed.

Figure 40:
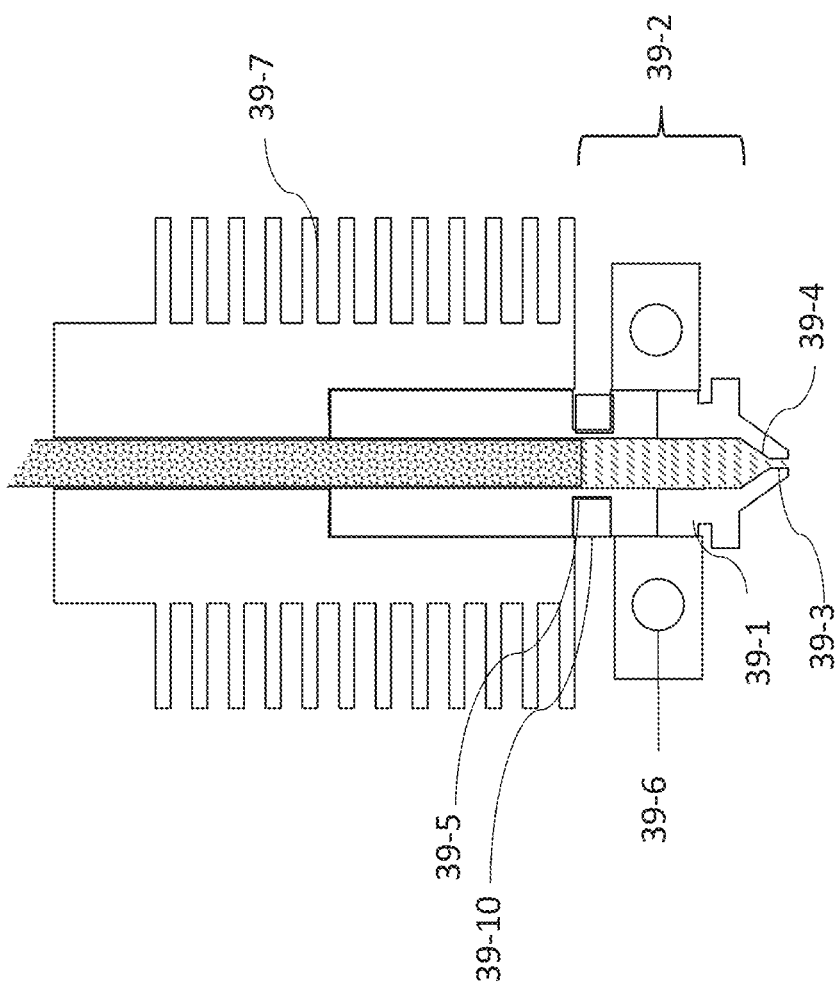
FIG. 40 shows a MIM material extrusion nozzle assembly in cross-section.

The printer(s) of FIGS. 1A, 1B, and otherwise shown in the remaining drawings through FIG. 40, with at least two print heads 18, 10 and/or printing techniques, deposits with one head a composite material including a binder and dispersed spheres or powder (e.g., within thermoplastic or curing binder), used for printing both a part and support structures, and with a second head 18a (shown in FIGS. 4-9) deposits the release or separation material. Optionally a third head and/or fourth head include a green body support head 18b and/or a continuous fiber deposition head 10. A fiber reinforced composite filament 2 (also referred to herein as continuous core reinforced filament) may be substantially void free and include a polymer or resin that coats, permeates or impregnates an internal continuous single core or multistrand core. It should be noted that although the print head 18, 18a, 18b are shown as extrusion print heads, a "fill material print head" 18, 18a, 18b as used herein may include optical or UV curing, heat fusion or sintering, or "polyjet", liquid, colloid, suspension or powder jetting devices—not shown—for depositing fill material, so long as the other functional requirements described herein are met. Functional requirements include one or more of employing green body material supports printing vs. gravity or printing forces; sintering or shrinking (densification linking) supports the part vs. gravity and promote uniform shrinking via atomic diffusion during sintering; and release or separation materials substantially retain shape through debinding stems but become readily removable, dispersed, powderized or the like after sintering.

Although FIGS. 1A, 1B through 40 in general show a Cartesian arrangement for relatively moving each print head in 3 orthogonal translation directions, other arrangements are considered within the scope of, and expressly described by, a drive system or drive or motorized drive that may relatively move a print head and a build plate supporting a 3D printed part in at least three degrees of freedom (i.e., in four or more degrees of freedom as well). For example, for three degrees of freedom, a delta, parallel robot structure may use three parallelogram arms connected to universal joints at the base, optionally to maintain an orientation of the print head (e.g., three motorized degrees of freedom among the print head and build plate) or to change the orientation of the print head (e.g., four or higher degrees of freedom among the print head and build plate). As another example, the print head may be mounted on a robotic arm having three, four, five, six, or higher degrees of freedom; and/or the build platform may rotate, translate in three dimensions, or be spun. The print bed or build plate, or any other bed for holding a part, may be moved by 1, 2, or 3 motors in 1, 2, or 3 degrees of freedom.

A long or continuous fiber reinforced composite filament is fully optional, and when used, is fed, dragged, and/or pulled through a conduit nozzle optionally heated to a controlled temperature selected for the matrix material to maintain a predetermined viscosity, force of adhesion of bonded ranks, melting properties, and/or surface finish. After the matrix material or polymer of the fiber reinforced filament is substantially melted, the continuous core reinforced filament is applied onto a build platen 16 to build successive layers of a part 14 to form a three-dimensional structure. The relative position and/or orientation of the build platen 16 and print heads 18, 18a, 18b, and/or 10 are controlled by a controller 20 to deposit each material described herein in the desired location and direction. A driven roller set 42, 40 may drive a continuous filament along a clearance fit zone that prevents buckling of filament. In a threading or stitching process, the melted matrix material and the axial fiber strands of the filament may be pressed into the part and/or into the swaths below, at times with axial compression. As the build platen 16 and print head(s) are translated with respect to one another, the end of the filament contacts an ironing lip and be subsequently continually ironed in a transverse pressure zone to form bonded ranks or composite swaths in the part 14.

With reference to FIG. 1A, 1B through 40, each of the printheads 18, 18a, 18b, 10 may be mounted on the same linear guide or different linear guides or actuators such that the X, Y motorized mechanism of the printer moves them in unison. As shown, each extrusion printhead 18, 18a, 18b may include an extrusion nozzle with melt zone or melt reservoir, a heater, a high thermal gradient zone formed by a thermal resistor or spacer (e.g., stainless steel, glass, ceramic, optionally an air gap), and/or a Teflon or PTFE tube. A 1.75-1.8 mm; 3 mm; or larger or smaller thermoplastic (and/or binder matrix) filament is driven via, e.g., a direct drive or a Bowden tube drive, and provides extrusion back pressure in the melt reservoir.

FIG. 1B shows in schematic form a binder jetting powder bed printer, with some components generally similar to the extrusion printer of FIG. 1A. The printer 1000J includes two or more print heads 18 (jetting or applying a binder to bind powder 132 to form model material or bound composite), 18a (jetting or extruding release or separation material), and or 18b (jetting or extruding placeholder material) supplied by supply lines 142. The printer 1000J may deposit with print head 18 a binder upon the powder bed 134 to form a composite material including a debinder and dispersed spheres or powder (metal or ceramic powder), used for printing a part, support structures, and a shrinking or densification linking platform. A sinterable powder feedstock reservoir, supply or refill 136 supplies the powder bed 134 with new layers of unbound powder, which is leveled by a leveling or doctor roll 138. Excess from leveling is captured in a feedstock overflow reservoir 140. With a second head 18a, the printer 1000J may deposit release or separation material. Optionally the third head and/or fourth head include the placeholder material head 18b and/or a continuous fiber deposition head 10 as described herein. The binder jetting printer 1000J described herein meets the functional requirements described herein (e.g., green body and/or placeholder material supports printing vs. gravity or printing forces, sintering supports support the part vs. gravity and promote uniform shrinking via atomic diffusion during sintering, and release or separation materials substantially retain shape through debinding steps but become readily removable, dispersed, powderized or the like after sintering).

Figure 2:
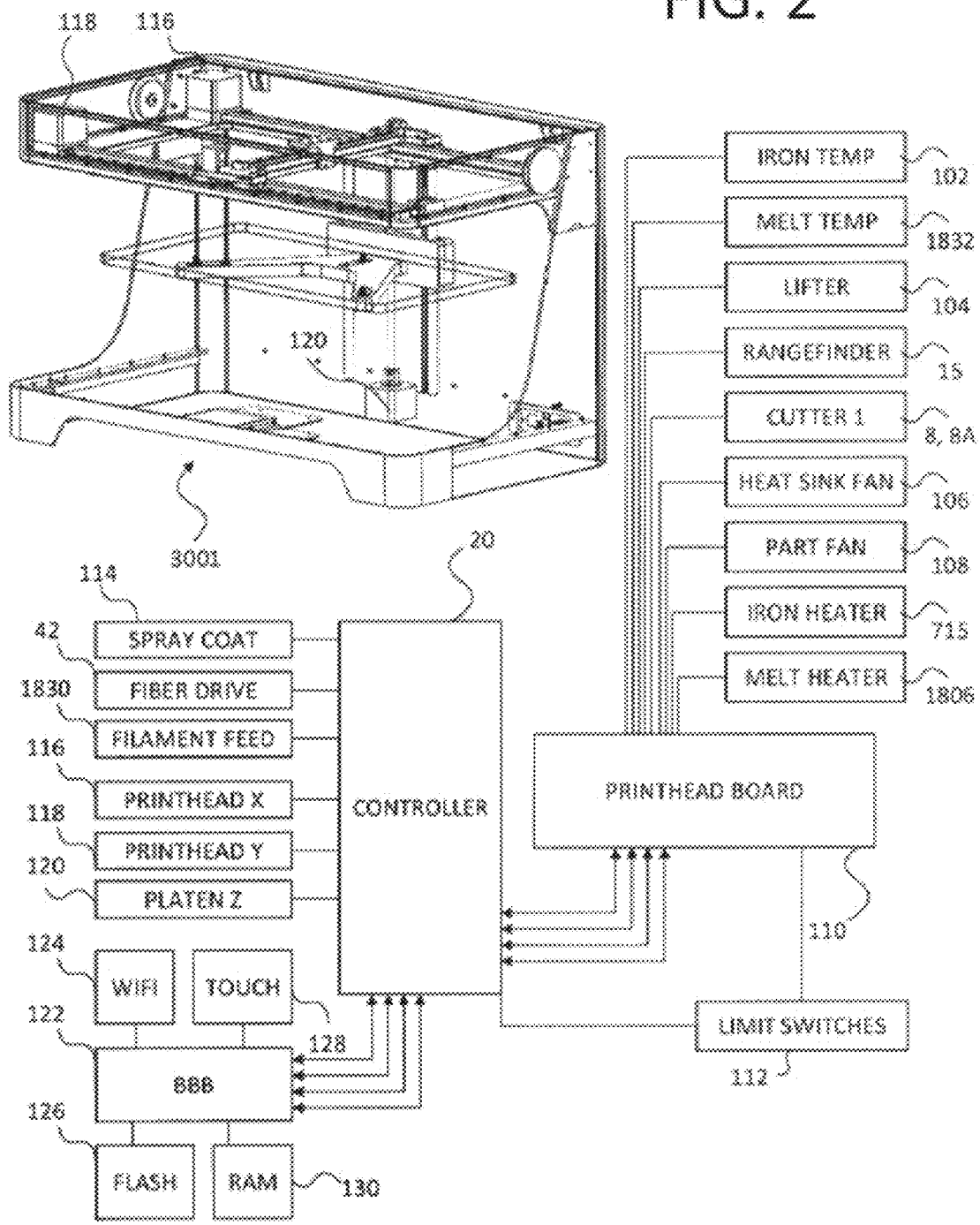
FIG. 2 is a block diagram and schematic representation of a three-dimensional printer system.

FIG. 2 depicts a block diagram and control system of the three-dimensional printers, e.g., in FIGS. 1A and 1B, which controls the mechanisms, sensors, and actuators therein, and executes instructions to perform the control profiles depicted in and processes described herein. A printer is depicted in schematic form to show possible configurations of e.g., three commanded motors 116, 118, and 120. It should be noted that this printer may include a compound assembly of printheads 18, 18*a*, 18*b*, and/or 10.

As depicted in FIG. 2, the three-dimensional printer 3001 (also representative of printer 1000 and 1000J) includes a controller 20 which is operatively connected to any fiber head heater 715 or similar tip heater, the fiber filament drive 42 and the plurality of actuators 116, 118, 120, wherein the controller 20 executes instructions which cause the filament drive 42 to deposit and/or compress fiber into the part. The instructions are held in flash memory and executed in RAM (not shown; may be embedded in the controller 20). An actuator 114 for applying a spray coat (including a spray release powder), as discussed herein, may also be connected to the controller 20. In addition to the fiber drive 42, respective filament feeds 1830 (e.g., up to one each for heads 18, 18*a*, and/or 18*b*) may be controlled by the controller 20 to supply one or more extrusion printheads 18, 18*a*, 18*b*, 1800. A printhead board 110, optionally mounted on the compound printhead and moving therewith and connected to the main controller 20 via ribbon cable, breaks out certain inputs and outputs. The temperature of an ironing tip may be monitored by the controller 20 by a thermistor or thermocouple 102; and the temperature of the heater block holding nozzle of any companion extrusion printhead 1800 may be measured by respective thermistors or thermocouples 1832. A heater 715 for heating the ironing tip and respective heater(s) 1806 for heating respective extrusion nozzles 18, 18*a*, 18*b*, 1802 are controlled by the controller 20. Heat sink fan(s) 106 and a part fan(s) 108, each for cooling, may be shared between the printheads, or independently provided per printhead, and controlled by the controller 20. A rangefinder 15 that measures a distance from the printhead assembly to the part (and thereby a surface profile of the part) is also monitored by the controller 20. The cutter 8 actuator, which may be a servomotor, a solenoid, or equivalent, is also operatively connected to the controller 20. A lifter motor 104 for lifting one or any printhead away from the part (e.g., to control dripping, scraping, or rubbing) may also be controlled by the controller 20. Limit switches 112 for detecting when the actuators 116, 118, 120 have reached the end of their proper travel range are also monitored by the controller 20.

As depicted in FIG. 2, an additional breakout board 122, which may include a separate microcontroller, provides user interface and connectivity to the controller 20. An 802.11 Wi-Fi transceiver connects the controller to a local wireless network and to the Internet at large and sends and receives remote inputs, commands, and control parameters. A touch screen display panel 128 provides user feedback and accepts inputs, commands, and control parameters from the user. Flash memory 126 and RAM 130 store programs and active instructions for the user interface microcontroller and the controller 20.

Figure 3:
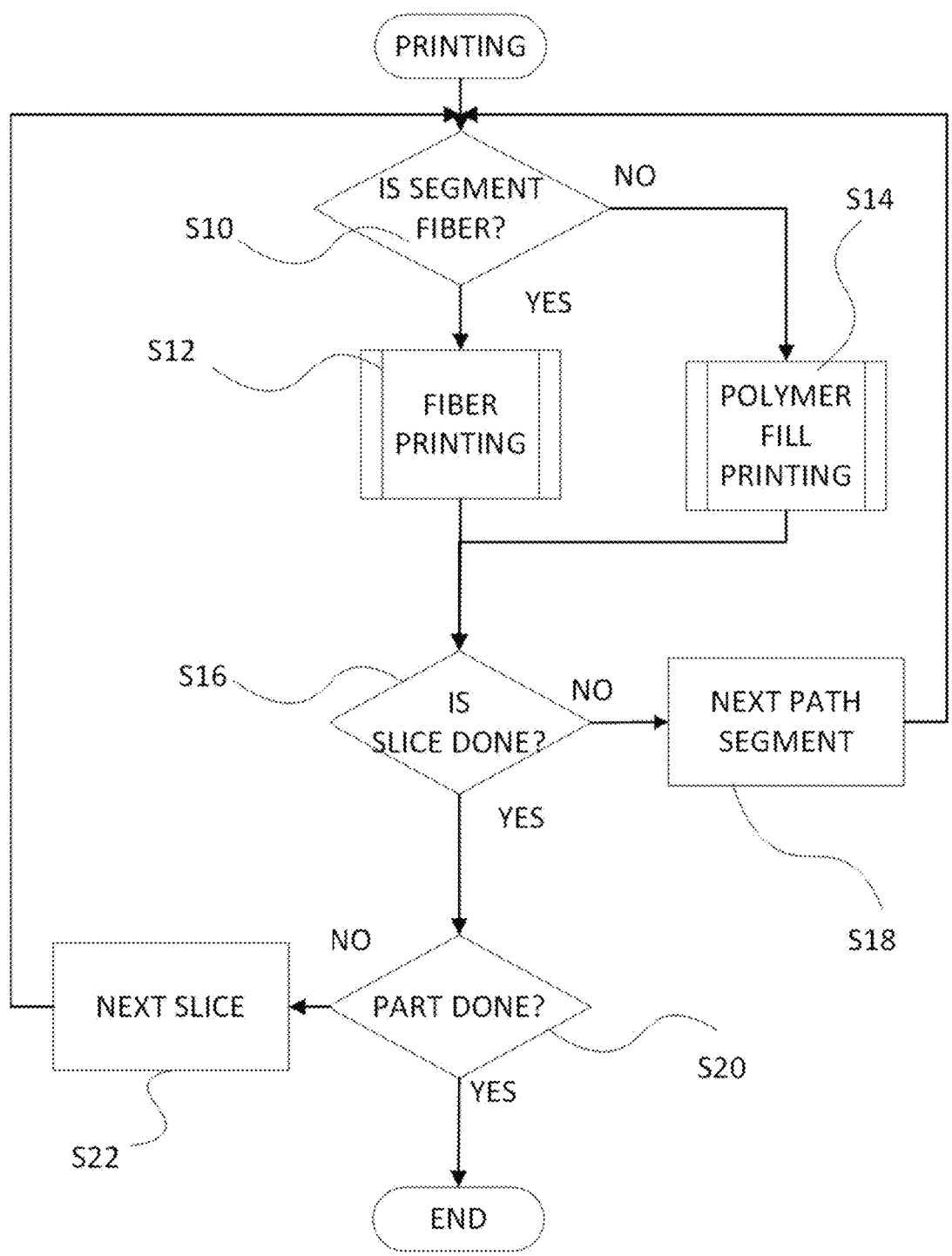
FIG. 3 is a flowchart describing the overall operation of the 3D printer of FIG. 2.

FIG. 3 depicts a flowchart showing a printing operation of the printers 1000 in FIGS. 1A through 40. FIG. 3 describes, as a coupled functionality, control routines that may be carried out to alternately and in combination use the co-mounted FFF extrusion head(s) 18, 18*a*, and/or 18*b* and/or a fiber reinforced filament printing head as in the CFF patent applications.

In FIG. 3, at the initiation of printing, the controller 20 determines in step S10 whether the next segment to be printed is a fiber segment or not, and routes the process to S12 in the case of a fiber filament segment to be printed and to step S14 in the case of other segments, including e.g., base (such as a raft or shrinking/densification linking platform), fill (such as extruded or jet-bound model material, release material, or placeholder material), or coatings (such as sprayed or jetted release material). After each or either of routines S12 and S14 have completed a segment, the routine of FIG. 3 checks for slice completion at step S16, and if segments remain within the slice, increments to the next planned segment and continues the determination and printing of fiber segments and/or non-fiber segments at step S18. Similarly, after slice completion at step S16, if slices remain at step S20, the routine increments at step S22 to the next planned slice and continues the determination and printing of fiber segments and/or non-fiber segments. "Segment" as used herein corresponds to "toolpath" and "trajectory", and means a linear row, road, or rank having a beginning and an end, which may be open or closed, a line, a loop, curved, straight, etc. A segment begins when a printhead begins a continuous deposit of material, and terminates when the printhead stops depositing. A "slice" is a single layer, shell or lamina to be printed in the 3D printer, and a slice may include one segment, many segments, lattice fill of cells, different materials, and/or a combination of fiber-embedded filament segments and pure polymer segments. A "part" includes a plurality of slices to build up the part. Support structures and platforms also include a plurality of slices. FIG. 3's control routine permits dual-mode printing with one, two, or more (e.g., four) different printheads, including the compound printheads 18, 18*a*, 18*b*, and/or 10. For example, the decision at S10 may be a "case" structure which proceeds to different material printing routines in addition to S12, S14.

All of the printed structures previously discussed may be embedded within a printed article during a printing process, as discussed herein, expressly including reinforced fiber structures of any kind, sparse, dense, concentric, quasi-isotropic or otherwise as well as fill material (e.g., including model material and release material) or plain resin structures. In addition, in all cases discussed with respect to embedding in a part, structures printed by fill material heads 18, 18*a*, 18*b* using thermoplastic extrusion deposition may be in each case replaced with soluble material (e.g., soluble thermoplastic or salt) to form a soluble preform which may form a printing substrate for part printing and then removed. All continuous fiber structures discussed herein, e.g., sandwich panels, shells, walls, reinforcement surrounding holes or features, etc., may be part of a continuous fiber reinforced part. The 3D printer herein discussed with reference to FIGS. 1A-40 may thereby deposit either fill material (e.g., composite with a debindable matrix containing metal, ceramic, and/or fibers), soluble (e.g., "soluble" also including, in some cases, debindable by thermal, pyrolytic or catalytic process) material, or continuous fiber.

Commercially valuable metals suitable for printing include aluminum, titanium and/or stainless steel as well as other metals resistant to oxidation at both high and low temperatures (e.g., amorphous metal, glassy metal or metallic glass). One form of post-processing is sintering. By molding or 3D printing model material as described herein, a green body may be formed from an appropriate material, including a binder or binders and a powdered or spherized metal or ceramic (of uniform or preferably distributed particle or sphere sizes). A brown body may be formed from the green body by removing one or more binders (e.g., using a solvent, catalysis, pyrolysis). The brown body may retain its shape and resist impact better than the green body due to remelting of a remaining binder. In other cases the brown body may retain its shape but be comparatively fragile. When the brown body is sintered at high temperature and/or pressure, remaining or second stage binder may pyrolyse away, and the brown body substantially uniformly contracts as it sinters. The sintering may take place in an inert gas, a reducing gas, a reacting gas, or a vacuum. Application of heat (and optionally) pressure eliminates internal pores, voids and microporosity between and within the metal or ceramic beads through at least diffusion bonding and/or atomic diffusion. Supporting material, either the same or different from model material, supports the part being printed, post-processed, or sintered versus the deposition force of printing itself (e.g., green body supports) and/or versus gravity (e.g., green body supports or sintering supports), particularly for unsupported straight or low-angle spans or cantilevers.

Printing a part is aided by the support structures, able to resist the downward pressure of, e.g., extrusion, and locate the deposited bead or deposition in space. As discussed herein a release layer includes a higher melting temperature or sintering temperature powdered material—ceramic for example, optionally deposited in or via a similar (primary) matrix component to the model material. Beneath the release layer, the same (metal) material is used as the part, promoting the same compaction/densification. This tends to mean the part and the supports will shrink uniformly, maintaining overall dimensional accuracy of the part. At the bottom of the sintering support, a release layer may also be printed. In addition, the sintering support structures may be printed sections with release layers, such that the final sintered support structures will readily break into smaller subsections for easy removal, optionally in the presence of mechanical or other agitation. In this way, a large support structure can be removed from an internal cavity via a substantially smaller hole. In addition, or in the alternative, a further method of support is to print soluble support material that is removed in the debinding process. For catalytic debind, this may be Delrin (POM) material. One method to promote uniform shrinking is to print a ceramic release layer as the bottom most layer in the part. On top of the sliding release layer (analogous to microscopic ball bearings) a thin sheet of metal—e.g., a raft—may be printed that will uniformly shrink with the part, and provide a "shrinking platform" or "densification linking platform" to hold the part and the related support materials in relative position during the shrinking or densification process. Optionally staples or tacks, e.g., attachment points, connect and interconnect the model material portions being printed.

As noted, in one example, green body supports may be printed from a thermal, soluble, pyrolytic or catalytically responsive material (e.g., polymer or polymer blend) and leave behind only removable byproducts (gases or dissolved material) when the green body supports are removed. In another example, green body supports may optionally be printed from a matrix of thermal, soluble, or catalytic debindable composite material (e.g., catalytic including Polyoxymethylene—POM/acetal) and high melting point metal (e.g., molybdenum) or ceramic spheres, and leave behind a powder when debound. The green body supports may be formed to be mechanically or chemically or thermally removed before or after debinding, but preferably are also made from thermal, soluble, pyrolytic or catalytically responsive material, and may be fully removed during the debinding stage (or immediately thereafter, e.g., subsequent powder cleaning to remove remainder powder). In some cases, the green body supports are removed by a different chemical/thermal process from the debinding, before or after debinding.

An exemplary catalytically debindable composite material including POM or acetal is one example of a two-stage debinding material. In some cases, in a two-stage debinding material, in a first stage a first material is removed, leaving interconnected voids for gas passage during debinding. The first material may be melted out (e.g., wax), catalytically removed (e.g., converted directly into gas in a catalytic surface reaction), or dissolved (in a solvent). A second stage binder, e.g., polyethylene, that is not as responsive to the first material process, remains in a lattice-like and porous form, yet maintaining the shape of the 3D printed object awaiting sintering (e.g., before the metal or ceramic balls have been heated to sufficient temperature to begin the atomic diffusion of sintering). This results in a brown part, which includes, or is attached to, the sintering supports. As the part is sintered at high heat, the second stage binder may be pyrolysed and progressively removed in gaseous form.

Figure 4:
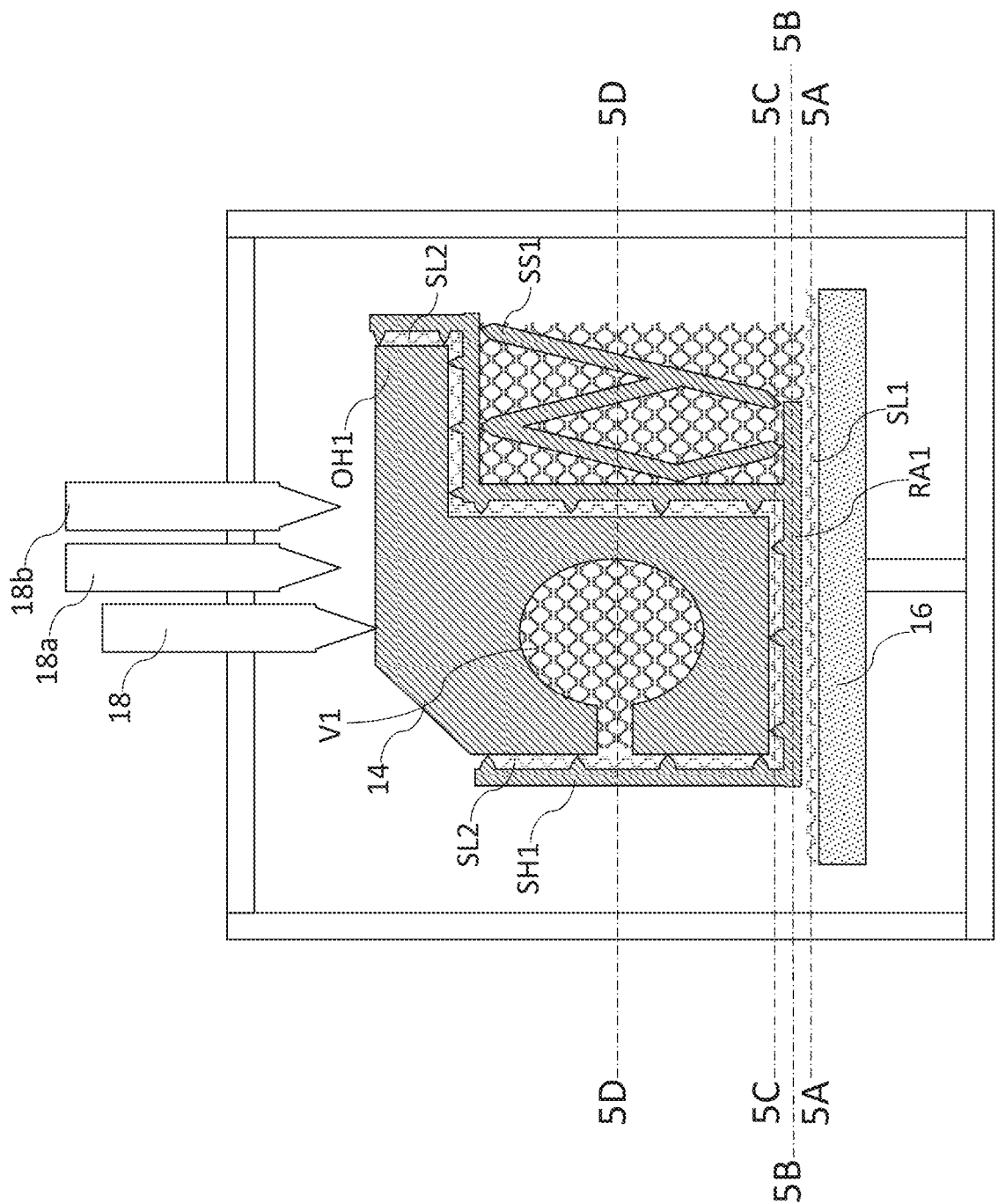
FIG. 4 is a schematic representation of a 3D printing system, part, and process in which sintering supports (e.g., shrinking or densification linking supports) are provided.

FIGS. 4 through 7 show, in schematic form, additional explanation of relevant processes, structures, materials, and systems. As shown in FIGS. 4-7, a 3D printer 1000 suitable for the deposition phase of the process may include one, two, three, or more deposition heads 18, 18a, 18b for depositing model material and supports (as well as, e.g., a continuous composite deposition head 10, not shown in FIGS. 4-7). As shown in FIG. 4, a model material deposition head 18 deposits a composite material including metal or ceramic spherized powder as well as a meltable or matrix of binding polymers, waxes, and/or other utility components. In the model material deposition head 18, the process may use a low-diameter filament (e.g., 1-4 mm) as both material supply and to provide back pressure for extrusion. In this case, the model material extrusion filament supplied to head 18 may be stiff, yet reasonably pliable as supplied (e.g., 0.1-3.0 GPa flexural modulus) and reasonably viscous when fluidized (e.g., melt or dynamic viscosity of 100-10,000 Pa·s, preferably 300-1000 Pa·s) in order to support bridging while printing across gaps or spans, even absent green body supports or sintering (i.e., shrinking or densification linking) supports below.

Figure 6:
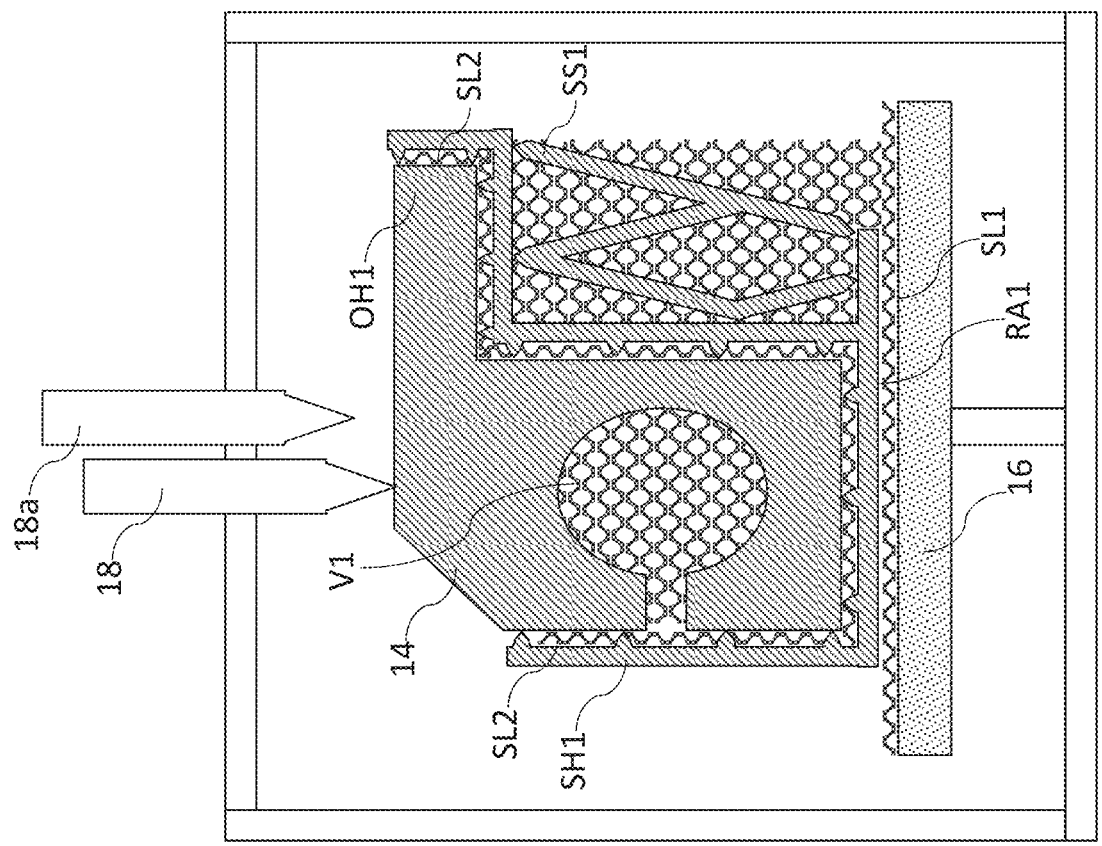
FIG. 6 is a schematic representation of an alternative 3D printing system, part, and process to that of FIGS. 4 and 5A-5D.

In the 3D printer 1000 and exemplary part 14 shown in FIG. 4, a separation or release material deposition head 18-S (or 18a) and a green body support material deposition head 18-G (or 18b, the green body support material also or alternatively being a placeholder material) may additionally be supported to move in at least three relative degrees of freedom with respect to the part P1 being printed as discussed with reference to FIGS. 1A-3 inclusive. As discussed herein, the separation material may in some cases serve as a green body support, so alternatively, as shown in FIG. 6, only one head 18-SG may deposit both green body support material and separation material. As shown in FIG. 4, from bottom to top (in this case, 3D printing is performed from the bottom up), in these exemplary processes the first layer printed is a raft separation layer or sliding release layer SL1 printed from, e.g., the separation material deposition head 18-S (or 18-SG). The separation material may be, as noted herein, of similar debinding materials to the model material, but, e.g., with a ceramic or other spherical powder filler (e.g., particulate) that does not sinter, melt, or otherwise harden together at the sintering temperature of the model material. Consequently, the separation material may have its debinding material completely removed by solvent, catalysis, pyrolysis, leaving behind a dispersible and/or removable powder (e.g., after sintering, the powder of the separation material remaining unsintered even after the sintering process). "Separation" and "release" are generally used interchangeably herein.

FIGS. 5A-5D show selected sections through FIG. 4 for the purpose of discussing printing and other process steps. It should be noted that the Figures are not necessarily to scale. In particular, very small clearances or material-filled clearances (e.g., separation or release layers) or components (e.g., protrusions for snap removal) may be shown at exaggerated scales for the purpose of clear explanation. Moreover, it should also be noted that in some cases, solid bodies are shown to simplify explanation, but the internal structure of the solid bodies herein may be 3D printed with porous, cellular, or hollow infill patterns (e.g., honeycombs) and/or may include chopped, short, long, or continuous fiber reinforcement as discussed in the CFF Patent Applications.

Figure 7:
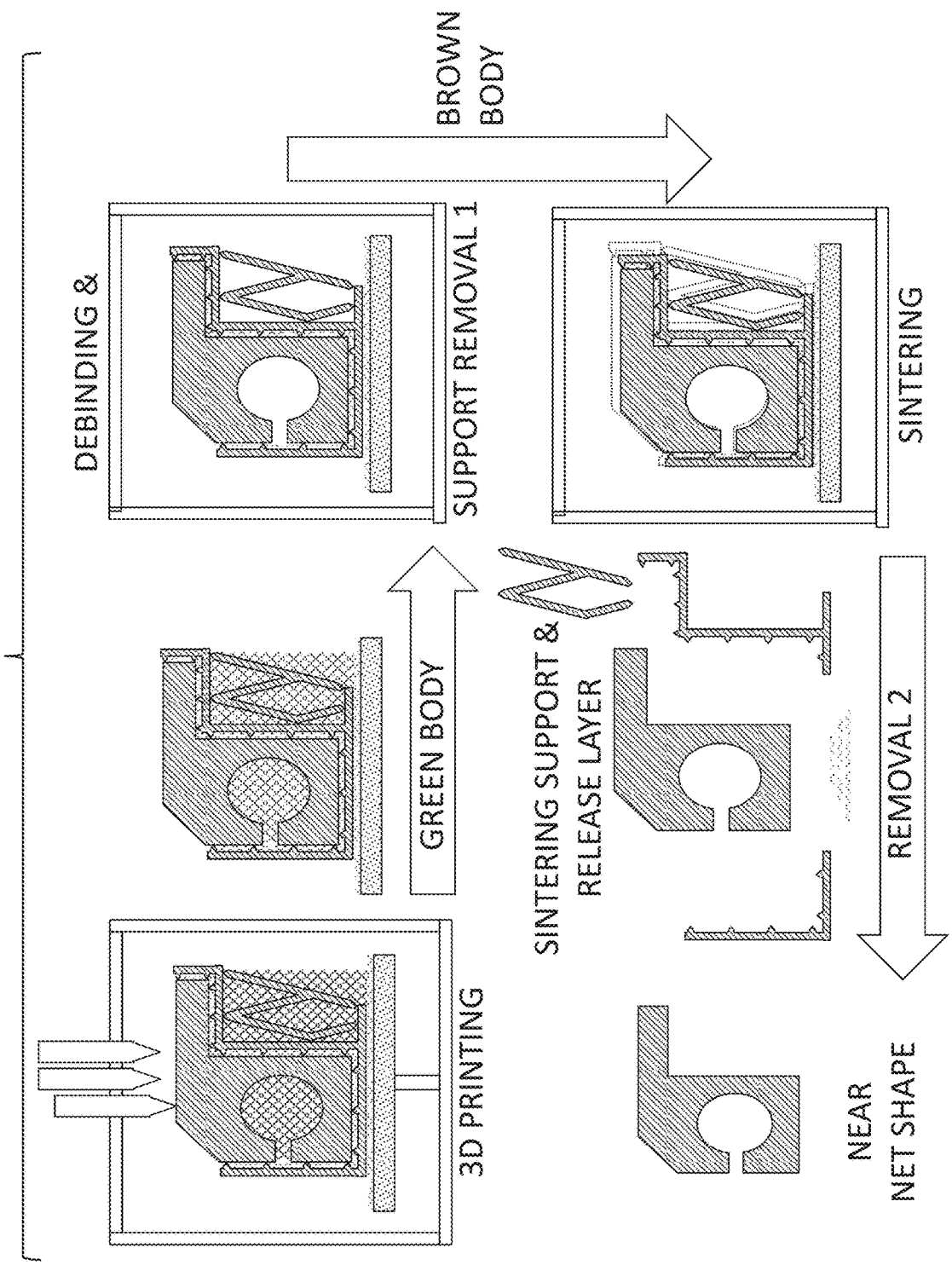
FIG. 7 is a schematic representation of one exemplary process of printing, debinding, sintering, and support removal with separation and/or release layers, green body supports and/or sintering or shrinking or densification linking supports.

As shown in FIGS. 4 and 5A, upon an optionally removable and transportable, optionally ceramic build plate 16, a raft separation layer SL1 is printed by separation material head 18-S to permit a raft or shrinking platform or densification linking platform RA1 printed above to be readily removed from the build plate 16, in some cases before debinding, or in some cases when the (e.g., portable) build plate 16 itself is still attached through the debinding process (in the example shown in FIG. 7).

As shown in FIGS. 4 and 5B, following the printing of the raft separation layer SL1, a raft or shrinking platform or densification linking platform RA1 of model material (e.g., metal-bearing composite) is printed. The raft or shrinking platform RA1 is printed, e.g., for a purpose of providing a continuous model material foundation or material interconnection among the part and its supports, so that the process of mass transport and shrinking/densification during sintering is uniformly carried out, e.g., about a common centroid or center of mass, e.g., "densification linking". The raft RA1 may serve other purposes—e.g., improving early adhesion, clearing environmentally compromised (e.g., wet, oxidized) material from an extrusion or supply path, or conditioning printing nozzles or other path elements (e.g., rollers) to a printing state, etc. As noted, two general classes of supports may be used: green body supports GS1, GS2 (which support the part being printed during the printing process, but are removed before or during sintering) and sintering (e.g., shrinking or densification linking) supports SS1, SH1, RA1 (which support the part being sintered during the sintering process). Green body support GS2 also may be used to "placehold" internal volumes, either holes or cavities in the part shape itself or internal honeycomb cavities. Some supports may serve both roles. As shown in FIGS. 4 and 5B, should an upper portion of the entire print benefit from green body supports, the lower layers of green body supports GS1 may be printed upon either the build plate 16, or as shown in FIGS. 4 and 5B, upon the separation layer SL1 and/or the raft or shrinking platform RA1.

As shown in FIGS. 4 and 5C, subsequently, the raft or shrinking platform RA1 may be continued up into or connected up to a surrounding or lateral shell support structure SH1 (either contiguously or via a parting line PL and/or physical separation structure, e.g., a pinched and/or waspwaisted and/or perforated or otherwise weakened cross-section that may be flexed to break away). Further, separation structures—in this case model material protrusions P1 as well as an optionally intervening separation layer SL2—may be printed between the raft RA1 and shell SH1 to permit the removal of the raft RA1 and shell SH1 subsequent to sintering. Protrusions P1 described herein, facing vertical, horizontal, or other direction, may be formed to be snapped by sharp or pulsed impact(s), e.g., having a contact surface cross-section of less than ½ mm. The printing of green body supports GS1 is continued upwards, in this case providing printing support to optionally angled (e.g., 10-45 degrees from vertical), sparse and/or branching sintering (e.g., shrinking or densification linking) supports SS1 printed to later provide sintering support for an overhanging or cantilevered portion OH1, as well as building up a green body support GS1 for printing support for the same overhanging or cantilevered portion OH1. "Printing support" as used herein may mean support vs. printing back pressure or gravity during printing, while "sintering support" may mean support vs. gravity, support vs. other external/internal stress during sintering, as well as or alternatively meaning providing interconnections facilitating evenly distributed mass transport and/or atomic diffusion. Although an overhanging or cantilevered portion OH1 is show in FIG. 4, an unsupported span contiguous to the part P1 at two opposing sides, may also benefit from supports as described.

As shown in FIGS. 4 and 5D, the surrounding shell support structure SH1 is continued up printing in layers, and optionally interconnected vertically or diagonally to the part 14 via, e.g., protrusions P1 of model material connected to the shell support structure SH1, and/or separation layer material SL2 material. The parting lines and separation structures similarly are continued vertically, preserving the planes along which they will be removed. An internal volume V1 in the part P1, in this case a cylindrical volume V1, is printed with green body supports GB2—if the model material is sufficiently viscous or shape-retaining during printing, the 3D printing process may bridge gaps or diagonally stack, and internal volumes with sloping walls or arch-like walls may not require sintering supports. Alternatively, the internal volume V1 is printed with sintering supports, or a combination of green body supports GB # and sintering supports SS #, e.g., as with the supports SS1 below overhang OH1. The internal volume V1 is printed with a channel to the outside of the part to permit support material to be removed, cleaned away, or more readily accessed by heat transfer or fluids or gasses used as solvents or catalysis. The green body supports GS1 and branching sintering supports SS1 are similarly continued to later provide sintering support for an overhanging or cantilevered portion OH1, as well as building up a green body support GS1 for printing support for the same overhanging or cantilevered portion OH1.

As shown in FIGS. 4 and 5D, an overhang or cantilevered portion OH1 may be supported by sintering supports SS1 at an angle, so long as the sintering supports SS1 are self-supporting during the printing process e.g., either by the inherent stiffness, viscosity, or other property of the model material as it is printed in layers stacking up at a slight offset (creating the angle), or alternatively or in addition with the lateral and vertical support provided by, e.g., the green body supports GS1. The sintering supports SS1 must also be robust to remain integral with the part 14 or supporting the part 14 through the sintering process. Any of the sintering supports SS1 shown in FIG. 5C or 5D may alternatively be vertical columns or encased by a columnar sintering support encasing structure deposited from model material.

Finally, as shown in FIG. 4, the remainder of the part 14, support shell structure SH1, sintering (e.g., shrinking or densification linking) supports SS1, and green body supports GS1, GS2 are printed to completion. As printed, essentially all portions of the part 14 which require printing or sintering support are supported in a vertical direction either via green body supports GS1, GS2, sintering (e.g., shrinking or densification linking) supports SS1, the raft RA1, separation layer SL1 and/or SL2. Portions of the part 14, or structures within the part 14 that are self-supporting (because, e.g., of the material properties of the model material composite, or external bodies providing support, and/or those which are sufficiently stiff during support removal, debinding, and/or sintering) need not be supported vs. gravity. In addition, the support structures SS1, the raft RA1, and/or the shell structure SH1 are interconnected with model material to the part 14 in a manner that tends to shrink during sintering about a same centroid or center of mass or at least maintain relative local scale with respect to the neighboring portion of the part 14. Accordingly, during the approximately 12-24% (e.g., 20%) uniform shrinking or densification of the sintering process, these support structures shrink or densify together with the part 14 and continue to provide support vs. gravity.

FIG. 6 shows a variation of the 3D printer, printing method, part structure, and materials of FIG. 4. In FIG. 6, no separate green body support deposition head 18c (or 18-G) is provided. Accordingly, green body supports GS1, GS2 and separation layers SL1, S12 are formed from the same material—e.g., the composite material used for separation layers, in which a ceramic or high-temperature metal particles or spheres are distributed in an, e.g., one-stage or two-stage debindable matrix. In this case, the green body supports GS1, GS2 are not necessarily removed during or before debinding or in a separate process, but are instead simply weakened during debinding and, as with the separation layers, have their remaining polymer material pyrolysed during sintering. The remaining ceramic powder can be cleaned out and/or removed following sintering, at the same time as the separation layers.

FIG. 7 shows one overall schematic of the process. Components in FIG. 7 correspond to those of the same appearance labeled in FIG. 4, but are not labeled in FIG. 7 so that different steps may be shown. Initially, in the 3D printing phase, the part 14, together with its green body supports GS, sintering supports SS, and separation layers SL (as described and shown in FIG. 4), is printed in a 3D printer as described. The green body, including all of these support structures (e.g., a green body assembly GBA), and optionally still bound or connected to a ceramic or other material build plate 16, is transferred to a debinding chamber (optionally, the debinding chamber is integrated in the 3D printer 1000 or vice versa). As noted, if the green body supports are made of a different polymer, binder or substance than the first stage debinding material, a separate process may remove the green body supports before debinding. If the green body supports are made from either the same or similar substances as the first stage debinding material, or one that responds to the same debinding process by decomposing or dispersing, the green body supports may be removed during debinding. Accordingly, as shown in FIG. 7, debinding includes removing a first binder component from the model material using a thermal process, a solvent process, a catalysis process, or a combination of these, leaving a porous brown body structure ("DEBINDING"), and may optionally include dissolving, melting, and/or catalyzing away the green body supports ("SUPPORT REMOVAL 1").

Continuing with FIG. 7, as shown, a brown body (e.g., a brown body assembly BBA with the attached sintering support and/or surrounding shell) is transferred to a sintering chamber or oven (optionally combined with the printer and/or debinding chamber). The brown body, e.g., as a brown body assembly BBA, includes the part, optionally a surrounding shell structure, and optionally sintering supports. As noted, the surrounding shell structure and sintering (e.g., shrinking or densification linking) supports are different aspects of sintering support structure. Optionally, intervening between the shell structure and/or sintering supports are separation layers, formed from, e.g., the separation material. Optionally, intervening between the shell structure and/or sintering supports are protrusions or ridges of model material interconnecting these to the part. Optionally, the same or a similar separation material intervenes between the brown body (e.g., as brown body assembly) and the build plate. During sintering, the brown body (e.g., as a brown body assembly) uniformly shrinks by approximately 12-24%, such as 20%, closing internal porous structures in the brown body (e.g., as a brown body assembly) by atomic diffusion. The second stage debinding component of the model material may be pyrolysed during sintering (including, for example, with the assistance of catalyzing or other reactive agents in gas or otherwise flowable form).

As shown in FIG. 7, a sintered body (e.g., as a sintered body assembly) can be removed from the sintering oven. The supporting shell structure and the sintering supports can be separated or broken up along parting lines, and/or along separation layers, and or by snapping or flexing or applying an impact to protrusion connections, tacks or other specifically mechanically weak structures. The separation layers are powderized and are readily removed. Should the green body supports be formed from the separation material, the green body supports are similarly powderized and may be readily removed.

Figure 8:
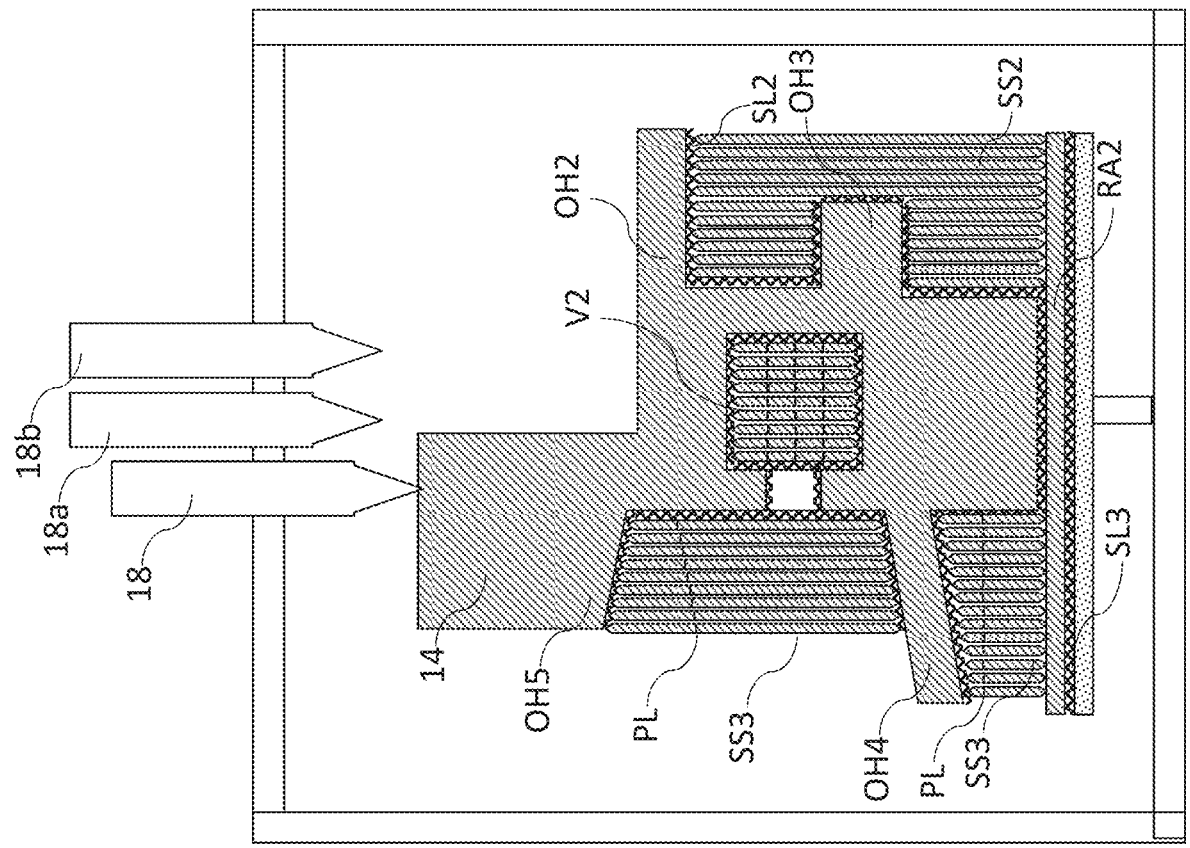
FIG. 8 is a schematic representation of an additional alternative 3D printing system, part, and process to that of FIG. 4.
Figure 12:
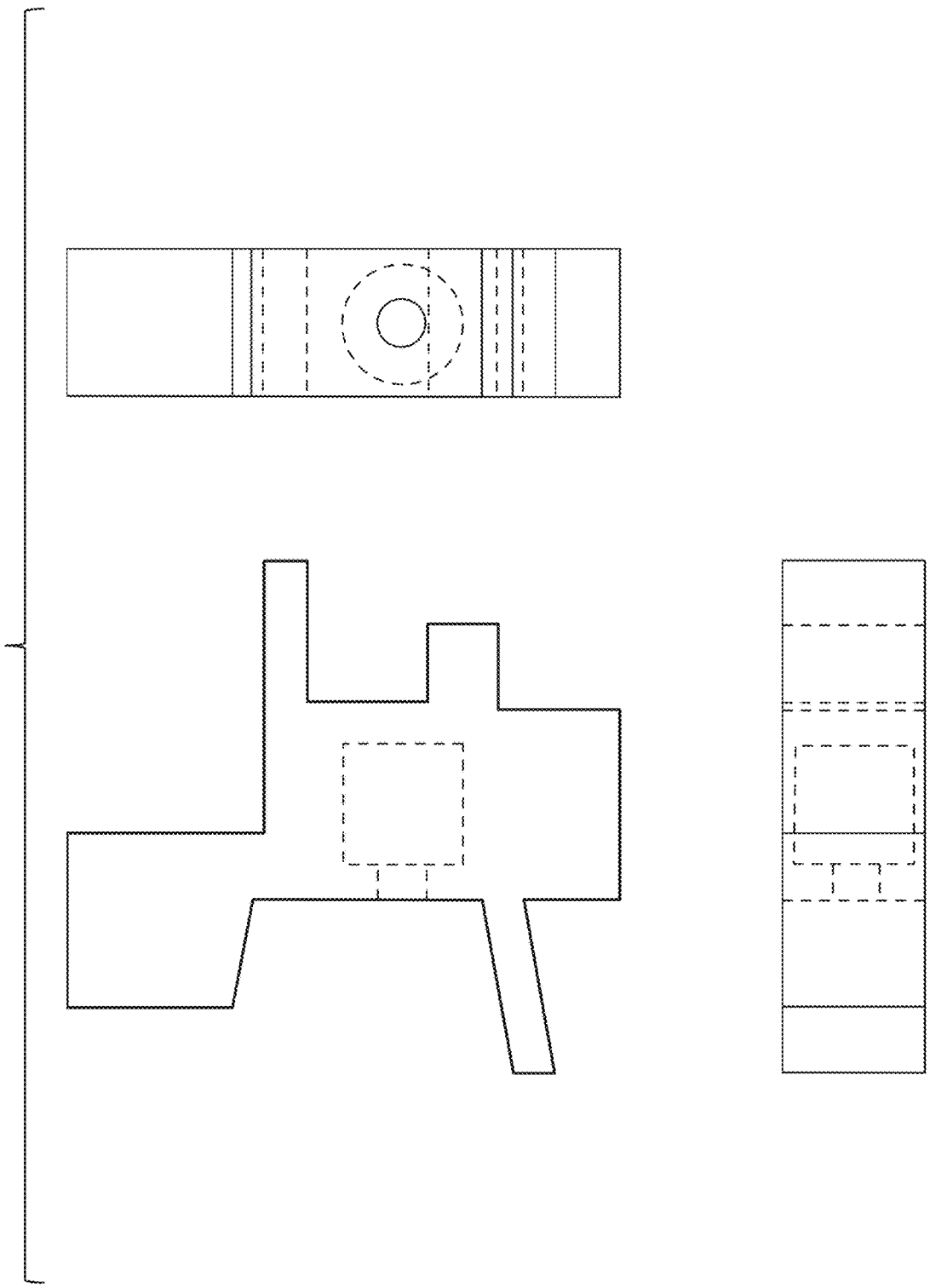
FIGS. 12 and 13 are, respectively, orthogonal and 3D/orthographic views of the part schematically depicted FIGS. 8 and 9.
Figure 13:
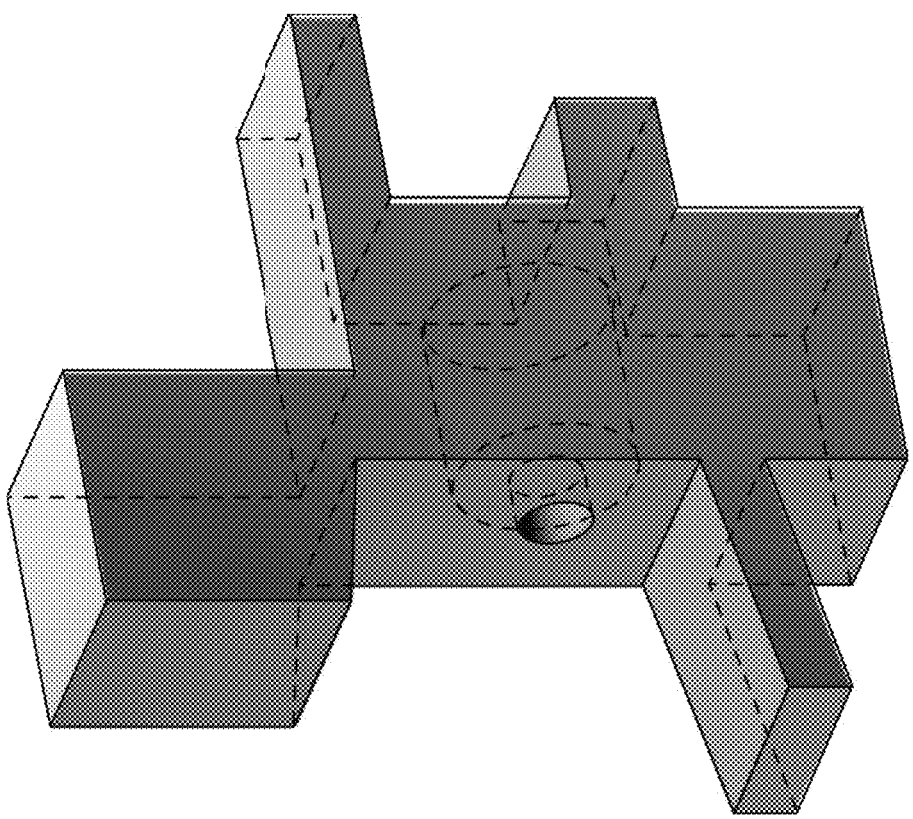

FIG. 8 shows a variation of a part printed as in FIG. 4 or FIG. 6. The part shown in FIG. 8 includes four overhanging or cantilevered sections OH2-OH5. Overhang OH2 is a lower, thicker overhang under a cantilevered, thinner overhang OH3. While the lower overhang OH2 may in some cases be printed without sintering supports or even green-body supports as a self-supporting cantilever, it is below the long cantilever overhang OH3, which is sufficiently long, thin, and heavy that it may require both green body supports and sintering supports. Overhang OH4 is a downward-leaning overhang, which generally must be printed with at least green body supports (because its lowest portion is otherwise unsupported, i.e., in free space, during printing) and in a form difficult to remove sintering supports printed beneath without drafting or parting lines (because rigid sintering supports would become locked in). Overhang OH5 is a cantilever including a heavy block of model material, which may require both green body and sintering support. In addition, the part shown in FIG. 8 includes an internal, e.g., cylindrical volume V2, from which any necessary sintering supports must be removed via a small channel. For reference, the 3D shape of the part 14 of FIG. 8 is shown in FIGS. 12 and 13.

As shown in FIG. 8, in contrast to the sintering supports SS1 of FIGS. 4 and 6, sintering (e.g., shrinking or densification linking) supports SS2, supporting overhangs OH2 and OH3, may be formed including thin walled, vertical members. These vertical members form vertical channels which, as described herein, may permit fluid flow for debinding. The vertical members of sintering supports SS2 may be independent (e.g., vertical rods or plates) or interlocked (e.g., accordion or mesh structures). As shown in FIG. 8, the sintering supports SS2 (or indeed the sintering supports SS1 of FIGS. 4 and 6, or the sintering supports SS3, SS4, and SS5 of FIG. 8) may be directly tacked (e.g., "tacked" may be contiguously printed in model material, but with relatively small cross-sectional area) to a raft RA2, to the part 14a, and/or to each other. Conversely, the sintering supports SS2 may be printed above, below, or beside a separation layer, without tacking. As shown, the sintering supports SS2 are removable from the orthogonal, concave surfaces of the part 14a.

Further, as shown in FIG. 8, similar sintering (e.g., shrinking or densification linking) supports SS3 are printed beneath the downward-leaning overhang OH4, and beneath heavier overhang OH5. In order that these supports SS3, may be readily removed, some or all are printed with a parting line PL, e.g., formed from separation material, and/or formed from a mechanically weakened separation structure (e.g., printing with a nearly or barely abutting clearance as described herein, or printing with a wasp-waisted, pinched, or perforated cross-section, or the like), or a combination of these (or, optionally, a combination of one or both of these with green body support material having little or no ceramic or metal content, should this be separately printed). These material or mechanical separation structures, facilitating removal of the sintering supports, may be similarly printed into the various sintering supports shown in FIGS. 4-7, 9, and throughout.

In addition, as shown in FIG. 8, sintering (e.g., shrinking or densification linking) supports SS5 are printed within the internal volume V2. The sintering supports SS5 are each provided with multiple parting lines, e.g., printed in a plurality of separable segments, so that the sintering supports in this case can be broken or fall apart into parts sufficiently small to be readily removed, via the channel connecting the internal volume V2. As shown, the channel CH2 itself is not printed with internal supports, as an example of a small-diameter hole of sufficient rigidity during both printing and sintering to hold its shape. Of course, supports may be printed of either or both types in channel CH2 to ensure shape retention.

Figure 9:
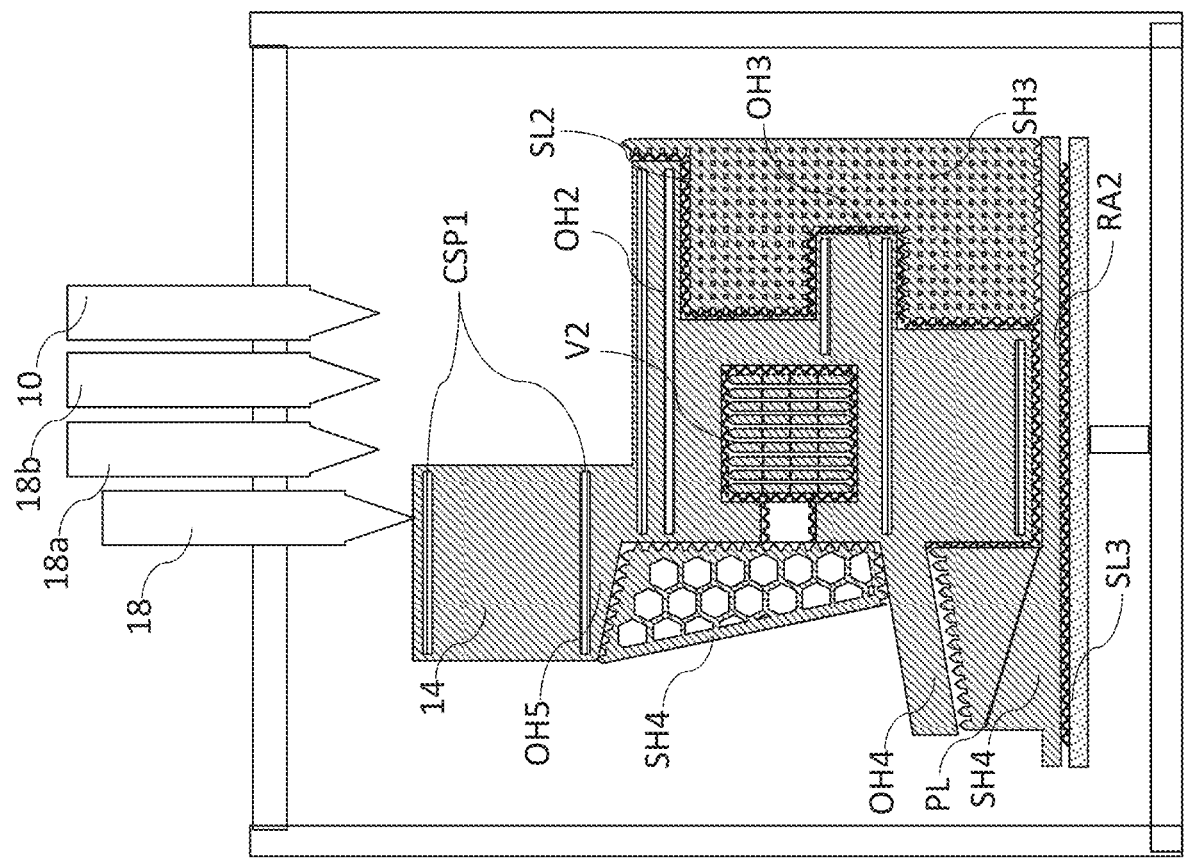
FIG. 9 is a schematic representation of an additional alternative 3D printing system, part, and process to that of FIG. 4.

FIG. 9 is substantially similar to FIG. 8, but shows some variations in structure. Both variations in printing with and without reinforcement are shown, e.g., while FIG. 9 shows reinforcement structures CSP1 therein, the remaining variant structures in the solid bodies, supports, and separation layers of FIG. 9 are optionally applicable to the non-reinforced structures of FIG. 8 and throughout. For example, beneath overhang OH3, a monolithic, form-fitting shell SH3 is printed of model material, separated from the part 14 by either release or separation layers SL2 and/or protrusions P1. The monolithic shell SH3 has small open cell holes throughout to lower weight, save material, and improve penetration or diffusion of gases or liquids for debinding. As discussed herein, open cell holes may optionally be connected to access and/or distribution channels for debinding fluid penetration and draining, e.g., any of the structures of FIGS. 25-31 may form, be formed by or be combined with the open cell holes. This shell SH3 may surround the part 14 if sufficient parting lines or release layers are printed into the shell SH3 (e.g., instead of the structures SH4 and SH5 to the left of the drawing, a similar structure would be arranged), and if sufficiently form following, act as a workholding piece.

In another example in FIG. 9, monolithic (e.g., lateral) support (e.g., shrinking or densification linking) shell SH4 is printed integral with the raft RA2, but with a parting line PL angled to draft and permit removal of the support shell SH4. In a further example shown in FIG. 9, support shell SH4 is printed angled upward (to save material) and with a large cell or honeycomb interior to lower weight, save material, and/or improve penetration or diffusion of gases or liquids for debinding. FIG. 9 also shows examples of continuous fiber layers deposited by, e.g., continuous fiber head 10. Sandwich-panel reinforcement layers CSP1 are positioned at various layers, e.g., within upper and lower bounds of overhangs OH2, OH3, and OH5.

As shown in FIGS. 4 through 9, sintering supports SS1, SS2, SS3 may be formed in blocks or segments with at least some intervening release layer material, so as to come apart during removal. In any of these Figures and throughout, supports may be tacked or untacked. "Untacked" sintering supports may be formed from the model material, i.e., the same composite material as the part, but separated from the part to be printed by a release layer, e.g., a higher temperature composite having the same or similar binding materials. For example, for most metal printing, the release layer may be formed from a high temperature ceramic composite with the same binding waxes, polymers, or other materials. The release layer may be very thin, e.g., one 3D printing layer. When the metal is sintered, the release layer—having already had a first stage binder removed—is essentially powderized as the temperature is insufficient to sinter or diffusion bond the ceramic material. This enables the untacked sintering supports to be easily removed after sintering.

"Tacked" sintering supports, in contrast, may be similarly formed from the model material, i.e., the same composite material as the part, but may connect to the part either by penetrating the release layer or without a release layer. The tacked sintering supports are printed to be contiguous with the part, via thin connections, i.e., "tacked" at least to the part. The tacked sintering supports may in the alternative, or in addition, be printed to be contiguous with a raft below the part that interconnects the part and the supports with model material. The raft may be separated from a build plate of a 3D printer by a layer or layers of release layer material.

A role of tacked and untacked sintering supports is to provide sufficient supporting points versus gravity to prevent, or in some cases remediate, sagging or bowing of bridging, spanning, or overhanging part material due to gravity. The untacked and tacked sintering supports are both useful. Brown bodies, in the sintering process, may shrink by atomic diffusion, e.g., uniformly about the center of mass or centroid of the part. In metal sintering and some ceramics, typically this is at least in part solid-state atomic diffusion. While there may be some cases where diffusion-based mass transport among the many interconnected metal/ceramic spheres does not transport sufficient material to, e.g., maintain a very thin bridge joining large masses, this is not necessarily the case with supports, which may be contiguously formed connected at only one end as a one-ended bridge (or connected at two ends as two-ended bridges; or interconnected over the length).

In those cases where tacked sintering supports are tacked to, or connected to, or linked to, a model material raft or shrinking platform or densification linking platform upon which the part is printed, the interconnection of model material among the tacked sintering supports and the raft can be arranged such that the centroid of the raft-supports contiguous body is at or near the same point in space as that of the part, such that the part and the raft-support contiguous to the part each shrink during sintering uniformly and without relative movement that would move the supports excessively with respect to the part. In other cases, the part itself may also be tacked to the model material raft, such that the entire contiguous body shrinks about a common centroid. In another variation, the part is interconnected to the raft via tacked sintering supports tacked at both ends (e.g., to the raft and to the part) or and/along their length (e.g., to the part and/or to each other).

In other cases, untacked sintering supports may be confined within a volume and contiguous with the raft and/or the part, the volume formed from model material, such that they may shrink about their own centroids (or interconnected centroid) but are continually moved through space and kept in a position supporting the part by the surrounding model material. For example, this may be effective in the case of the internal volume V2 of FIG. 8 or 9.

In the alternative, or in addition, support or support structures or shells may be formed from model material following the form of the part in a lateral direction with respect to gravity, e.g., as shown in certain cases in FIGS. 4-9. The model material shells may be printed tacked to the base raft (which may be tacked to the part). They may be printed integral with, but separable from the base raft. The base raft may be separable together with the model material shells. These support structures may be offset from or substantially follow the lateral outer contours of the part, or may be formed from primitive shapes (straight or curved walls) but close to the part. In one variation, the support structures may envelop the part on all sides (in many cases, including parting lines and/or separation structures to permit the shell to be removed). These offset support structures may be printed with a separation layer or layers of the separation material (optionally ceramic or another material that will transfer mechanical support but will not be difficult to separate).

Any of the support structures discussed herein—e.g., tacked or untacked sintering supports, and/or support shells, may be printed with, instead of or in addition to intervening separation material, a separation clearance or gap (e.g., 5-100 microns) between the part and support structure (both being formed from model material). In this manner, individual particles or spheres of the support structure may intermittently contact the part during sintering, but as the separation clearance or gap is preserved in most locations, the support structures are not printed with compacted, intimate support with the part. When and if bonding diffusion occurs at intermittently contacting particles, the separation force required to remove the separation clearance support structures after sintering may be "snap-away" or "tap-away", and in any case far lower than an integral or contiguous extension of the part. Larger separation clearances or gaps (e.g., 200-300 microns) may permit debinding fluid to penetrate and/or drain.

In an alternative, separation gaps or clearances between the part and support structures may be placed in partial segments following the contour, with some of the remainder of the support structures following the e.g., lateral contour of the part more closely or more distantly, or both. For example, support structures may be printed with a small separation gap (5-100 microns) for the majority of the support structure, but with other sections partially substantially following the contour printed yet closer to the part (e.g., 1-20 microns) providing increased rigidity and support during sintering, yet generally over a set of limited contact areas (e.g., less than 5% of contact area), permitting removal. This may also be carried out with large and medium gaps (e.g., 100-300 microns separation for the larger clearance support structures, optionally with separation material intervening, and 5-100 microns for the more closely following support structures). Further, this may be carried out in three or more levels (e.g., 100-300 micron gaps, 5-100 micron gaps, and 1-20 micron gaps in different portions of the support structures following the contour of the part).

Optionally, the sintering support structures may include a following shell with an inner surface generally offset from the e.g., lateral part contour by a larger (e.g., 5-300 microns) gap or clearance, but will have protrusions or raised ridges extending into the gap or clearance to and separated by the smaller gap (e.g., 1-20 microns), or extending across the gap or clearance, to enable small point contacts between the part and support structures formed from the same (or similar) model material. Point contacts may be easier to break off after sintering than compacted, intimate contact of, e.g., a following contour shell. Optionally, a neat matrix (e.g., green body supports formed from one or more of the binder components) support structure may be printed between model material (e.g., metal) parts and model material (e.g., metal) support structures to maintain the shape of the part and structural integrity during the green and brown states, reducing the chance of cracking or destruction in handling.

Figure 10:
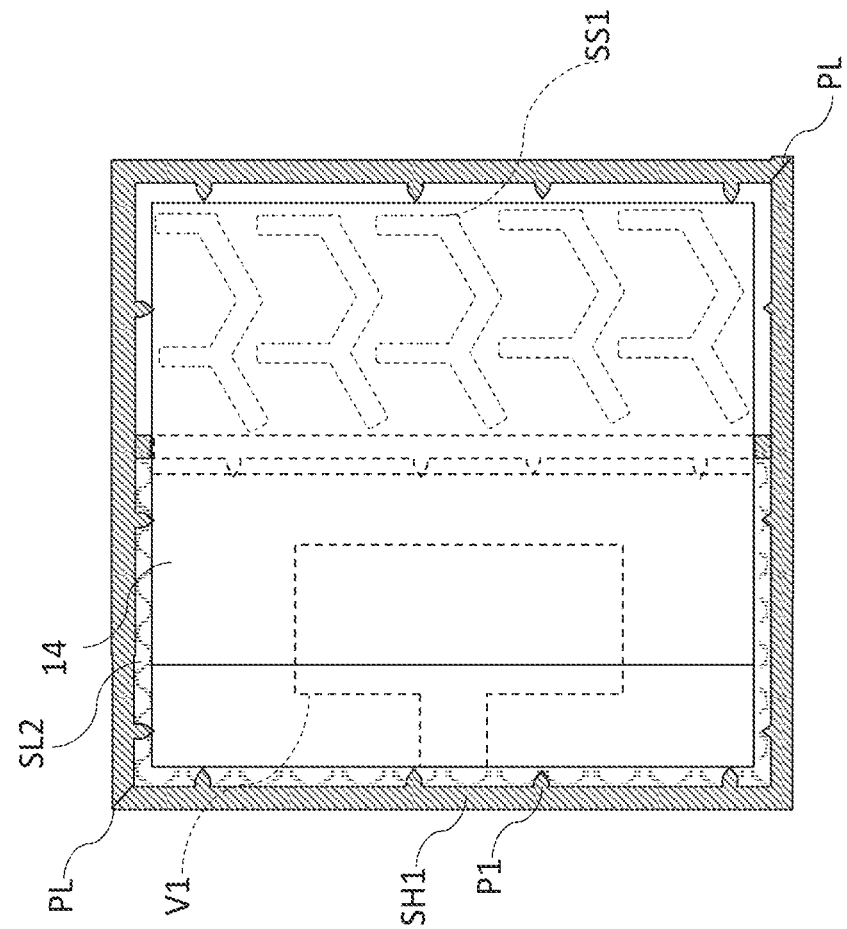
FIG. 10 is a top view of a sintered assembly of the 3D printing system, part, and process of FIG. 4, showing parting lines for removing support shells or sintering or shrinking supports.
Figure 11:
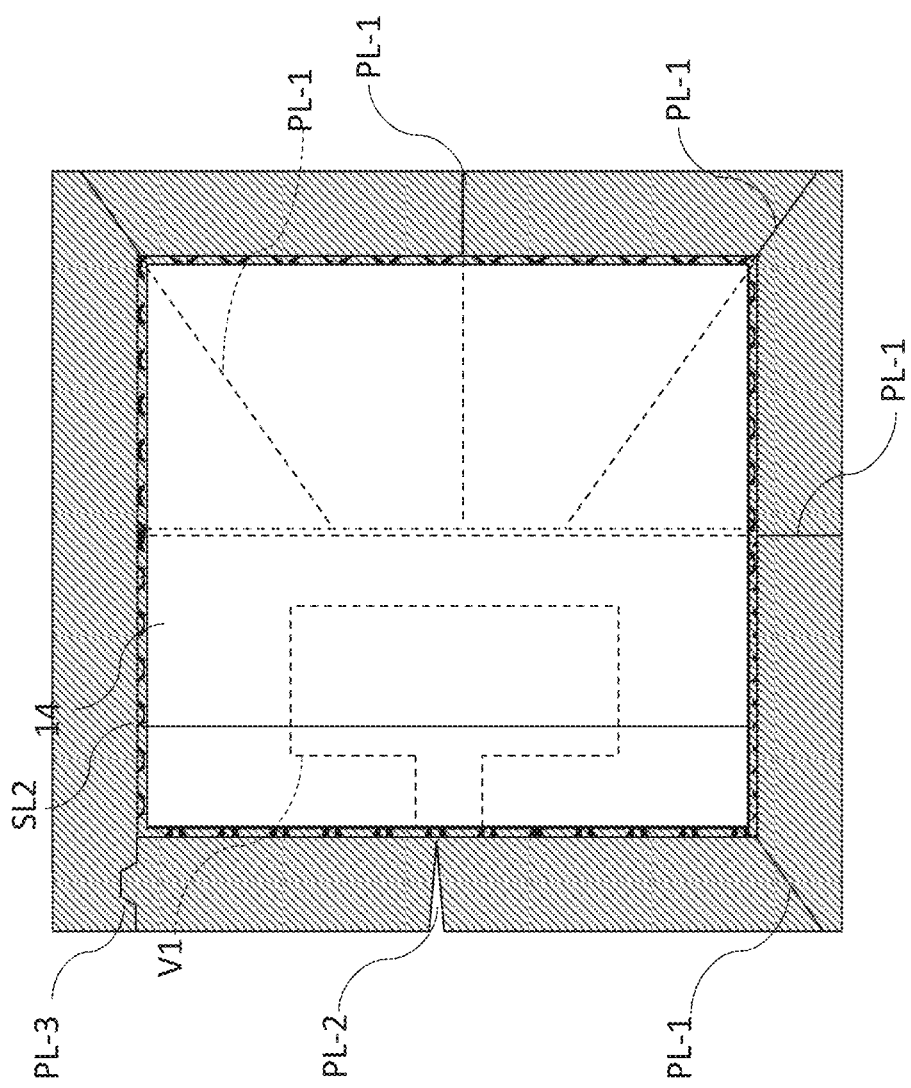
FIG. 11 is a top view of a sintered assembly of an alternative 3D printing system, part, and process to that of FIG. 4, showing parting lines for removing support shells or sintering or shrinking supports.

While several of the Figures are shown in side, cross section view, FIG. 10 shows the sintered body structure of FIG. 4 in top views, while FIG. 11 shows a variation for the purpose of explanation. As shown, support shells or other structures may be printed with separation or parting lines or layers between portions of the support structure. The separation or parting lines or layers may be any separation structure described herein, including those described between the part and support structure. For example, the separation lines or layer permitting a support shell to be broken into two or more parts (optionally many parts) may be formed from separation material (e.g., ceramic and binder), from binder material, from model material (e.g., metal) with separation gaps (such as 1-20, 5-100, or 50-300 microns) and/or protrusions or ridges permitting snap-off structures. For example, a support structure or shell may be formed to be split in two halves (e.g., as in FIG. 10), creating a parting line in the support structure or shell. Parting lines are optionally printed to be contiguous within a plane intersecting (e.g., bisecting) a support shell structure so as to permit ready separation. Multiple planes of parting lines may intersect the support shell structure. A "parting line", "parting surface", and "parting plane" are used herein similarly to the context in injection molding—the plane along which one structure separates from another, for generally a similar reason—permitting the part-surrounding structures to be removed without interference with or entrapment in the part. While in the context of injection molding these terms refer to the plane along which mold halves separate, in the present disclosure the term "parting" line, surface, or structure refers to the plane along which support structures supporting or enveloping a part may break or segment or separate from one another.

In the case of complex geometries, as noted above, support structures may be printed with parting lines, sectioned into smaller subsections (e.g., as PL-1 in FIG. 11, like orange slices, or further sectioned in an orthogonal axis such that they can be easily removed), as shown in FIG. 11. For example, if support structures are printed filling in a dovetail of a part, support structures could be formed in three parts, e.g., could be designed in three parts, such that the center part either has draft or is rectangular and can be easily removed, thereby freeing up the two side parts to slide inward and then be removed. Conversely, parting lines may be printed to be interlocking (e.g., PL-3 in FIG. 11), crenellated or formed as a box joint (e.g., similar to PL-3 in FIG.

11), so as to resist separation, in some cases other than in a transverse direction. Parting lines may be printed nearly almost cut through the support shell (e.g., PL-2 in FIG. 11). Note that FIG. 11 is depicted without protrusions P1, i.e., with only separation layers SL2 in the vertical direction, and largely monolithic, surrounding support shell SH.

In some cases, particularly in the case of a small number of parting lines (e.g., halves, thirds, quarters) the support structures, at least because they are form following structures, may be preserved for later use as a workholding fixture, e.g. soft jaws, for holding a sintered part in secondary operations (such as machining). For example, if a support structure were to support a generally spherical part, a support structure suitable for later use as a workholding jaw or soft jaw, the structure should retain the part from all sides, and therefore extend past the center or half-way point of the sphere. For the purposes of sintering and supporting vs. gravity, the support structure need not extend past the halfway point (or slightly before), but for the purposes of subsequent workholding for inspection and post processing, the support structure would continue past the half way point (e.g. up to ⅔ of the part's height, and in some cases overhanging the part) enabling positive grip in, e.g., a vise.

Further, attachment features to hold the workholding fixture(s) or soft jaw(s) in a vise (or other holder) may be added to the support structure for the purpose of post processing, e.g., through holes for attachment to a vise, or dovetails, or the like. Alternatively, or in addition, a ceramic support may be printed, and sintered, to act as a reusable support for the sintering step of many 3D printed parts. In this case, upwardly facing surfaces of the reusable support may be printed to shrink to the same height as the matching or facing surface of the part being supported.

As discussed herein, a feedstock material for forming the part and/or the sintering supports may include approximately 50-70% (preferably approx. 60-65%) volume fraction secondary matrix material, e.g., (ceramic or metal) substantially spherical beads or powder in 10-50 micron diameter size, approximately 20-30% (preferably approx. 25% volume fraction of soluble or catalysable binder, (preferably solid at room temperature), approximately 5-10% (preferably approx. 7-9%) volume fraction of pyrolysable binder or primary matrix material, (preferably solid at room temperature), as well as approximately 0.1-15% (preferably approx. 5-10%) volume fraction of carbon fiber strands, each fiber strand coated with a metal that does not react with carbon at sintering temperatures or below (e.g., nickel, titanium boride). As discussed herein, the "primary matrix" is the polymer binder and is deposited by the 3D printer, holding the "secondary matrix" beads or spheres and the fiber filler; and following sintering, the (ceramic or metal) material of the beads or spheres becomes the matrix, holding the fiber filler.

Alternatively, a feedstock material for forming the part and/or the sintering supports may include approximately 50-70% (preferably approx. 60-65%) volume fraction secondary matrix material, e.g., (ceramic or metal) substantially spherical beads or powder in 10-50 micron diameter size, approximately 20-30% (preferably approx. 25% volume fraction of soluble or catalysable binder, (preferably solid at room temperature), approximately 5-10% (preferably approx. 7-9%) volume fraction of a pyrolysable binder or secondary matrix material approximately 1/10-1/200 the elastic modulus of the (ceramic or metal) secondary matrix material, and approximately 0.1-15% (preferably approx. 5-10%) volume fraction of particle or fiber filler of a material approximately 2-10 times the elastic modulus of the secondary, (metal or ceramic) matrix material. As discussed herein, the "primary matrix" is the polymer binder and is deposited by the 3D printer, holding the "secondary matrix" beads or spheres and the fiber filler; and following sintering, the (ceramic or metal) material of the beads or spheres becomes the matrix, holding the particle of fiber filler.

A comparison of elastic modulus may be found in the following table, with polymer/binder primary matrices of 1-5 GPa elastic modulus

| Secondary matrix | Elastic Modulus ($10^9$ N/m², GPa) | Fill | Elastic Modulus ($10^9$ N/m², GPa) |
| --- | --- | --- | --- |
| Steel | 180-200 | Carbon Fiber | 200-600 |
| Aluminum | 69 | Graphite Fiber | 200-600 |
| Copper | 117 | Boron Nitride | 100-400 |
| Titanium | 110 | Boron Carbide | 450 |
| Alumina | 215 | Silicon Carbide | 450 |
| Cobalt | 209 | Alumina | 215 |
| Bronze | 96-120 | Diamond | 1220 |
| | | Tungsten Carbide | 450-650 |
| | | Graphene | 1000 |
| | | Carbon Nanotube | 1000+ |

The spheres, beads or powder (e.g., particulate) may be a range of sizes. A binder may include dispersant, stabilizer, plasticizer, and/or inter-molecular lubricant additive(s). Some candidate secondary matrix-filler combinations that may be deposited by a 3D printer within a binder or polymer primary matrix include cobalt or bronze beads with tungsten carbide coated graphite (carbon) fibers; aluminum beads with graphite (carbon) fibers; steel beads with boron nitride fibers; aluminum beads with boron carbide fibers; aluminum beads with nickel coated carbon fibers; alumina beads with carbon fibers; titanium beads with silicon carbide fibers; copper beads with aluminum oxide particles (and carbon fibers); copper-silver alloy beads with diamond particles. Those fibers that may be printed via the techniques of the CFF Patent Applications may also be embedded as continuous fibers. Carbon forms for particles or fibers include carbon nanotubes, carbon blacks, short/medium/long carbon fibers, graphite flakes, platelets, graphene, carbon onions, astralenes, etc.

Some soluble-pyrolysable binder combinations include polyethylene glycol (PEG) and polymethyl methacrylate (PMMA) (stearic acid optional, PMMA in emulsion form optional); waxes (carnauba, bees wax, paraffin) mixed with steatite and/or polyethylene (PE); PEG, polyvinylbutyral (PVB) and stearic acid. Some pyrolysable second stage binders include: polyolefin resins polypropylene (PP), high-density polyethylene (HDPE); linear low-density polyethylene (LLDPE), and polyoxymethylene copolymer (POM). As noted, in thermal debinding, a part containing binder is heated at a given rate under controlled atmosphere. The binder decomposes by thermal cracking in small molecules that are sweep away by the gas leaving the oven. In solvent debinding, a part containing binder is subject to dissolving the binder in appropriate solvent, e.g., acetone or heptane. In catalytic debinding, the part is brought into contact with an atmosphere that contains a gaseous catalyst that accelerates cracking of the binder, which can be carried away.

Figure 14:
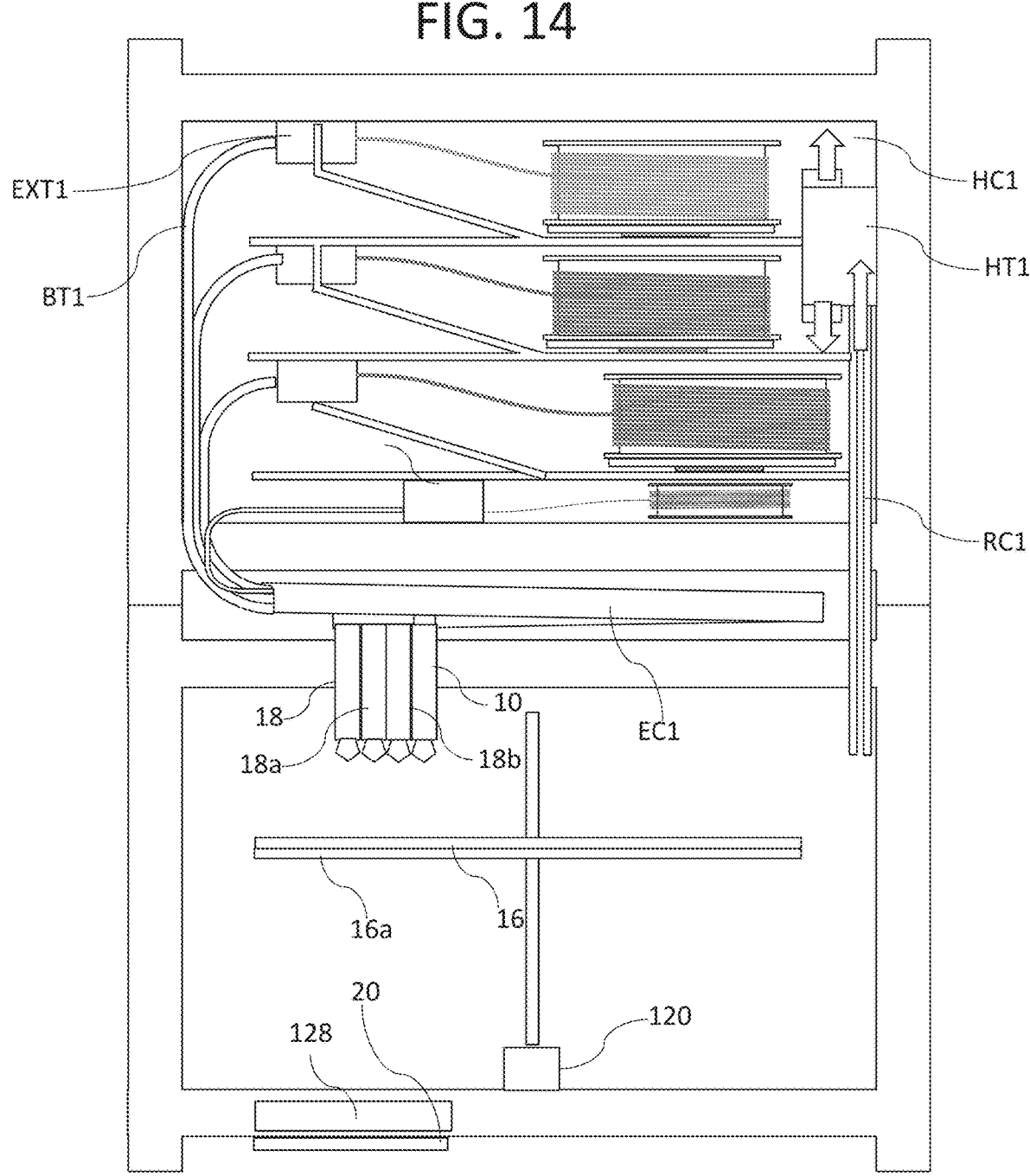
FIGS. 14-16 are schematic views of a 3D printer in which filament materials are configured in environmental conditions suitable for printing.
Figure 17:
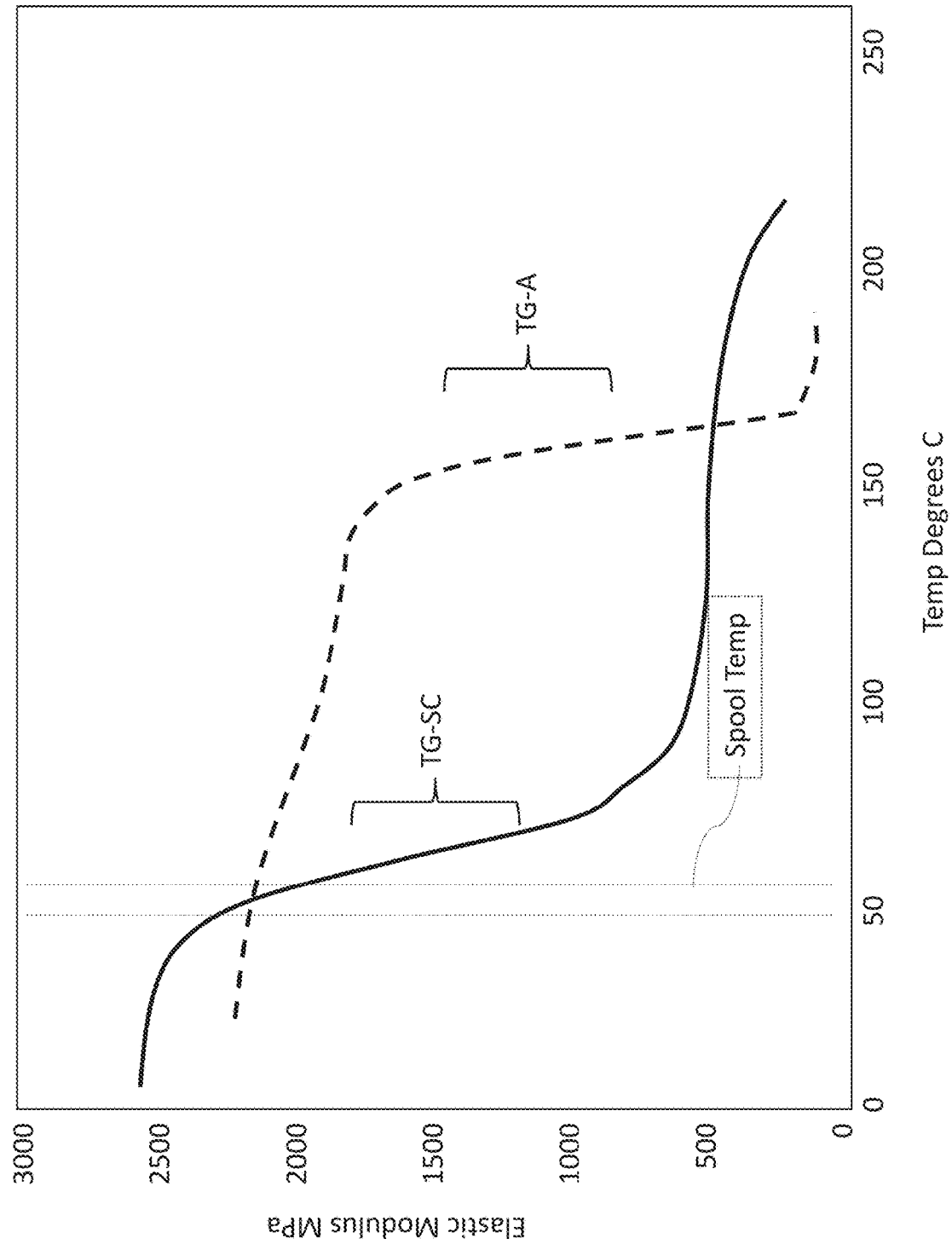
FIG. 17 is a depiction of elastic modulus vs. temperature showing an appropriate range for maintaining a sinterable additive manufacturing feedstock in a filament to permit spooling and transportation.

FIG. 14 is a schematic view of a 3D printer in which filament materials are configured in environmental conditions suitable for printing. When binder materials include at least polymer materials and/or waxes, the behavior of the polymers and/or waxes for the purposes of feeding and back pressure during printing may be temperature dependent, even at room temperature (e.g., 20 degrees C.) and mildly elevated operating temperatures (e.g., above 20 degrees C. but below 80 degrees C.). With increasing temperature, stiffness decreases and ductility increases. When temperature increases to approach a softening or glass transition temperature, elastic modulus changes at a higher rate. For an amorphous polymer, the elastic modulus and load-bearing ability becomes negligible above the glass transition temperature TG-A (as shown in FIG. 17). For a semi-crystalline material, a small amount (e.g., ⅓-¹/₁₀ of elastic modulus below Tg) of stiffness or elastic modulus may remain mildly above the glass transition temperature TG-SC (shown in FIG. 17), continuing to decrease to the melting point. Binder materials—whether polymer or wax or both—may have more than one component, and one or more glass transition temperatures or melting temperatures, and a glass transition temperature Tg marks a significant softening. FIG. 17 shows one possible spool temperature span for one possible polymer or wax component such as the softening materials discussed herein. However, it should be noted that the particular position on this curve relative to the noted glass transition temperature TG of a component is less important than the feeding behavior of the filament as a whole—the filament should be softened from any brittle state sufficiently to be pulled or drawn off the spool without breaking, yet hard enough to be fed by an extruder, and sufficiently pliable to be bent repeatedly within the Bowden tubes BT1 and, e.g., cable carrier EC1.

In a composite material including >50% metal or ceramic spheres, as well as a two stage binder, advantageous mechanical properties for 3D printing, debinding and sintering (including melt viscosity, catalytic behavior and the like) may result in a printing material that—while having properties suitable or advantageous for other parts of the process, may be claylike and/or brittle at room temperature, even though the material becomes suitably fluidized but also suitably viscous and self-supporting for 3D printing when at a printing temperature (above one or more glass transition temperatures or melting temperatures of the material).

Figure 15:
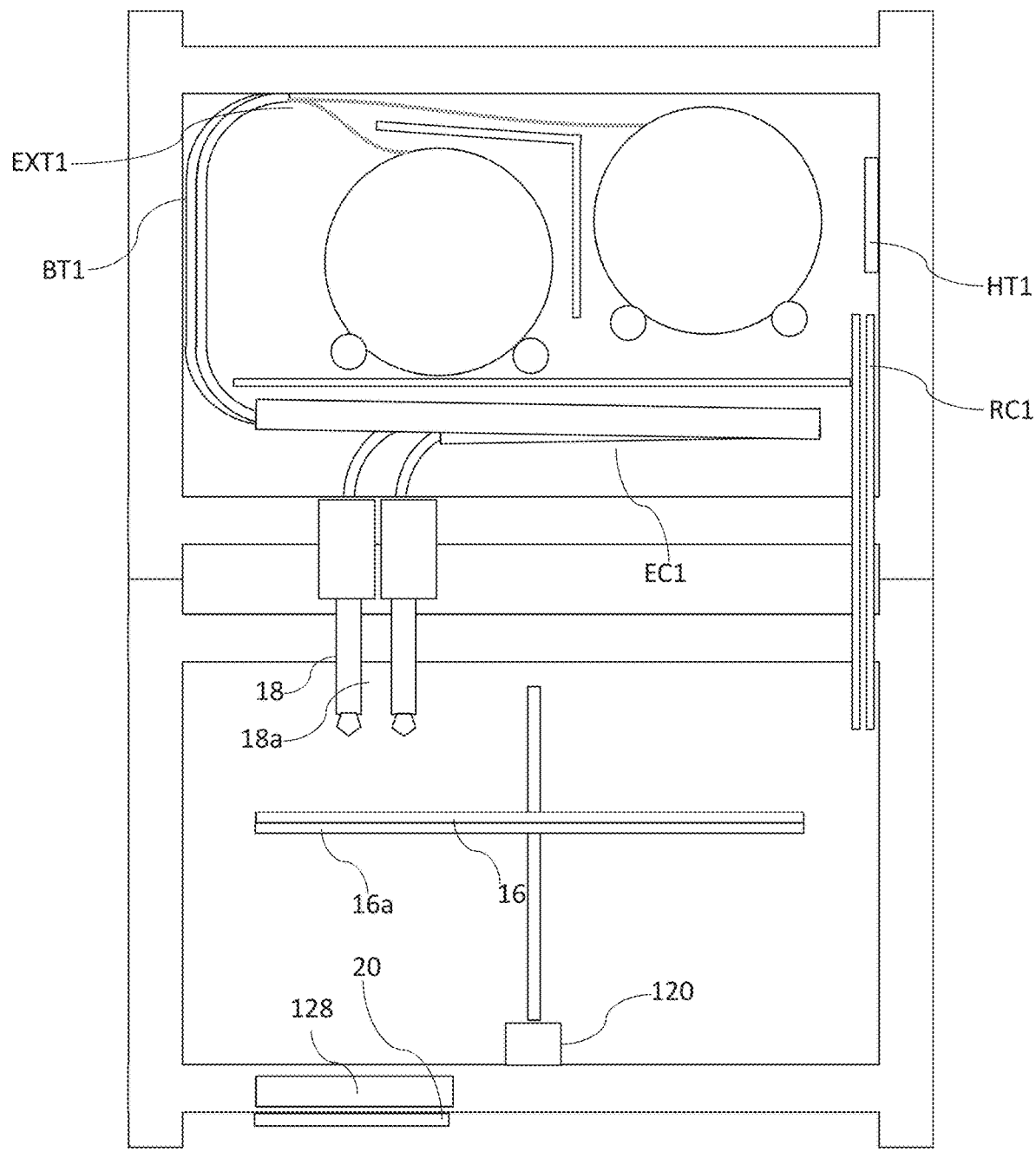
Figure 16:
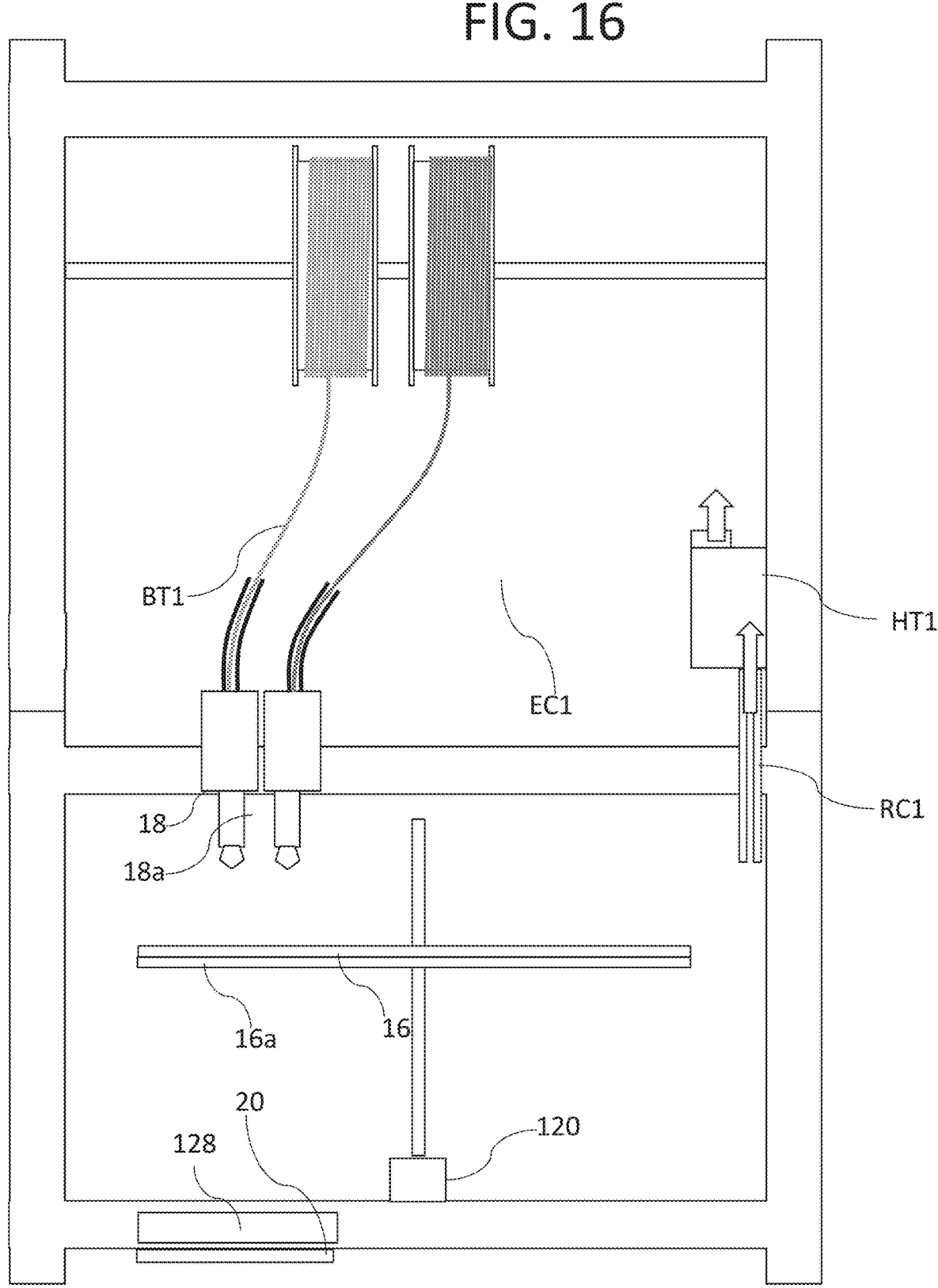

Suitable structures for handling materials brittle at room temperature are shown in FIGS. 14-16, 3D printers schematically depicted and otherwise constructed similarly to FIGS. 1-9. FIGS. 14 and 15 accept spools of model material and/or release material (as discussed herein, composite material that may be sintered after debinding, or, for release material, that contains high temperature particles or spheres that resist being turned into powder when a binder portion is pyrolysed during sintering) that were wound at a temperature higher than room temperature but less than a glass transition temperature of a binder material, e.g., 50-55 degrees Celsius, for example with an approximately 1.75 mm diameter filament. Optionally, the temperature is comparable to the glass transition or softening temperature of a wax component of the model material, but lower than the glass transition or softening temperature of a polymer component. As shown in FIGS. 14 and 16, two upper spools include the model material and the release material, and these are each in a joint heated chamber (HC1) heated by a heater HT1. The heater HT1 keeps the spools at the 50-55 degrees Celsius contemplated by this example, for example with an approximately 1.75 mm diameter filament. The build plate 16 may be heated by a build plate heater 16*a*, which maintains roughly a similar temperature (e.g., 50-55 degrees Celsius) during printing, and also helps maintains the temperature within the printing compartment at a level above room temperature. A smaller diameter filament may be softened sufficient for bending and feeding at a lower temperature (e.g., for a 1 mm filament, 40-45 degrees may be employed).

Each spool/material may be kept in its own independent chamber rather than the joint chamber HC1, and each may be heated by its own heater rather than the joint heater HT1. Heater HT1 may be a passive, e.g., radiant and convection heater, or include a blower. As shown in FIGS. 14-16, if a return channel RC1 permits air to be drawn into the heated chamber HC1 from the printing compartment, the blower-type heater may keep the heated chamber HC1 at a comparative positive pressure. If the heated chamber HC1 is sufficiently sealed except for the return channel RC1 as an inlet and the filament outlets and Bowden tubes BT1 downstream from the driving "extruders" EXT1 (e.g., rubber-wheeled filament drive systems), the heated air within the heated chamber HC1 may be driven through the Bowden tubes BT surrounding the driven filaments to maintain the temperature at an elevated level as the warmed filament is moved through the Bowden tubes and, in some cases, flexed during printing. At least the driven air and the heater 16*a* heating the build plate may maintain the printing compartment and the air returned via channel RC1 at a higher than room temperature level (and reduce energy consumption). In order that the bending radius of the Bowden tubes, and therefore the filament inside, are kept controlled, a segmented cable carrier (e.g., energy chain) that maintains a minimum bending radius EC1 may house the Bowden tubes.

FIGS. 14-16 differ in the orientation of the spools and the driving system of the filament. In FIG. 14, spools are horizontally arranged on a lazy-susan type holder that permits rotation, and the filament drivers (including their, e.g., elastomer drive wheels) are arranged at a convenient location mid-way between the spools and the Bowden tubes. This mid-drive arrangement is suitable if the filament is not softened to an elastomer range in the heating chamber HC1. In FIG. 15, the spools are vertically arranged in a rotating spool holder (e.g., on rollers), and the filament drivers or "extruders" (including their driving wheels, e.g., of elastomer) are arranged directly upstream of the melt chamber in the respective nozzles 18, 18*a*. This direct drive arrangement is suitable for softer as well as stiffer filaments. In FIG. 16, the spools are vertically arranged on an axle, and the filament, and the filament drivers or "extruders" (including their driving wheels, e.g., of elastomer) are arranged directly upstream of the melt chamber in the respective nozzles 18, 18*a*. Moreover, in FIG. 16, the heated chamber is a large volume, and the filament is dropped substantially directly down to the moving printing heads 18, 18*a* so as to have a large bend radius in all bends of the filament (e.g., as shown, no bend more of smaller than a 10 cm bend radius, or, e.g., no bend radius substantially smaller than that of the spool radius). Bowden tubes guide the filaments for part of the height leading up to the spools.

In one alternative embodiment, rather than debinding an entire part after printing, at least a portion of the debinding is performed while or after printing layers of the part and/or supports. As discussed herein, debinding may be performed by solvent, heating and/or applying vacuum evaporation or sublimation, catalysis, or other means of removing or decomposing a binder, in each case removing at least a part of the matrix material for subsequent processes such as sintering. It may be more advantageous to debind less than a layer at a time (e.g., with a directed debinding head optionally travelling with the print head) or a layer, a few layers, or several layers at a time (e.g., with a full-enclosure debinding system or a region-at-a-time or scannable debinding system).

Full part molding technologies using debinding, in contrast to additive or 3D printing technologies, necessarily apply debinding processes to a full molded part. As discussed herein, full part debinding is similarly useful for additive or 3D printed parts as well, and may offer advantages versus molded parts in the case of additive or 3D printed parts (e.g., weight may be reduced and/or debinding accelerated when internal honeycomb, access channels, open cells, and other debinding acceleration structures are printed).

In contrast, layer-by-layer debinding (e.g., not limited to one layer at a time—continuous debinding while printing, or debinding part of a layer at a time, or debinding a set of layers are each possible) may have unique advantages in the case of 3D printed or additive technologies. As with molding, a purpose of a first stage binder in the case of extrusion 3D printing (e.g., using spooled or coiled filament, spooled or foldable tapes, or feedable rods) is delivery of the sinterable powder into the desired shape, while a purpose of a second stage binder is adhesion and shape retention in the brown part versus gravity and system/process forces. After delivery, the first stage binder need only be retained so long as is necessary or useful for adhesion and shape retention versus these forces. In the case of molding, this would be at least until after the green part is formed, and in most cases until after the green part is removed from the mold. In the case of 3D printing, depending on the debinding system and binder material properties, the binder can be removed substantially immediately after deposition (e.g., if some first stage binder remains, and/or a second stage binder or other component retains structural integrity versus gravity and printing/processing forces). If sufficient structural integrity remains, a debinding head may continuously debind "behind" a deposited road that has solidified, or even one that has not yet solidified or cooled to solidification. As another example, a debinding head may independently track or scan a portion of a layer, a full layer, or a set of layers; or a volumetric or bulk process (e.g., heating, vacuum) in the printing chamber may continuously debind or debind in duty cycles. In all of these cases of substantially layer-by-layer debinding, several advantages result. Significantly, the process of debinding is accelerated because internal surfaces are directly available for debinding. Similarly, structures impractical to debind in full-part process (e.g., dense or large parts) may be debound. No additional time or transport is necessary following printing, as the printer continuously transforms (continuously, region by region, layer by layer, or layer set by layer set) green layers of the part into brown layers, and a printed part is a brown part. Even partial debinding may accelerate the overall process by increasing the available surface area for whole part debinding. For example, a partial debinding sweep may be conducted upon a printed layer or set of layers, temporarily exposing some surfaces to debinding fluid (gas or liquid).

FIGS. 18-21 are schematic views of a 3D printers in which debinding may take place as each layer is printed, or following each layer or a set of layers. The printer of FIGS. 18-21 accepts spools of model material and/or release material that are either temperature controlled to be pliable when heated above room temperature, or are pliable at room temperature; or alternatively discrete rod material fed by an, e.g., piston feeder. The build plate 16 may be heated by a build plate heater 16a, which may maintain a temperature during printing which contributes to debinding (e.g., elevated, but below a fluidizing or softening temperature of the model material and may maintains the temperature within the printing compartment at a level above room temperature (the printing compartment also in addition or alternatively use a separate heater, not shown, for this purpose). As shown in FIGS. 18-21, at least the heater 16a heating the build plate, with the optional assistance of a chamber heater HT2, may maintain the printing compartment at a higher than room temperature level, and a segmented cable carrier (e.g., energy chain) that maintains a minimum bending radius EC1 may house Bowden tubes as well as air, gas, fluid and/or vacuum lines for fume extraction.

Figure 18:
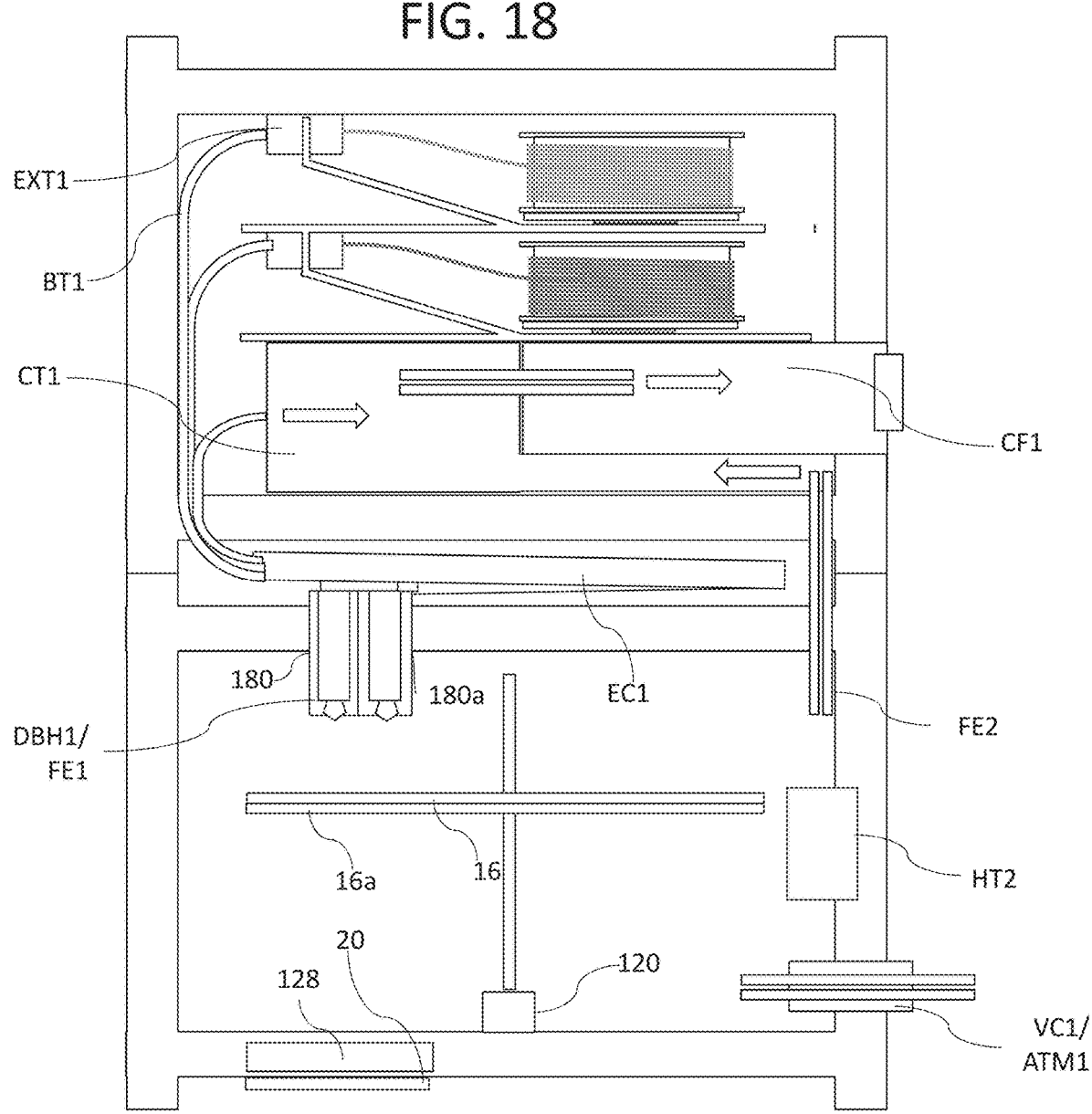
FIGS. 18-21 are schematic views of a 3D printers in which debinding may take place as each layer is printed, or following each layer or a set of layers.

In one example, as shown in FIG. 18, each of the print heads 180, 180a incorporates at least a print head (for extruding or spraying model material, green body support material, or sintering support material) and a debinding head DBH1 (for debinding a first stage binder from printed model material). The type of debinding head DBH1 depends upon the debinding process for the first stage binder material. For example, a debinding head DBH1 for thermally debindable first material may include one or both of a forced hot air gun or a radiant or IR heat element or projector. In the case of a material debound in a vacuum (increasing a vapor pressure of the binder), the entire chamber may be under vacuum (e.g., by means of a vacuum pump or high-vacuum apparatus connected by vacuum conduit VC1) as well; and in the case of a material debound in a particular gas (inert or active), the entire chamber may be filled with such gas via inert atmosphere port ATM1. A debinding head DBH1 for a solvent or catalytically debindable first material may include a spray, droplet, or jet of solvent or catalyst fluid, aerosol, or gas (optionally warmed, heated, or recycled). In either case, the debinding head DBH1 may include or add a waste or fume collection vacuum or extractor FE1. An additional head-borne or whole chamber process may accelerate (e.g., by gas flow, vacuum, or heat) removal of the debinding solvent following the debinding step.

In the case of a heat gun or radiant element, the layer or road of first material deposited may be heated to temperature of 200-220 degrees C. to debind the material. Optionally, the fume extractor FE1 or vacuum may be concentric or partially concentric with a heat source, such that fumes are extracted similarly without dependence on the direction of travel of the debinding head DBH1. Similarly, the debinding head DBH1, with or without the fume extractor FE1, may be concentric with the printing head 180 or 180a, again so that debinding may "follow" or track the print head 180 or 180a in any direction, and/or may perform similarly in any Cartesian direction of movement. Alternatively, either of the debinding head DBH1 or the fume extractor FE1 may be mounted onto a side of the print head 180 or 180a (with or without independent articulation for direction) and may be mounted on a separately or independently movable carriage. In each case described herein (concentric, adjacent, or main scan) the fume extractor FE1 is preferably proximate to an output of the debinding head DBH1 (e.g., spray, heat radiator, etc.), e.g., no more than 0.1-10 mm from the debinding head DBH1.

Figure 19:
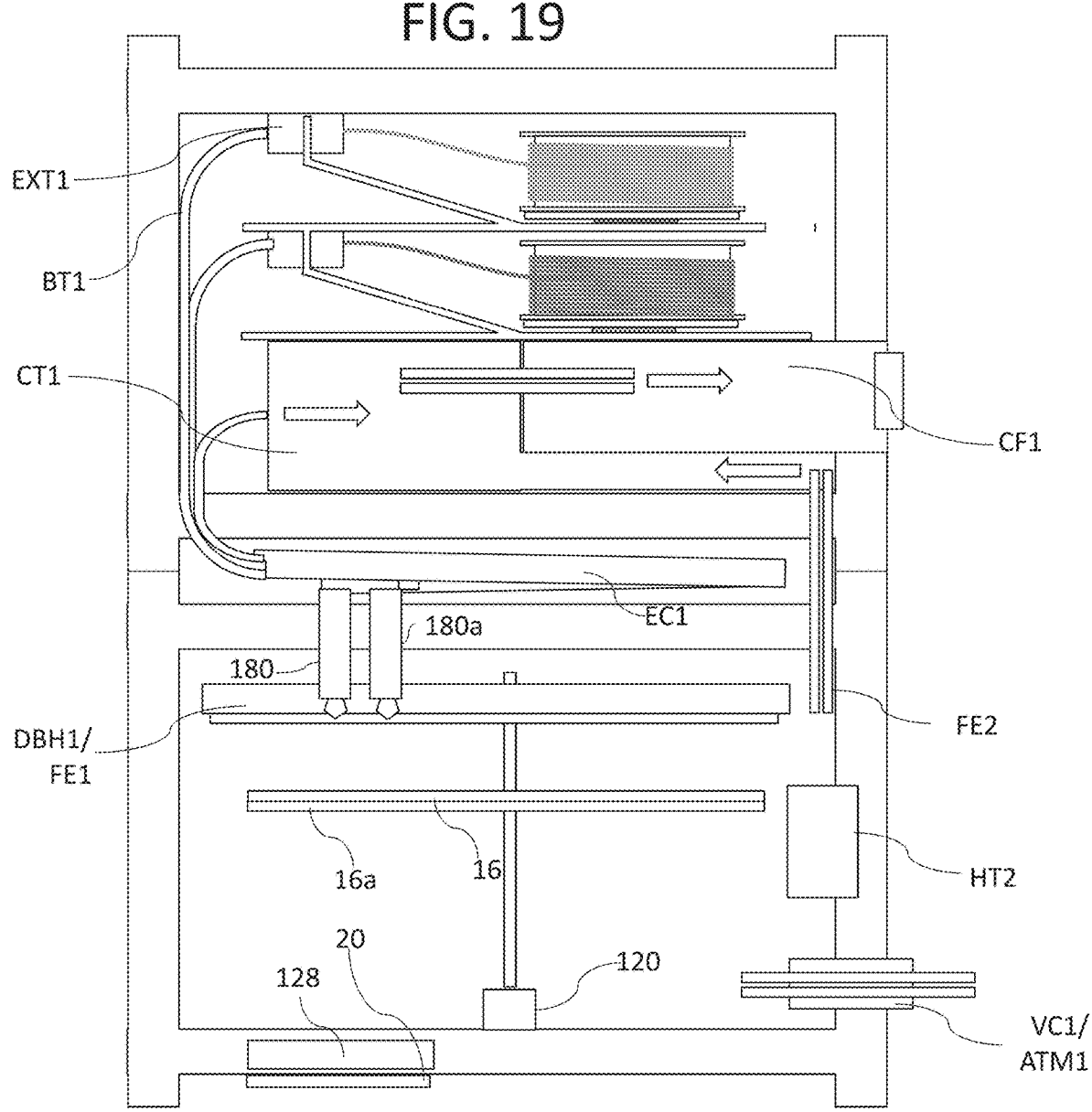

Alternatively, as shown in FIG. 19, the debinding head DBH1 is a full-width main scan debinding head, mount on a separate carriage that travels the width of the printer in a sub scan, and has an optional trailing and/or leading fume extractors FE1. This main-scan debinding head DBH1 may debind the entire layer in one or more passes. The main scan debinding head DBH1 may be arranged at a predetermined and/or adjustable clearance from each layer, e.g., such that its output (e.g., heat radiator) faces the part with an, e.g., clearance of 0.1-10 mm, and may avoid blowing air which may perturb fine printed features.

Figure 20:
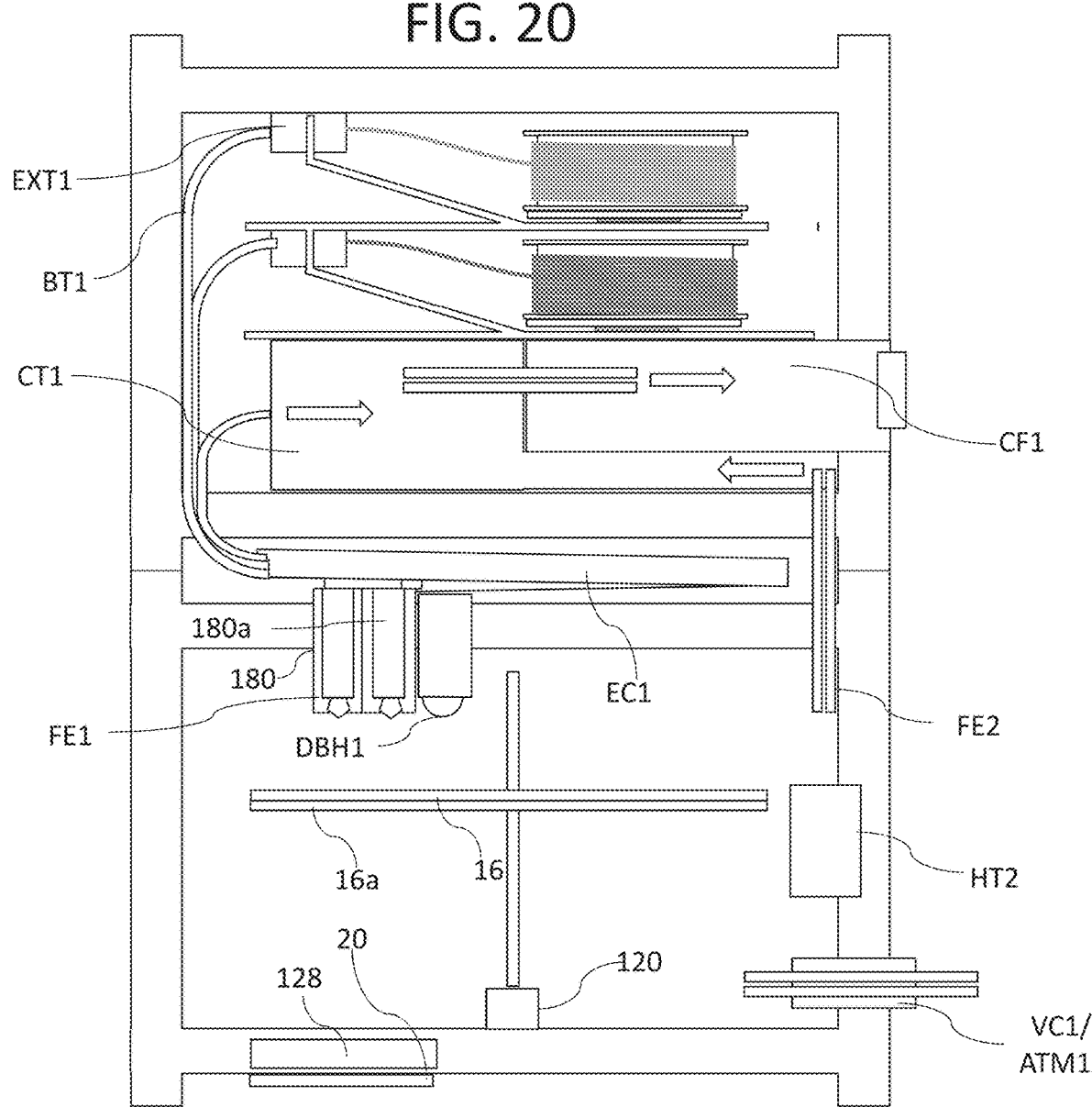

Further alternatively, as shown in FIG. 20, the debinding head DBH1 includes a directable, coherent, or highly collimated radiation beam emitter (e.g., laser) in the debinding head DBH1, fixedly mounted with a line of sight of the useful print bed 16, or on a separate carriage that travels at least in part to allow line of sight or positioning at an appropriate focus distance; or mounted on the print head DBH1 to move with it similarly to FIG. 18. A beam emitting debinding head DBH1 may debind continuously, road by road, or an entire layer in one or more passes. The preferred power level of the beam or laser may be similar to SLS lasers used for plastic (e.g., 100 mW-100 W). In each implementation in FIGS. 18-21 discussed herein, the print bed 16 and/or the chamber may be elevated by heaters 16a and/or HT2 to a temperature near the debinding temperature (e.g., 1-10 degrees below) so that a heat-based or heat-using debinding head DBH1, e.g., beam emitter, need elevate the temperature of the part layer by only a few degrees in order to perform the debinding process; or may be elevated by heaters 16a and/or HT2 to a temperature (e.g., 90-150 degrees C.) that partially debinds the layer or continues to debind the layers below the current layer. In each implementation in FIGS. 18-21 discussed herein, a warm air jet, ambient air jet or cooled air jet may follow or otherwise track the debinding head DBH1 to cool the layer following debinding, and/or return it to the operating temperature of the environment (which may be overall or partially elevated).

Figure 21:
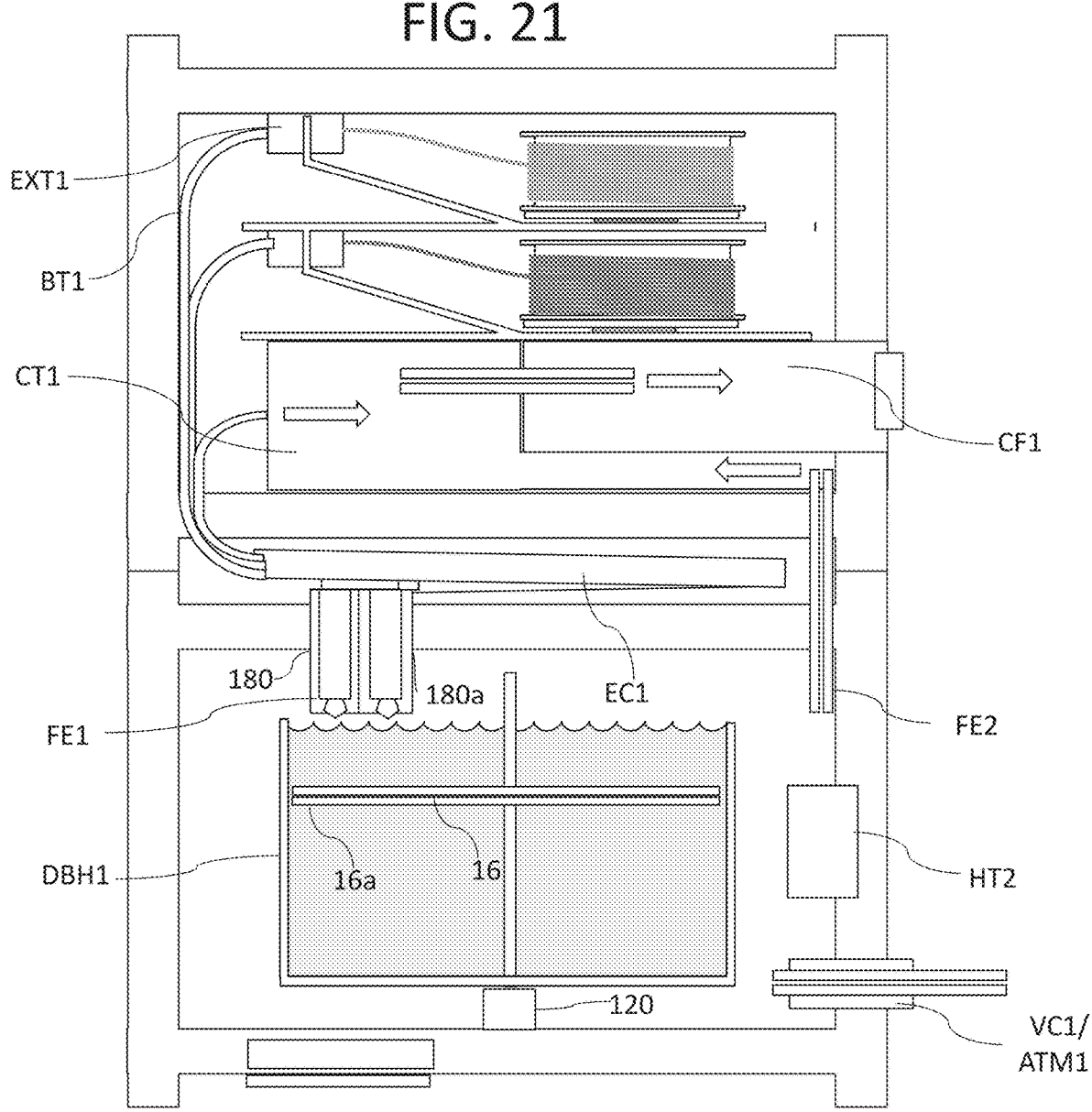

Still further alternatively, as shown in FIG. 21, upon completion of a layer, the part may be lowered (e.g., slightly or completely) into a solvent bath (e.g., circulated, recirculated, agitated and/or heated). In this case, the debinding head DBH1 may be considered the solvent bath structure; and debinding 1-5 layers at a time may be a more effective approach because of the raising/lowering time. In each example in FIGS. 18-21, a fume extractor FE1 may remove dissolved, volatile, atomized, fluidized, aerosolized or otherwise removed binder. The fume extractor FE1 may be connected to a pump which directs the collected material into a cold trap CT1 (e.g., to condense volatile, sublimated, or gas state material to liquid or solid material) and optionally thereafter through a carbon filter or other gas cleaner CF1 before exhausting to an appropriate outlet. A fume extractor FE2 separate from the debinding head DBH1 may evacuate or remove fumes from the entire chamber separately.

Figure 22:
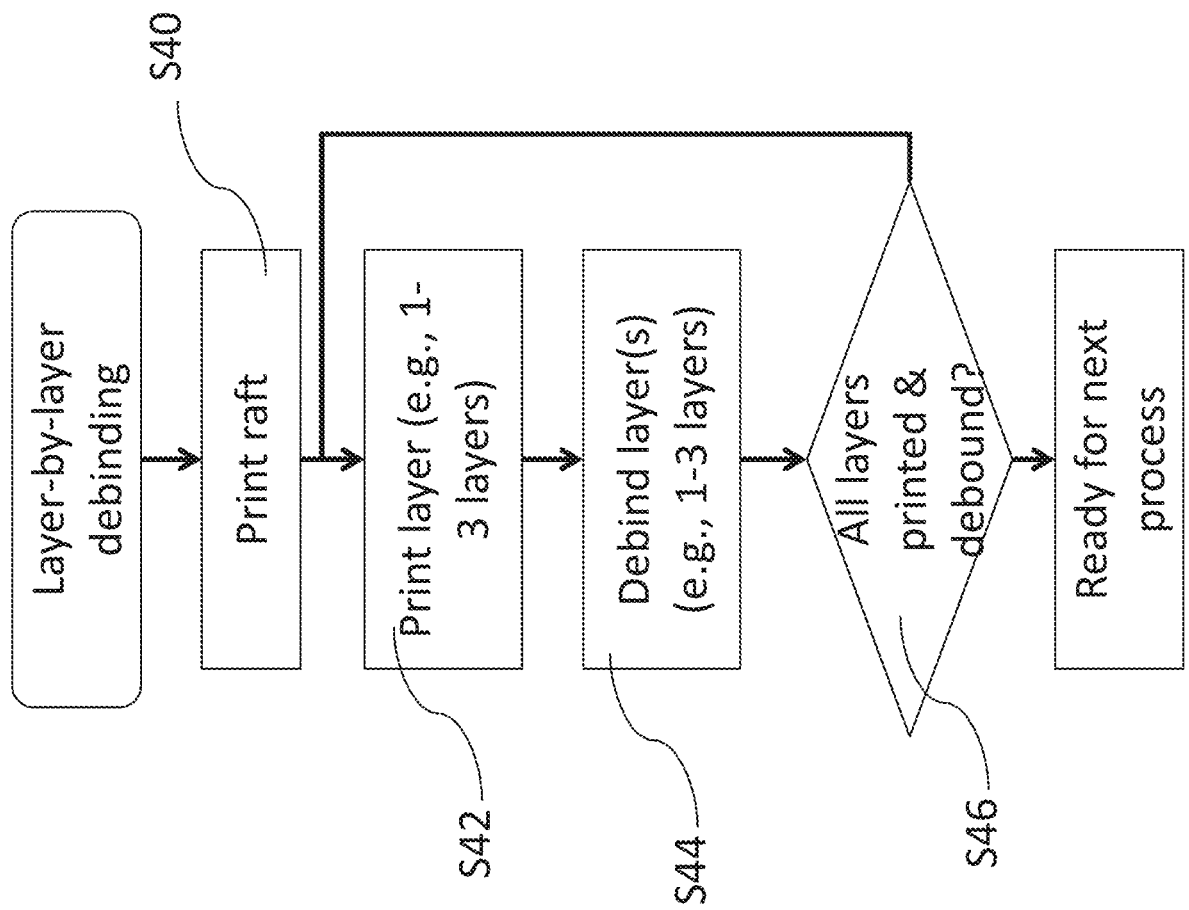
FIG. 22 is a flowchart showing a method of depositing material to form a sinterable brown part by additive manufacturing.

As shown in FIG. 22, the present disclosure describes a method of depositing material to form a sinterable brown part by and an apparatus for additive manufacturing may include making a raft RA1 in step S40. Subsequently, as discussed herein, in Step S42 a layer, portion of a layer, or set of layers is printed, and in Step S44 the layer is debound as discussed with reference to FIG. 18-21 and throughout this disclosure. This process is repeated—noting that dense printing may result in more frequent debinding steps. When all the layers are both printed and debound, as in step S46, the process is complete. The method may include feeding along a material feed path. The apparatus feeds a first filament including a binder matrix and sinterable spherized and/or powdered first material having a first sintering temperature, e.g., the model material. A green layer of first material is deposited or partially deposited, at least in some cases upon a brown layer of first material that has already been debound. In other cases it may be deposited upon a layer of sintering support or green body support material. At least a portion of the binder matrix is then removed from the green layer or portion thereof of first material to debind each green layer into a corresponding brown layer. When all the green layers have been both printed and converted into brown layers, the part is a brown part and may be sintered the part at the first sintering temperature.

When sintering supports are used, the apparatus (and/or process) may include a second print head along a material feed path, and the apparatus can feed a second filament including the binder matrix and sinterable spherized and/or powdered second material having a second sintering temperature higher than the first sintering temperature (optionally, e.g., more than 300, or more than 500 degrees C. higher). The apparatus forms layers of the second material—the separation layer material—which may have a second sintering temperature more than 300 degrees C., or more than 500 degrees C. higher than the first sintering temperature. Green layers of model material are deposited upon a by deposition upon a build plate or prior deposition of a brown layer (previously debound layer-by-layer as discussed herein) or separation material, and at least a portion of the binder matrix from each green layer is debound to convert that layer or layers into a corresponding brown layer. Layers of the separation material are deposited upon a build plate or first or second material, and layers of first material by deposition upon prior deposition of model material or separation material as appropriate, to permit sintering supports to be later removed or build up separation material. When all brown layers of the part have been so converted, the part may be sintered at the first sintering temperature but below the second material. The apparatus (including an additional station of the apparatus) debinds at least a portion of the binder matrix from each of the first material and second material. The apparatus (including an additional station of the apparatus) then heats a part so formed from first and second material to the first sintering temperature, thereby sintering the first material without sintering and decomposing the second material (the separation material) The second stage binder in the separation material, is, however pyrolysed, leaving an unsintered powder behind.

In the present disclosure, a vacuum-assisted debinding process using a high vapor pressure first stage binder subject to sublimation (e.g., naphthalene) may be particularly effective in the case where interconnected channels are printed. The 3D printing model material may include a binder and a ceramic or metal sintering material, and a release layer intervenes between infill cells or honeycomb or open cells in the part interior that connect to support structures and the part exterior. As discussed herein, open cell holes may optionally form, be formed by, or be connected to access and/or distribution channels for debinding fluid penetration and draining. "Vacuum-assisted" may mean debinding in gaseous pressure below ambient, optionally below 0.1-5 mm Hg, where any remaining gas may be air or inert, with or without added heat by a debinding head, heated printbed, and/or heated printing/debinding chamber. All or some, each of the channels/holes may be sized to remain open during debinding under vacuum, yet close during the approximately 20% size (approximately 20% may be 12-24%) reduction or densification of sintering. In such a case, the first stage binder may include chemically compatible solid, liquid and/or paste-like higher hydrocarbon and ester binder components having a measurable vapor pressure at the low end of the debinding temperatures (support structures and thus readily removable), especially under reduced pressure and elevated temperature conditions, prior to or without the use of extracting solvents. Preferably, such total or partial wax replacement components in the binder fraction would be characterized by a low-lying triple point which would make the removal of the component feasibly by sublimation, i.e., directly from the solid into the vapor phase, and thus preserving the open structure of the polyolefin binder phase.

In the present disclosure, binder compositions suitable for room temperature filament winding, commercial range shipping, and room temperature storage and unspooling may be formed by combining low melting point waxes and other compatible materials into a first stage binder. A problem to be overcome is brittleness, which prevents bending or winding of relatively high-aspect ratio filament (e.g., 1-3 mm) without breaking.

Solvent-debinding MIM feedstocks often include three distinct components. One component is the solvent-extractable partially miscible lower molecular weight component, such as petroleum wax (PW), microcrystalline wax (MW), crystalline wax (CW), bee's wax, C15-C65 paraffins and the like. The first stage binder component may serve as a pore former that can be rapidly and conveniently removed from the green part without changing its dimensions and integrity but that also facilitates a controlled and uniform removal of gaseous thermal decomposition products from the brown part body without deforming it. A second component may be a non-extractable, later pyrolysed second stage binder, which may be a thermoplastic polymer selected from various grades of polyethylene (PE), such as LDPE, HDPE, LLMWPE, etc., polypropylene, poly(methyl pentene) or other nonpolar hydrocarbon polymer. A third component may be a minor fraction of a powder dispersing component, such as long-chain saturated fatty acids (for example, stearic (SA) or palmitic (PA) acid) that act as disaggregating surface active agents for the inorganic or metal powder, alternatively a polar and tacky copoly(ethylene-vinyl acetate) (PEVA) in place of a fatty acid as the powder dispersing component.

In these examples, binder compositions may contain a first stage binder of 50-70 vol.-% of hydrocarbon solvent-soluble wax or fatty acid components. In order to be more flexible or pliable in room temperature or shipping conditions, the first stage binder may include low-melting binder components, such as higher alkanes, petrolatum, paraffin waxes and fatty acid esters and other compatible liquid plasticizers to increase the flexibility of the polymeric binder system. These components may improve spool winding on small-diameter spools and to resist impact during handling and shipping (including in colder ambient temperatures, e.g., below freezing), and may also increase the rate of extraction during the solvent debinding step.

In one particular example, a measurably volatile plasticizing binder component may have relatively low volatility under ambient storage, e.g., such as naphthalene, 2-methylnaphthalene or another hydrocarbon having a triple point temperature in the vicinity of room temperature as a component of a primarily polyolefin binder, or as the majority component or entire component of a first stage binder. Due to its aromaticity and low polarity, naphthalene is compatible with a polyethylene (polyolefin) melt and has naphthalene has a relatively very low temperature triple point and thus very high vapor pressure over the solid phase up to the melting point at 80 degrees C. In another example, a polyolefin binder is blended with a straight- or branched chain higher ($10<n<26$) alkane or a mixture of such alkanes, with or without a fraction of naphthalene, in which the alkanes or their mixture is selected from compounds having a measurable vapor pressure at temperatures below the melting point of the polyolefin or below the dissolution temperature of said polyolefin in the alkane or its mixture. "Measurable vapor pressure" means a saturated vapor pressure higher than 0.1 Pa (1 μm Hg) at 20 degrees C.)

The alkane or its mixtures may be replaced in entirety or in part by mono-, di- or triesters of fatty acids and fatty alcohols, glycols or glycerol which also possess a measurable vapor pressure in the range from ambient temperature to the dissolution temperature of the polyolefin binder in the ester or its mixture. If the alkane, ester or its blend or a blend with a medium-size fatty acid has a measurable vapor pressure at ambient or higher temperature, but below the melting or dissolution point of the polymer binder, it can conveniently be removed from the blend by simply exposing the green part to low pressure environment, preferable at an elevated temperature, but at least initially at a temperature lower than the melting or dissolution temperature of the polyolefin binder. The sublimation or evaporation of the binder component will generate microporosity in the binder phase of the green part, thus facilitating subsequent thermal debinding of the green part and preventing its dimensional distortion due to the expansion of the trapped gaseous decomposition products.

The volatile binder component should have a vapor pressure at ambient temperature low enough so as not to vaporize to a significant degree during normal handling and use of the material in the open atmosphere. Volatile binder loss during long-term storage may be effectively prevented by storing the pellets, extruded filament or the like in sealed gas- and organic vapor-impermeable multilayer packaging. Polyolefin binders include polyethylene, polypropylene or their copolymers, as described with a wax component including a proportion of naphthalene, 2-methylnaphthalene. Sublimation of naphthalene during storage can be prevented by using an appropriate vapor impermeable packaging material such as an aluminum-polymer laminate, yet naphthalene can be relatively rapidly removed from the green part by moderate heating under low pressure, for example, in a vacuum oven at temperatures below the melting point of naphthalene and thus remove it without melting the binder phase.

As noted, in the case of FIGS. 4-40 inclusive, green body supports are primarily for supporting the green body vs. printing forces and gravity during the printing process, and may be removed prior to debinding and/or sintering, while the sintering supports are primarily for supporting the brown body vs. gravity and for interconnecting supports to the brown body for uniform shrinking, and are retained through the debinding process and during the sintering process. The separation material may be debound, and may aid in removal of the sintering supports after sintering. In the case of FIG. 6, the green body supports and separation material may be combined, and the separation material and green body supports removed during debinding (some of the powder in the separation material may remain), while the sintering supports are again retained for supporting the brown body vs. gravity. If it is unnecessary to support the brown body vs. gravity (e.g., because of buoyancy effects during fully submerged sintering in a fluidized bed, or because of resistance provided by powder underneath, as disclosed herein), then it the sintering supports may be smaller, not as strong, or even unnecessary. In this last case, this may be represented by the printing stage of FIGS. 23A and 23B, in which only green body supports/separation material, but not sintering supports, are printed supporting the part.

Figure 23A:
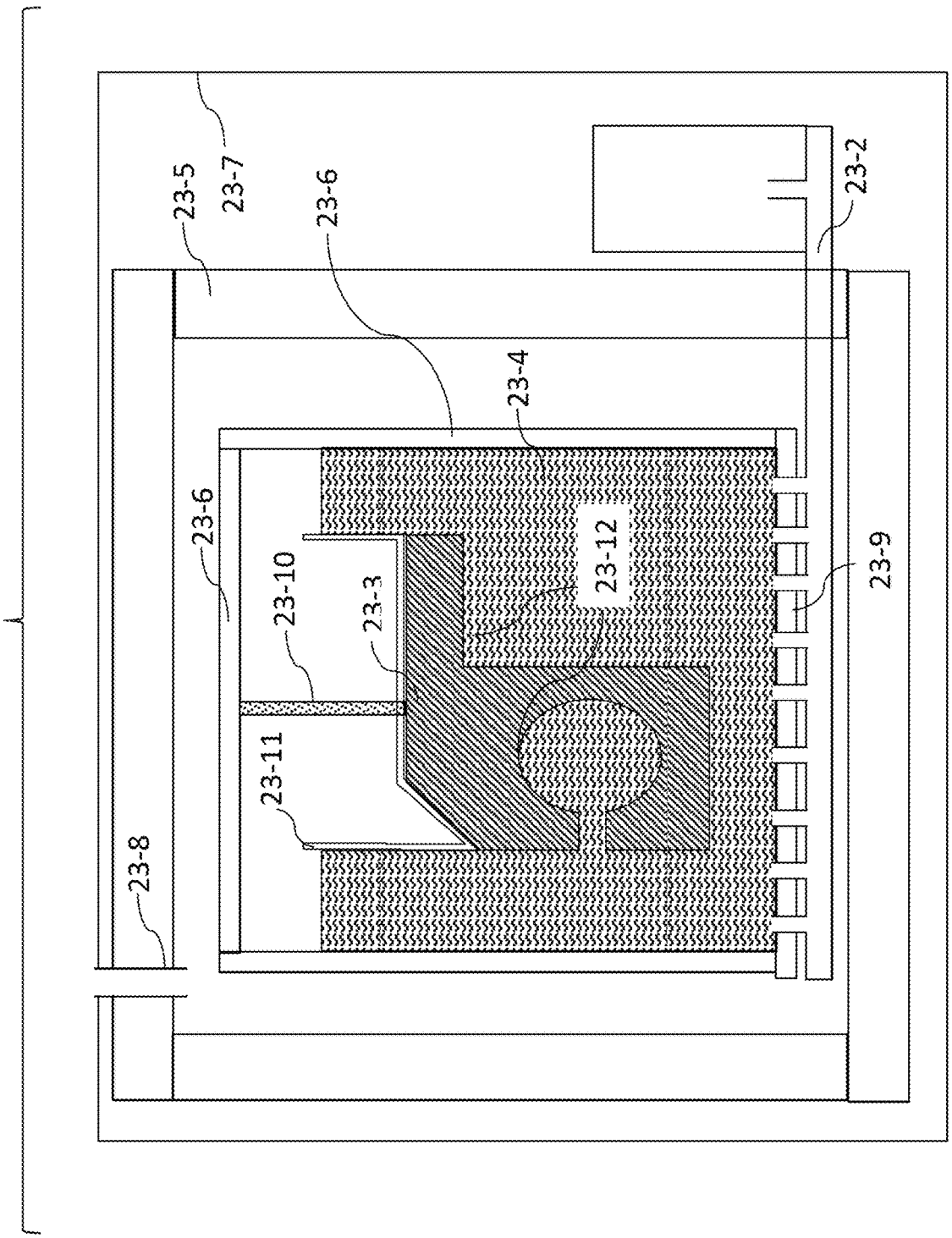
FIGS. 23A and 23B are alternative schematic representations of an alternative 3D printing system, part, and process to that of FIGS. 4 and/or 6.
Figure 23B:
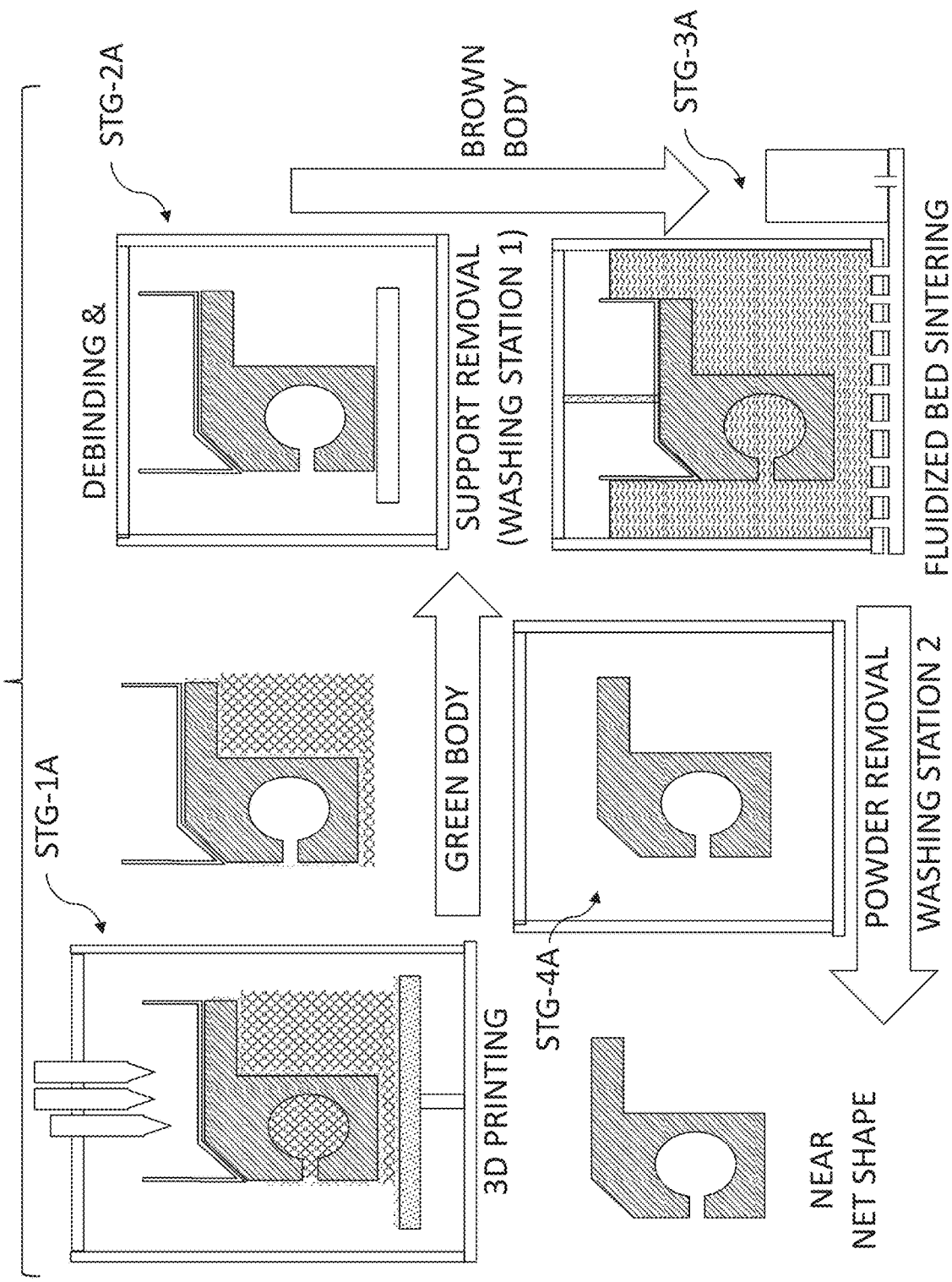

As shown in FIGS. 23A and 23B, a powder bed or fluidized bed brown part sintering oven and process may be used together with the 3D printers disclosed herein. The sintering oven shown in FIG. 23A, may be used together with the 3D printers and debinding stations disclosed herein, those in which green body supports and separation layers are formed from different material, those in which green body supports and separation layers are formed from the same material, and those in which no sintering supports are formed.

As shown in FIG. 23A, a sintering oven and method may support fluidized bed sintering of the model material or composite. The release layer includes a spherized or powder metal part, initially a brown part, during sintering to prevent warping and distortion during the sintering process. For example, the part 23-3 may be placed into a crucible 23-1 as shown in FIGS. 23A and 23B. The crucible 23-1 may be partially filled with a fine powder 23-4 with size from 0.001 microns to 200 microns, preferably with size 1-20 microns. Alternatively, or in addition, if the powder bed is to be optionally fluidized, the crucible 23-1 may be partially filled with a powder of Geldart Group A. Geldart Group A powders are typically substantially between 20 and 100 am, may be spherical or irregular, and the particle density is optionally less than 1.4 g/cm$^3$. However, Geldart Group A powders are defined by bubbling behavior, not by powder size, and any Geldart Group A powder is suitable. In a Geldart Group A powder, prior to the initiation of a bubbling bed phase, beds may expand at incipient fluidization, due to decreased bulk density. Alternatively, a Geldart Group C, or Group B, powder may in some cases be suitable with mechanical or other agitation.

If the powder bed is to be fluidized, pressurized gas appropriate for sintering (e.g., typically an inert gas, or a reducing gas) may enter the fluidized bed vessel through numerous holes via a distributor plate 23-9 or a sparger distributor, the resultant gas-particle fluid being lighter than air and flowing upward through the bed, causing the solid particles to be suspended. Heat is applied to the crucible 23-1 containing the powder bed (optionally fluidized) and part 23-3. Any part of the system may be appropriately pre-heated, e.g., a pressurized gas 23-2 may be pre-heated to a temperature in the below, in the range of, or above the sintering temperature. As the part 23-3 is heated up to sintering temperature, the tendency is to deform downward under gravity, i.e., under the weight of the part 23-3 itself. In the system of FIGS. 23A and 23B, the fine powder (preferably alumina, or the like) provides resistance to slumping and sagging, or in other cases, the fluidized bed of fine powder provides either or both of resistance or buoyancy. The system may alternate between fluidized state and a non-fluidized state, and/or the flow rate of the fluid (gas) can further be modulated to achieve varying degrees of powder mobility. As shown, the powder in the bed continually resists weights of unsupported portions of the brown part (e.g., unsupported portions 23-12).

Optionally, in order to promote flow, and prevent entrapment of powder in orifices and compartments of the part, the powder may be substantially spherically shaped. Further, the powder bed can be fluidized to reduce viscosity through fluid inlet and/or distributor plate 23-9. Further optionally, the crucible 23-1 is positioned in a substantially gas-tight chamber 23-7 that seals the furnace to prevent the ingress of oxygen—which is usually detrimental to the physical properties of metallic powders during the sintering process. A refractory lining 23-5 is shown, which isolates the high-temperature crucible 23-1 from the (preferably stainless steel) walls of the furnace.

Further optionally, a crucible lid 23-6 may rests on top of the crucible 23-1 further limiting oxygen flow into the part 23-3. As the gas flows into the crucible 23-1, the pressure may slightly elevate the 23-1 lid to enable gas to escape. The resulting positive pressure flowing gas seal may reduce oxygen ingress, resulting in a more pure atmosphere around the part 23-3. Further optionally, in one embodiment, the fluidizing gas may be maintained at a flow rate below a point of mobility of the powder during an initial temperature ramp, and through the onset of necking among metal powder spheres in the process of sintering—the initial stages of the sintering process. When sufficient necking is achieved to connect many spheres and thereby maintain the structure of the part, the gas flow can be increased to the point of fluidizing the powder. Fluidizing (e.g., creating a fluidized bed) during the initial ramp (before necking) may have a destabilizing effect on the part, and may increase the likelihood of cracking or damage. However, once sintering or pre-sintering has enabled sufficient part strength (e.g., 0.1-10% part shrinkage), and before the part has contracted to fully sintered (e.g., 12-24%, or approximately 20% shrinkage) fluid flow may be increased to fluidize the support powder without damaging the part. Increasing fluid flow later in the process may require low viscosity powder to ensure egress of powder from holes, cavities and the like.

Further optionally, the properties of the powder, fluid flow, and printing (including part, supports, and auxiliary structures) may be configured to generate buoyancy of the part, on a scale from low buoyancy to neutral buoyancy in the fluidized bath. This effectively zero gravity sintering process may permit complex shapes with internal spans and bridges to be sintered without sagging or slumping. A mild amount of buoyancy will reduce the effective weight of the part or a portion of the part. However, the buoyancy may be up to neutral (the part tends to float within the fluidized bed) or above neutral (the part tends to float to the top of the fluidized bed). A supporting hanger 23-10 may counteract negative, neutral, or positive buoyancy and hold the part immersed in the fluidized bed. In addition, a hood guard 23-11 shaped to exclude powder directly above the contour of the part may reduce or eliminate the weight of a hood or stagnant cap of non-fluidized powder that may reside above the part. This hood or stagnant cap may reduce overall buoyancy or buoyancy in particular locations (see, e.g., https://rucore.libraries.rutgers.edu/rutgers-lib/26379/). The hood guard 23-11 may be 3D printed along with the part— e.g., the hood guard 23-11 may be determined according to the cross-sectional shape of a representative or maximum horizontal section of the part, projected upward for the expected depth of submersion in the fluidized bed. The hood guard 23-11 may then be 3D printed as a hollow or substantially hollow prism or shell from model material (or sintering support material), e.g., above the part with a separation layer, or a separate print job (subsequent or beside the part to be sintered). The hood guard 23-11 may also serve the role of a supporting hanger 23-10, and the part may be suspended via the hood guard 23-11. The hood guard 23-11 may be "sacrificial", e.g., generated during printing but disposed of or recycled following sintering.

Further optionally, a gas outlet 23-8 may allow the exhaust of the sintering process to be removed from the oven. Alternatively, or in addition, the outlet 23-8 may be used to pull a vacuum on the furnace (e.g., use a vacuum pump to lower the ambient pressure toward vacuum) to remove a significant portion of the oxygen from the environment prior to flowing the inert or reducing gas for sintering and/or fluidizing the bed. Flowing gas through the powder agitates the powder in addition to fluidizing the powder. Further optionally, a fluidized bed may allow the part to contract or shrink during sintering without the powder exerting any resistance. While the necessary gas flow to enter a particulate regime and bubbling regime in fluidizing a particular particle size and type can be well characterized empirically or via modeling, mechanical agitation, including by stirring members, shaking members or chambers, ultrasonic, magnetic, inductive, or the like may reduce the gas velocity needed or provide fluidization in more inaccessible sections of the part.

Figure 24:
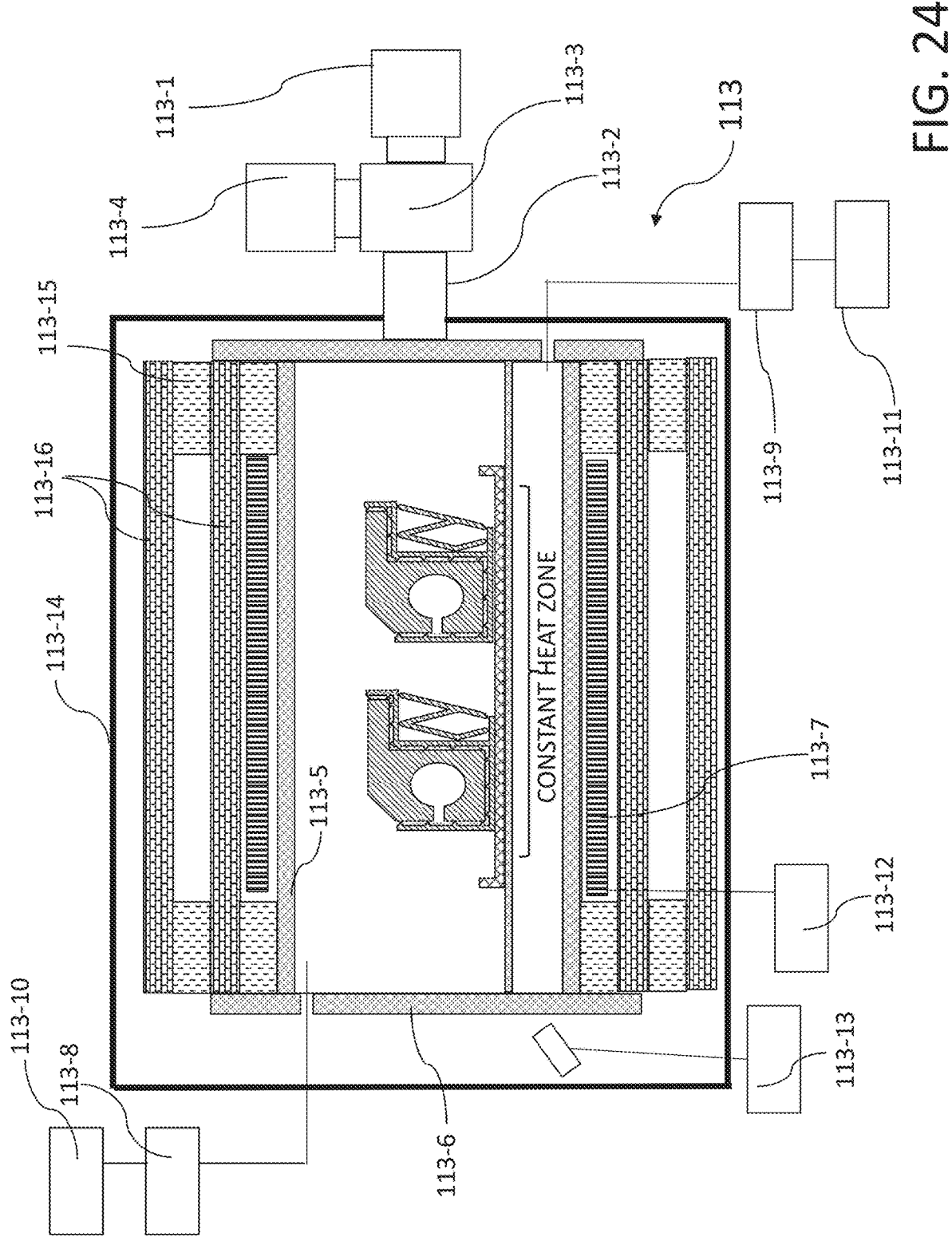
FIG. 24 is a schematic representation of one exemplary process of printing, debinding, sintering, and support removal optionally with separation and/or release layers, green body supports and/or fluidized bed sintering.

FIG. 23B shows one overall schematic of the process. Initially, in the 3D printing phase, STG-1A the part 14, together with at least its green body supports is printed in a 3D printer as described. The green body, including all of these, optionally still bound to a higher melting temperature material—ceramic or other material build plate 16, may be transferred to a debinding chamber (optionally, the debinding chamber is integrated in the 3D printer or vice versa). As noted, green body supports may be removed during debinding. Accordingly, as shown in FIG. 24, debinding STG-2A debinds the model material, leaving a porous brown body structure ("DEBINDING"), and may optionally include dissolving, melting, and/or catalyzing away the green body supports ("SUPPORT REMOVAL"). As discussed, sintering supports may remain even with the powder bed or fluidized powder bed technique, but may be, e.g., placed in fewer locations or support only longer spans.

Continuing with FIG. 23B, as shown, a brown body is transferred to a sintering chamber or oven (optionally combined with the printer and/or debinding chamber). The sintering chamber or oven is filled with a powder, as described, that will not sinter at the sintering temperature of the brown body (e.g., alumina powder surrounding n aluminum or steel brown body to be sintered. During sintering STG-3A, the brown body uniformly shrinks by approximately 20%, closing internal porous structures in the brown body by atomic diffusion. The alumina powder bed does not sinter, but either resists sag and slumping of spans and overhangs, and/or provides buoyancy for spans and overhangs. If the powder bed is fluidized, the powder and part may be more uniformly heated by the circulation of fluidizing with a gas. As shown in FIG. 24, a sintered body can be removed from the sintering oven. Some alumina powder may remain in internal cavities and can be washed away STG-4A and/or recovered.

With respect to sintering ovens, unlike solid metals (which may be opaque to or reflect microwaves at low temperatures), powdered metal may advantageously absorb microwaves. In addition, the resulting heating process may be volumetric or partially volumetric, and heat a body of powdered material evenly throughout, including to sintering temperatures (if a compatible chamber and atmosphere can be practically provided). Furthermore, as discussed herein, smaller powder sizes (e.g., lower than 10 micron, average or >90% count) may lower sintering temperatures to enable using lower temperature furnace and refractory materials. A soak in a forming or reducing gas (e.g., Hydrogen mixtures) may also be used.

A fused silica tube used for sintering (in combination with microwaves or otherwise) may be formed from very pure silica (e.g., 99.9% SiO2), and a crucible for holding the workpiece or part may be made from a similar material. In some cases, the optical transparency of fused silica may correlate to its microwave transparency and/or its coefficient of thermal expansion. A more optically transparent fused silica may have a lower degree of crystallization, and the crystal structures may scatter both light and RF.

Typical Thermal Expansion Coefficients and Microwave penetration depths

| Material | Thermal Expansion Coefficient $\times 10^{-6}/°$ C. | Microwave power penetration depth* (for 2.45 GHz) D, in cm | Microwave field penetration depth* (for 2.45 GHz) d, in cm |
| --- | --- | --- | --- |
| Fused Silica (amorphous, synthetic) | 0.55 | 3900 | 7800 |
| Cordierite | 0.1 | | |
| Silicon Carbide | 3.7 | 1 | 2 |
| Mullite (can be damaged by H2) | 5.0 | 500 | 1000 |
| Alumina | 7.2 | 625 | 1250 |
| Zirconia | 10.5 | | |
| Quartz Mineral (natural, crystalline) | 7-14 | | |
| Bulk, solid aluminum | | | ($1.67 \times 10^{-6}$ micrometers) |

Penetration depth (d) is the distance from the surface of the material at which the field strength reduces to 1/e (approximately 0.368) of its value at the surface. The measurements in this table are taken at or around 20 degrees C. As temperature increases, the penetration depth tends to decrease (e.g., at 1200 degrees C., the penetration depth may be 50-75% of that at 20 degree C.).

With respect to gas handling, different sintering atmospheres are appropriate for different metals (e.g., Hydrogen, Nitrogen, Argon, Carbon Monoxide, vacuum, reducing gases with small percentages of Hydrogen), and for different stages of a sintering process. The sintering atmosphere may help in different stages, e.g., in completing debinding, in cleaning away debinding remnant materials to avoid contamination in a sintering furnace, in reducing surface oxidation, in preventing internal oxidation, and/or to prevent decarburization. An atmosphere controlled furnace may be used before sintering as well, or different stages arranged in a muffle staged continuous furnace.

An atmosphere after initial debinding to clean away lubricants or remnant binder, but before sintering may be oxidizing (nitrogen saturated with water or with added air) through water to high temperature metal for example, optionally deposited with a similar (primary) matrix or binder component to the model material. After sintering, the release layer may become highly saturated, or by use of air additions. Temperatures may be 200-750 C with dew point of 0 to 25 C. An atmosphere in sintering, especially for stainless steels or some tool steels, may be highly reducing, e.g., pure Hydrogen, with dew point of −20 to −40 C. Nitrogen/hydrogen mixtures (3-40%) or Nitrogen/ammonia may be used, and hydrocarbons may add back surface carbon or prevent its loss. Atmospheres in post-sintering may be cooling (at very low Oxygen levels, e.g., 10-50 ppm) at a rate of, e.g., 1-2 degrees C. per second, and/or may be recarbonizing with a hydrocarbon-including atmosphere (forming some CO) at e.g., 700-1000° C. range for steels.

Figure 25:
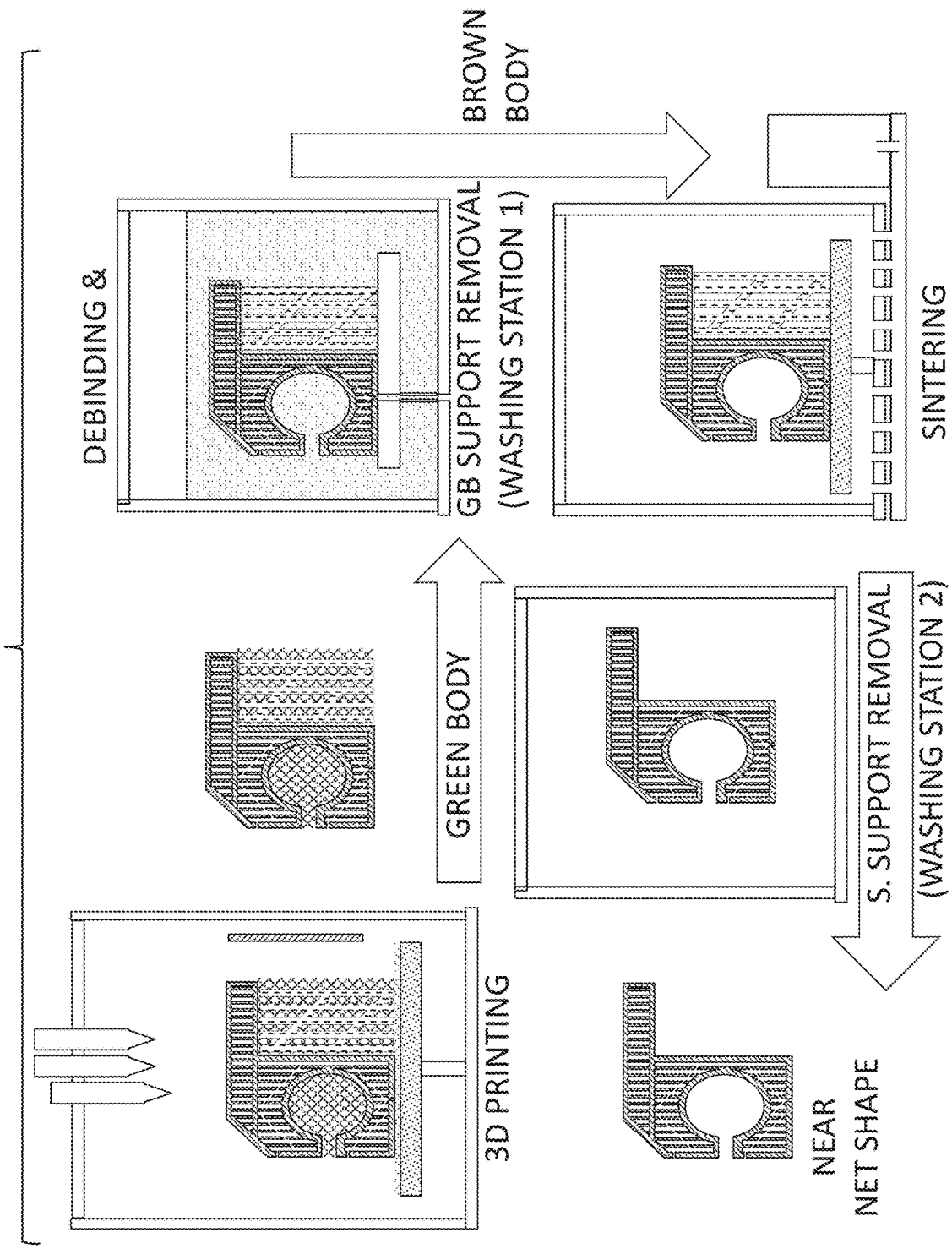
FIG. 25 is a schematic representation of an additional exemplary process of sintering optionally with certain configurations of material and sintering oven.

With respect to a microwave assisted sintering furnace 113, as shown in FIG. 25, one candidate microwave generator 113-1 for assisting or performing sintering may generate 2.45 GHz frequency microwaves at a power output of 1-10 kW. The generator, oscillator or magnetron 113-1 may be connected to a waveguide 113-2 with an open exit. A circulator 113-3 and dummy load 113-4 (e.g., water) may absorb reflected waves to avoid returning these to the magnetron 113-1 and redirect traveling waves to the furnace 113 (as monitored by appropriate sensors) and adjusted. A tuner device (in addition to or in alternative to the circulator)

113-3 may change the phase and magnitude of microwave reflection to, e.g., cancel or counter reflected waves.

As shown in FIG. 25, one technique and material variation method may involve supplying a material (pellet extruded, filament extruded, jetted or cured) containing a removable binder as discussed herein (two or one stage) and greater than 50% volume fraction of a powdered metal having a melting point greater than 1200 degrees C. (including various steels, such as stainless steels or tool steels). The powdered metal may have which more than 50 percent of powder particles of a diameter less than 10 microns, and advantageously more than 90 percent of powder particles of a diameter less than 8 microns. The average particle size may be 3-6 microns diameter, and the substantial maximum (e.g., more than the span of +/−3 standard deviations or 99.7 percent) of 6-10 microns diameter. The particle size distribution may be bimodal, with one mode at approximately 8 micron diameter (e.g., 6-10) microns and a second mode at a sub-micron diameter (e.g., 0.5 microns). The smaller particles in the second mode assist in early or lower temperature necking to preserve structural integrity.

Smaller, e.g., 90 percent of less than 8 microns, particle sizes may lower the sintering temperature as a result of various effects including increased surface area and surface contact among particles. In some cases, especially for stainless and tool steel, this may result in the sintering temperature being within the operating range of a fused tube furnace using a tube of amorphous silica, e.g., below 1200 degrees C. Accordingly, in the process variation, as discussed herein, this smaller diameter powder material may be additively deposited in successive layers to form a green body as discussed herein, and the binder removed to form a brown body (in any example of deposition and/or debinding discussed herein).

As shown in FIGS. 24 and 25, the brown part may be loaded into the fused tube furnace (furnace 113 is one example) having a fused tube 113-5 formed from a material having an operating temperature less than substantially 1200 degrees C., a thermal expansion coefficient lower than $1\times10^{-6}/°$ C. and a microwave field penetration depth of 10 m or higher (e.g., amorphous fused silica having an operating temperature practically limited to about 1200 degrees C., a thermal expansion coefficient of about $0.55\times10^{-6}/°$ C. and a microwave field penetration depth of more than 20 m). The low thermal expansion coefficient relates to the ability to resist thermal shock and therefore to ramp temperature quickly and handle high thermal gradients in operation and in furnace construction. For example, using a thermal shock resistant material may permit ramping a temperature inside the fused tube at greater than 10 degrees C. per minute but less than 40 degrees C. per minute. The microwave field penetration depth relates to microwave transparency—higher penetration depths are related to higher transparency.

As shown in FIGS. 24 and 25, in this process the fused tube 113-5 may be sealed by a fused silica plug or plate 113-6 (and/or a refractory or insulating plug or plate). The internal air may be evacuated, and may be further replacing internal air with a sintering atmosphere (including vacuum, inert gas, reducing gas, mixtures of inert and reducing gas). Microwave energy may be applied from the microwave generator 113-1 outside the sealed fused tube to the brown part. In this case, because the small particles may lower the sintering temperature, the brown part of steel may be sintered in this furnace at a temperature lower than 1200 degrees C. In one advantageous example, more than 90 percent of the printing material's powder particles have a diameter less than 8 microns. Some of these particles, or particles in the remaining 10%, may have a diameter less than 1 micron (e.g., >90% of these having a diameter less than 0.5 microns).

As shown in FIGS. 24 and 25, because microwaves may be difficult to direct for evenly distributed heating (e.g., even with the use of turntables and reflective stirring blades), the system may use susceptor members 113-7 (e.g., rods distributed about the perimeter). The susceptor members 113-7 may be made from a microwave absorbing material that resists high temperatures, e.g., silicon carbide. The susceptor members 113-7 may be passive (energized only by microwave radiation), active (resistively heated), or a mixture of the two. The susceptor members 113-7 discussed herein may even be used without microwave heating (in a microwave-free system, silicon carbide and $MoSi_2$, two common susceptor materials, are often also good resistive heaters for high temperatures). Further as shown in FIGS. 24 and 25, the microwave energy is applied from outside the sealed fused tube 113-5 to susceptor material members 113-7 arranged outside the sealed fused tube (which does not contaminate the sintering atmosphere in the tube interior). As noted, the sintering atmosphere is appropriate for the powdered metal being sintered, e.g., inert, vacuum, or at least 3% Hydrogen (e.g., 1-5% hydrogen, but including up to pure hydrogen) for stainless steels.

In a variation approach for producing finely detailed parts, again the material having a removable binder and greater than 50% volume of a powdered steel (or other metal) is supplied with more than 50 percent of the powder particles have a diameter less than 10 microns, advantageously more than 90 percent having a diameter equal to or less than substantially 8 microns. The material may be additively deposited with a nozzle having an internal diameter smaller than 300 microns, which provides fine detail but is 10-20 times the diameter of the larger particles of the powder (preventing jamming). Again, the binder is removed to form a brown body and the brown part loaded into the fused tube, e.g., amorphous silica, having a thermal expansion coefficient lower than $1\times10-6/°$ C., and the is sealed and the atmosphere therein replaced with a sintering atmosphere. Radiant energy (e.g., radiant heat from passive or active susceptor rods or other resistive elements, and/or microwave energy) is applied from outside the sealed fused tube 113-5 to the brown part, sintering the brown part at a temperature higher than 500 degrees C. but less than 1200 degrees C. (a range enabling small particle aluminum as well as small particle steel powders). In this case, the nozzle may be arranged to deposit material at a layer height substantially ⅔ or more of the nozzle width (e.g., more than substantially 200 microns for a 300 micron nozzle, or 100 microns for a 150 micron nozzle).

In another variation suitable for sintering both aluminum and stainless steels (in addition to possible other materials) in one sintering furnace 113, parts formed from either small particle powder may be placed in the same furnace and the atmosphere and temperature ramping controlled substantially according to the material. For example, a first brown part may be formed from a first debound material (e.g., aluminum powder printing material) including a first powdered metal (e.g., aluminum), in which more than 50 percent of powder particles of the first powdered metal have a diameter less than 10 microns, and a second brown part formed from a second debound material (e.g., stainless steel powder printing material) including a second powdered metal (e.g., stainless steel) in which more than 50 percent of powder particles of the second powdered metal have a diameter less than 10 microns. In a first mode for the furnace, the aluminum brown part may be loaded into the amorphous silica fused tube discussed herein, and the temperature ramped at greater than 10 degrees C. per minute but less than 40 C degrees C. per minute to a first sintering temperature higher than 500 degrees C. and less than 700 degrees C. In a second mode, the stainless steel brown part may be loaded into the same fused tube, and the temperature inside the fused tube ramped (e.g., by the heat control HC and or microwave generator MG) at greater than 10 degrees C. per minute but less than 40 degrees C. per minute to a second sintering tempering temperature higher than 1000 degrees C. but less than 1200 degrees C.

The atmosphere may be changed by the pressure control 113-8 and/or flow control 113-9, operating the vacuum pump 113-10 or gas source 113-11. In the first mode for aluminum, a first sintering atmosphere may be introduced into the fused tube 113-5, including inert Nitrogen being 99.999% or higher free of Oxygen. In the second mode for stainless steel, a second sintering atmosphere comprising at least 3% Hydrogen may be introduced.

As shown in FIG. 25, in the multipurpose sintering furnace suitable for rapidly sintering both aluminum and stainless steel at below 1200 C, using small diameter powders as discussed herein, the furnace may include a fused tube 113-5 formed from a fused silica having a thermal expansion coefficient lower than 1×10-6/° C. (a loose powder, permitting high ramp rates, the tube being resistant to thermal shock), and a seal that seals the fused tube versus ambient atmosphere. A tube-internal atmosphere regulator (e.g., including the high vacuum 113-10 pump or other device, the pressure control 113-8, the flow control 113-9, and/or the gas source(s) 113-11) maybe operatively connected to an interior of the fused tube 113-5 to apply vacuum to remove gases (including air and water vapor) within the fused tube 113-5 and to introduce a plurality of sintering atmospheres (including vacuum, inert, and reducing atmospheres in particular) into the fused tube. Heating elements (e.g., the resistive heater and/or susceptor 113-7 and/or the microwave generator 113-1) are placed outside the fused tube 113-5 and outside any sintering atmosphere within the fused tube 113-5 so as not to contaminate the sintering atmosphere. A controller (e.g., 113-12) may be operatively connected to the heating elements 113-7 and/or 113-1 and the internal atmosphere regulator. In a first mode, the controller 113-12 may sinter first material (aluminum) brown parts within a first sintering atmosphere (<0.001 percent oxygen in nitrogen) at first sintering temperature higher than 500 degrees C. and less than 700 degrees C. In a second mode, the controller may sinter second material (stainless steels) brown parts within a second sintering atmosphere (e.g., inert or reducing atmosphere) at a second sintering temperature higher than 1000 degrees C. but less than 1200 degrees C. An (optical) pyrometer 113-13 may be used to observe sintering behavior through the seal. The oven 113 is held in an appropriate microwave reflective enclosure 113-14 and is insulated with appropriate insulation 113-15 and refractory material 113-16.

As shown in FIGS. 24 and 25, the internal atmosphere regulator may be operatively connected to an interior of the fused tube 113-5 to introduce the sintering atmospheres, and may ramp a temperature inside the fused tube 113-5 at greater than 10 degrees C. per minute but less than 40 degrees C. per minute. This is typically not recommended with higher thermal expansion ceramics like alumina or mullite. Also, the microwave field penetration depth of 20 m or higher of amorphous silica permits higher microwave penetration efficiency. The microwave generator MG applies energy to, and raises the temperature of, the first and/or second material brown parts within the fused tube 113-5, and/or the susceptors 133-7, which then re-radiate heat to heat the first and/or second material brown parts.

Accordingly, a small powder particle size (e.g., 90 percent of particles smaller than 8 microns, optionally including or assisted by particles of less than 1 micron) of metal powder embedded in additively deposited material lowers a sintering temperature of stainless steels to below the 1200 degree C. operating temperature ceiling of a fused silica tube furnace, permitting the same silica fused tube furnace to be used for sintering both aluminum and stainless steel (with appropriate atmospheres), as well as the use of microwave heating, resistant heating, or passive or active susceptor heating to sinter both materials.

As discussed herein, interconnected channels may be printed between infill cells or honeycomb or open cells in the part interior, that connect to the part exterior, and a shell (including but not limited to a support shell) may have small open cell holes, large cells, or a honeycomb interior throughout to lower weight, save material, and improve penetration or diffusion of gases or liquids (e.g., fluids) for debinding. These access channels, open cells, and other debinding acceleration structures may be printed in the part or supports (including shrinking/densification supports or shrinking/densification platform). All or some of the channels/holes may be sized to remain open during debinding (including but not limited to under vacuum), yet close during the approximately 20% size reduction of sintering. Internal volumes may be printed with a channel to the outside of the part to permit support material to be removed, cleaned away, or more readily accessed by heat transfer or fluids or gasses used as solvents or catalysis.

Debinding times for debinding techniques involving solvent or catalyst fluids (liquid, gas, or other) may be considered in some cases to depend on the part "thickness". For example, a 4 cm thick or 2 cm thick part may debind more slowly than a 1 cm thick part, and in some cases this relationship is heuristically defined by a debinding time of, e.g., some number of minutes per millimeter of thickness. The time for removing debinding fluid (e.g., drying or cleaning) may also increase substantially proportionately with thickness. According to the present embodiment, the effective thickness of a part for the purposes of debinding time may be reduced by providing the aforementioned fluid access to an interior of the part, using channels from the exterior which may either remain open through sintering or be (effectively) closed following sintering.

Such channels may include at least one access channel to an exterior of the part, e.g., penetrating from the exterior of the part through wall structures of the 3D printed shape to one, several, or many infill cavities of the part; or may alternatively be surrounded by wall structures of the part. In some cases, an interconnected channel may include at least two access channels to an exterior of the part that similarly penetrate a wall, in order to provide an inlet and an outlet for fluid flow or simply to permit fluid to enter versus surface tension and/or internal gas. These inlet-honeycomb-outlet structures may be multiplied or interconnected. In some cases, the inlets may be connected to pressurized fluid flow (e.g., via either 3D printed or mechanically inserted flow channel structures). In some cases, the inlets may be connected to vacuum or a flushing gas. In some cases, "inlet" and "outlet" are interchangeable, depending on the stage of the process.

For example, the 3D printer according to FIGS. 1A-40 inclusive may be employed to feed the composite material including the binder matrix and a sinterable powder. "Walls" in a layer or shell follow positive contours or negative contours of a 3D model and are positioned according to the mesh or model outline or surface, and may be one or more roads or layers or shells thick (adjacent walls formed by offsetting from the model outline or surface). Internal walls (including horizontal walls as "roofs" or "floors") may also be formed, typically connecting to or extending from walls that follow the outer or inner contour of the 3D model shape. "Infill" or honeycomb extends between and among walls, floors, and roofs. The 3D printer may deposit a wall or successive layers of a wall, the wall having an access channel extending from an exterior of the part to an interior of the part. The access channel permits fluid to enter the interior (e.g., between positive and negative contours of a cross-section of the part). As shown, e.g., in FIGS. 26A-31, it is not necessary that the entirety of the interior of a part be interconnected to reduce the debinding time. For example, a wall-penetrating access channel and interconnected honeycomb (e.g., via a distribution channel) may be connected to route fluid to a location within a specified distance of the deepest interior region of a part; or to set a specified distance of a wall or walls of the part to a nearest fluid-filled chamber.

The 3D printer may deposit successive layers of honeycomb infill within the interior (e.g., between walls tracing positive and negative contours of the part), and the honeycomb infill may have a distribution channel (or several, or many distribution channels) connecting an interior volume of the honeycomb infill to the access channel. The 3D printer or subsequent debinding station or part washer may debind the binder matrix by flowing a debinding fluid through the access channel and/or distribution channel(s) and within the interior volume of the honeycomb infill.

FIG. 26A and FIG. 26B substantially correspond to FIGS. 5B and 5D, respectively, and show selected sections through FIG. 4 for the purpose of discussing printing and other process steps. As shown in FIGS. 4 and 26A, following the printing of the raft separation layer SL1, a raft RA1 of model material (e.g., metal-bearing composite) is printed. The raft or shrinking platform or densification linking platform RA1 may include routing channels CH1 therethrough for connecting to or directing fluid to access channels of the part. There may be one, several, or as shown, an array of routing channels CH1. The routing channels CH1 may connect during debinding to a matching one, several or array of debinding fluid supply channels (e.g., as shown in FIG. 25). Alternatively, or in addition, fluid flow through the routing channels may be promoted via circulation, heating, or agitation in an immersed bath of debinding fluid. Agitation may be forced fluid, mechanical, inductive, magnetic, or the like. The raft or shrinking platform RA1 is otherwise similar to that discussed with reference to FIG. 5B.

Figure 26C:
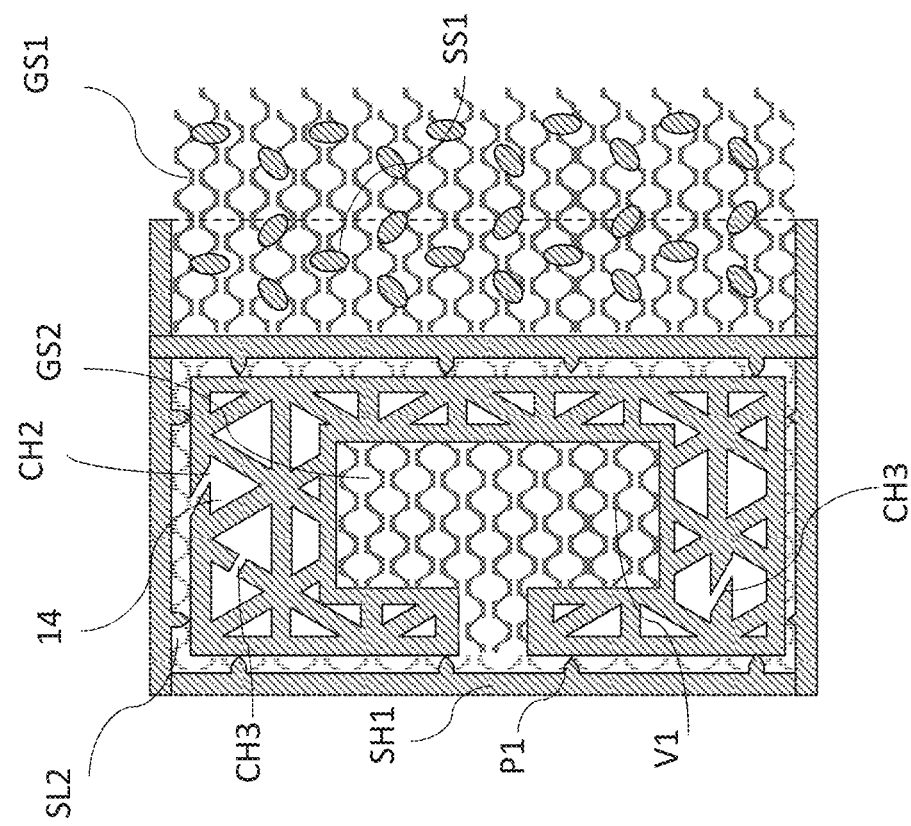
FIG. 26C and FIG. 26D are examples of respectively, hexagonal and triangular honeycombs shown in cross section and employed as infill.

As shown in FIGS. 4 and 26B, the surrounding shell support structure SH1 is continued printing in layers, and the internal volume V1 as well as the part interior may be printed with a channel (e.g., distribution channels CH3 leading to access channels CH2, not shown) to the outside of the part to permit support material to be removed, cleaned away, or more readily accessed by heat transfer or fluids or gasses used as solvents or catalysis. In the case of FIGS. 4, 26A, and 26B (and other Figures as well), as noted, solid bodies are shown to simplify explanation, but the internal structure of the solid bodies may be 3D printed with infill patterns (e.g., honeycombs) and/or may include chopped, short, long, or continuous fiber reinforcement. Two examples are shown in FIG. 26C and FIG. 26D.

Figure 26D:
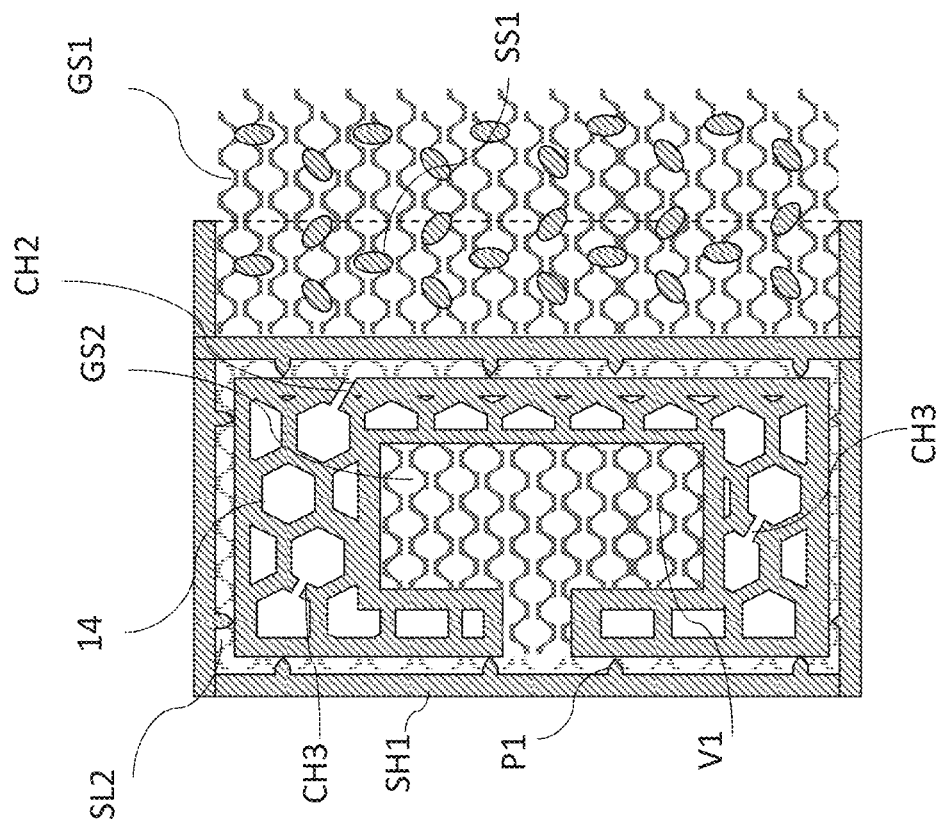

As shown in FIG. 26C and FIG. 26D, respectively, hexagonal and triangular honeycombs (which, shown in cross section, may include both cavities and infill formed in a vertical prism, columnar, or may be offset polyhedral cavities/infill) is employed as infill. Two distribution channels CH3 are shown in each sectioned layer. The distribution channels CH3 may be distributed about many layers (e.g., may be formed among a few layers) to interconnect some, many, or all infill or honeycomb cells. FIG. 26C also shows an access channel CH2, which may interconnect with the distribution channels CH3 by channel and cell cavity paths spanning different layers of the deposition. The channels CH2 and CH3 are angled through infill and walls of the part, which can increase the length of a channel and/or decrease the number or degree of turns in the fluid flow. In this manner—by changing the length or straightness of channels CH2 or CH3—fluid flow throughout the channels CH2 and CH3 part can be balanced for evenness or increase/decreased flow in a particular region.

Figure 27:
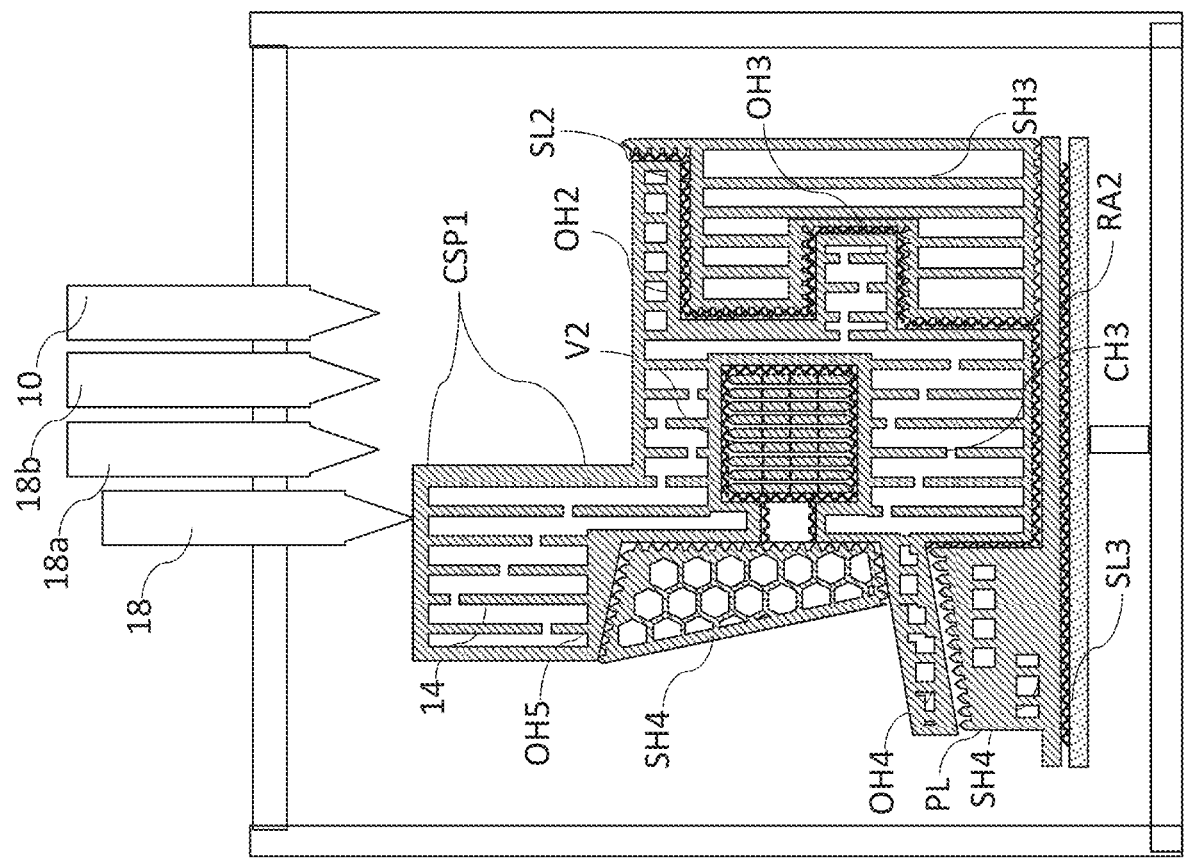
FIGS. 27 and 28 show side sectional views, substantially similar in description to FIGS. 4, 6, 8 and 9, in which honeycomb cavities/infill are formed as vertical, columnar prism shapes.

FIG. 27 shows a side sectional view, substantially similar in description to FIGS. 4, 6, 8 and 9, in which the honeycomb cavities/infill are formed as vertical, columnar prism shapes. Distribution channels CH3 (e.g., approximately 20 shown) are shown among the many layers of the deposited part. The distribution channels CH3 are shown distributed about many layers to interconnect some, many, or all infill or honeycomb cells. No channels extend into overhangs OH2 or OH4, which may not be thick enough to need additional debinder fluid flow. As shown, sintering support or form-fitting shell SH3 may also be filled with infill cells, and may or may not additionally include channels, access or distribution channels CH2 or CH3 (none shown in FIG. 27). FIG. 27 does not show the optional access channel CH2, in the case where the distribution channels CH3 by themselves increase debinding speed. In one variation, 20% or fewer of the vertical honeycomb cavities of the infill, or vertical column cavities having an area of less than 5% of the area of a largest cross section, act as distribution channels.

Figure 28:
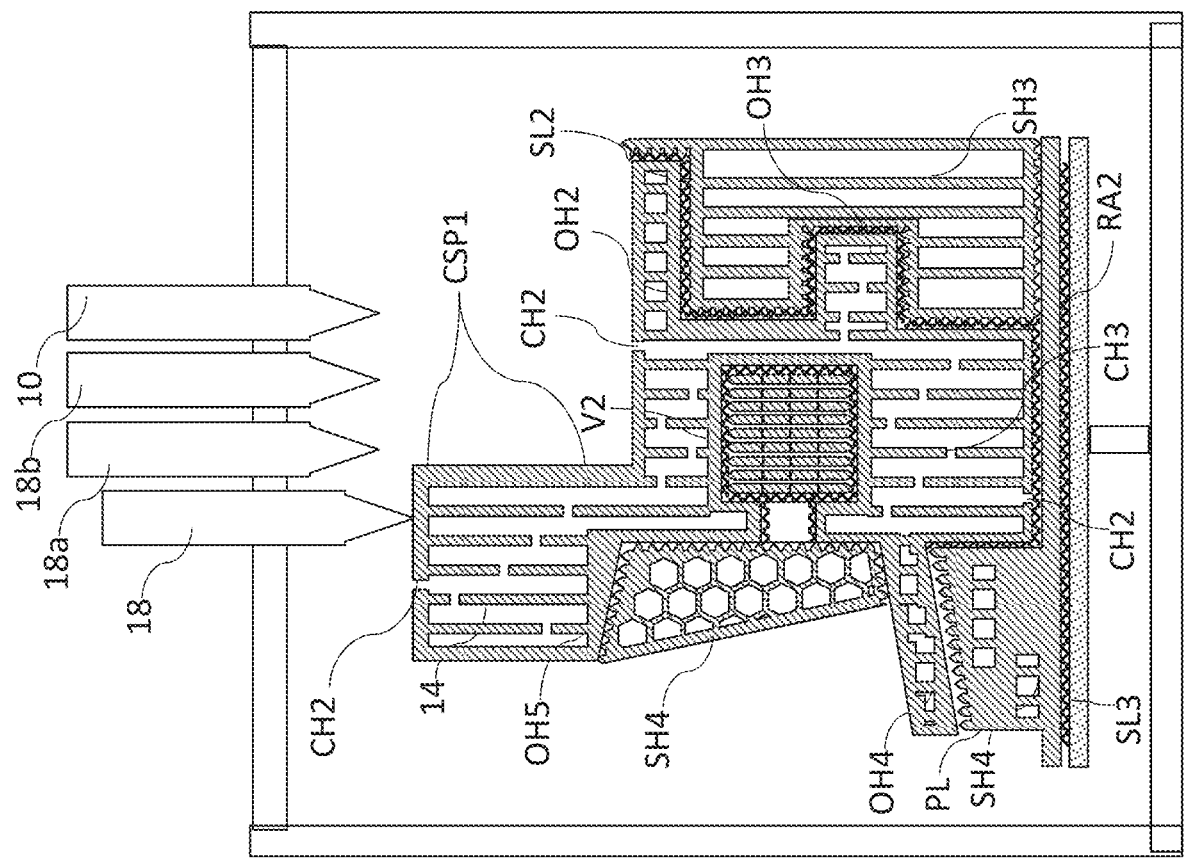

FIGS. 27 and 28 show a side sectional view, substantially similar in description to FIGS. 4, 6, 8 and 9 (common reference numbers being similarly described), in which the honeycomb cavities/infill are formed as vertical, columnar prism shapes. Distribution channels CH3 (e.g., approximately 20 shown) are shown among the many layers of the deposited part. The distribution channels CH3 are shown distributed about many layers to interconnect some, many, or all infill or honeycomb cells. No channels are shown extending into overhangs OH2 or OH4, which may not be thick enough to need additional debinder fluid flow. As shown, sintering support or form-fitting shell SH3 may also be filled with infill cells, and may or may not additionally include channels access or distribution channels CH2 or CH3 (none shown in FIG. 27). FIG. 27 does not show the optional access channel CH2, i.e., showing the case where the distribution channels CH3 by themselves increase debinding speed. However, the access channels CH2 shown in other Figures and described herein may be applied to the structure of FIG. 27. FIG. 28 shows access channels CH2 which provide ingress and egress for fluid flow into the distribution channel CH3 interconnected honeycomb cells. As should be noted throughout, dimensions for channels may be exaggerated, and breaks in walls as shown merely through holes—the distribution channels CH3 may be small circular holes, and take up less than 1% (e.g., less than 1-3%) of the surface area of the infill, and similarly, the access channels CH2 may be small circular through holes which take up less than 1% (e.g., less than 1-3%) of the surface area of the part walls.

Figure 29:
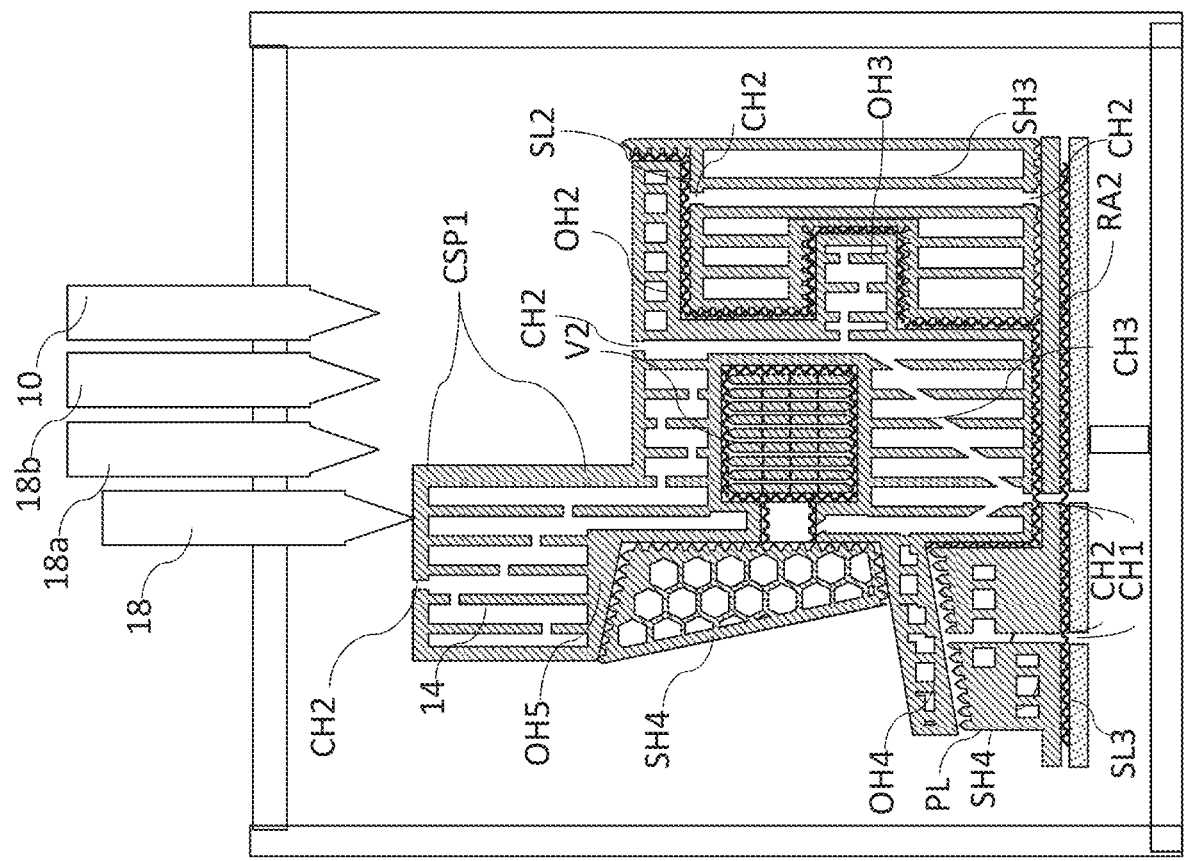
FIG. 29 shows a side sectional view, substantially similar in description to FIGS. 4, 6, 8, 9, 27, and 28 in which the distribution channels cavities/infill are formed in an aligned, and/or angled, manner throughout the columnar prism shapes.

FIG. 29 shows a side sectional view, substantially similar in description to FIGS. 4, 6, 8, 9, 27, and 28 (common reference numbers being similarly described) in which the distribution channels cavities/infill are formed in an aligned, and/or angled, manner throughout the columnar prism shapes. As discussed, changing the diameter, length and/or straightness of the channels CH3, or depositing obstacles or baffles within them, may increase or decrease resistance to flow. In contrast to FIG. 28, the sintering support or shell structures SH3 and SH4 also include access channels CH2 to permit fluid flow therethrough (both an inlet and outlet). Further, routing channels CH1 are printed in intervening layers (e.g., raft RA2, shell structures SH3, SH4, release or separation layers SL3), and in this case may match a matching routing channel provided in the print bed or build plate (e.g., to provide fluid flow access in those cases where a print bed or build plate may be transported together with the green and/or brown part throughout the debinding and/or sintering process).

Figure 30:
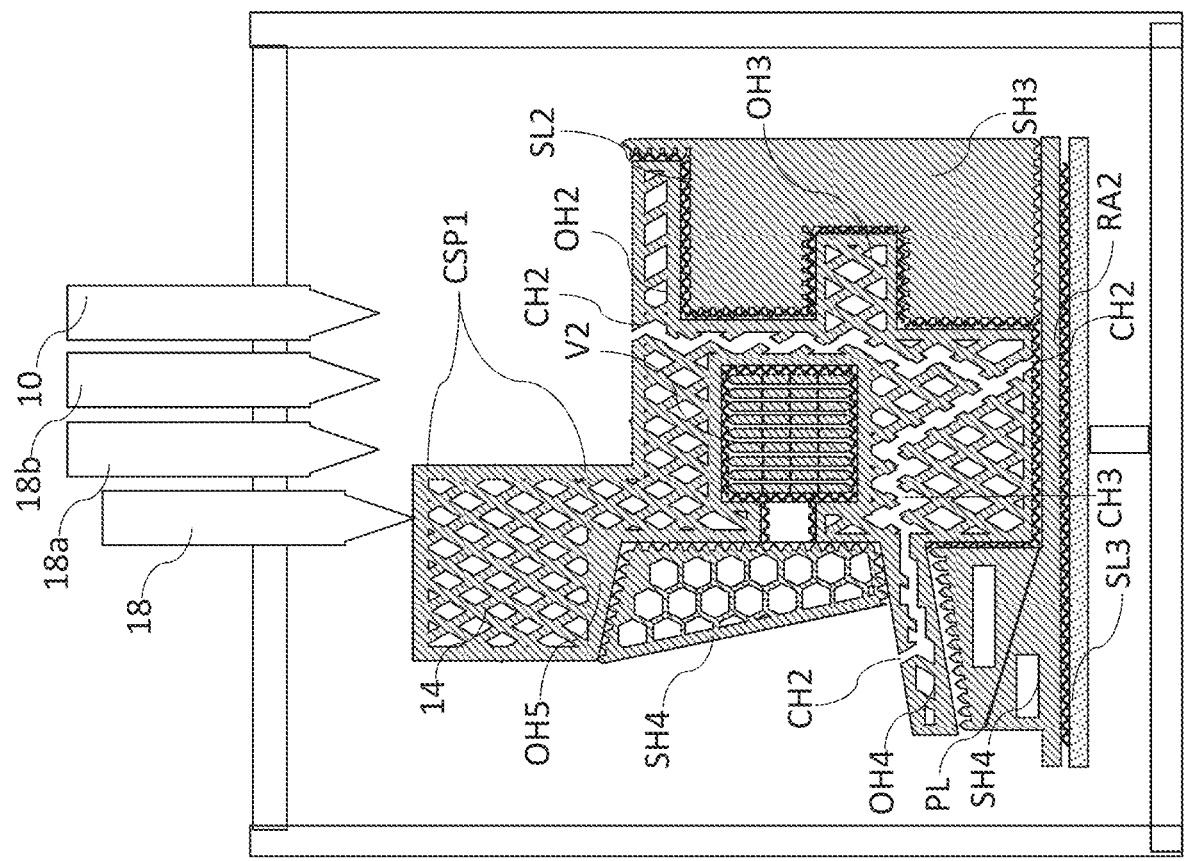
FIGS. 30 and 31 show a side sectional view, substantially similar in description to FIGS. 4, 6, 8, 9, 27, 28 and 29, in which access channels are provided.

FIG. 30 shows a side sectional view, substantially similar in description to FIGS. 4, 6, 8, 9, 27, 28 and 29 (common reference numbers being similarly described) in which the distribution channels CH3 throughout cavities/infill are formed in an aligned, and/or angled, manner throughout cellular (octahedral as one example) polyhedron stacked shapes, and in which access channels CH2 are provided in three locations in this section. It should be noted that wall thicknesses may be maintained substantially constant (e.g., within 5% of thickness) throughout—e.g., the exterior wall or shell thickness of the part being the same as the interior walls of the infill, and/or either being the same as walls forming distribution or access channels, and/or any of these being the same thickness as walls forming the sintering support structures or shrinking platform.

Figure 31:
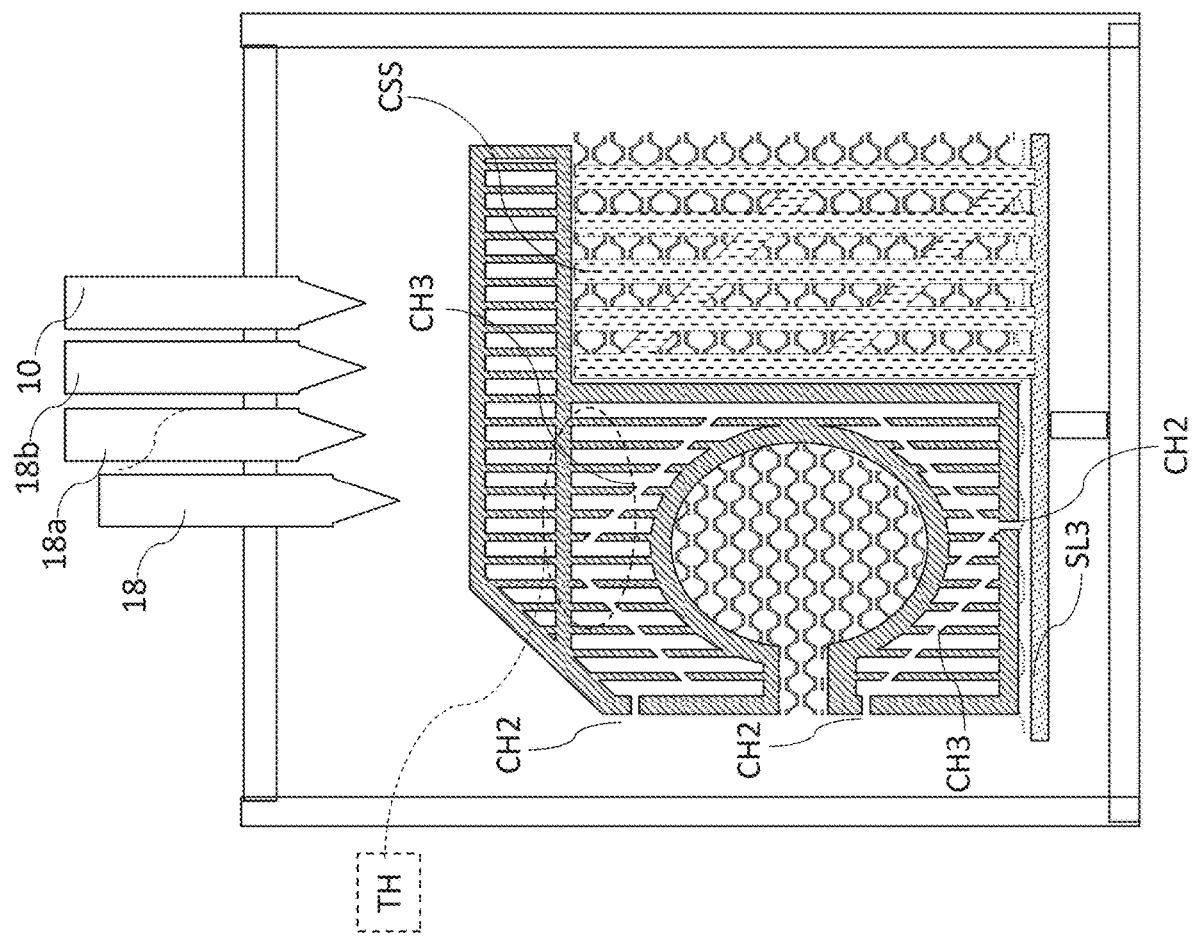

FIG. 31 shows a side sectional view, a closer view of the exemplary part of the process diagram of FIG. 25, substantially similar in description to FIGS. 4, 6, 8, 9, 27, 28 29, and 30 (common reference numbers being similarly described), in which the distribution channels CH3 throughout cavities/infill are formed in an aligned, and/or angled, manner throughout cellular prism shapes, and in which access channels CH2 are provided in two locations in this section. The distribution channels pass near to, adjacent to, or proximate to the portion of the part interior farthest from, deepest within, or thickest TH with reference to a negative or positive contour or wall of the part. As discussed with reference to FIG. 25, the uppermost region of the part shown in FIG. 31 does not include channels, as the part interior is close enough to debinder fluid flow such that it may be expected that the uppermost region of the part may debind in an acceptable time.

Accordingly, as shown in FIGS. 25-31, the process of forming a "thick" part amenable to rapid fluid-based debinding may include depositing successive layers of the wall of the part to form not just one access channel CH2, but also a second access channel CH2 extending from the exterior of the part to the interior of the part. This may assist in debinding the binder matrix by flowing a debinding fluid in through the first access channel, via the distribution channel, and out through the second access channel. In this case, the first access channel CH2 may be connected to a pressurized supply of debinding fluid to force debinding fluid through and/or throughout the first access channel, distribution channel(s), and second access channel. Additionally, or in the alternative, in this process, successive layers of honeycomb infill may be deposited in the interior of the part to form a plurality of distribution channels CH3 connecting an interior volume of the honeycomb infill to the first access channel CH2, at least some of the plurality of distribution channels CH3 being of different length from other of the distribution channels CH3.

Figure 32:
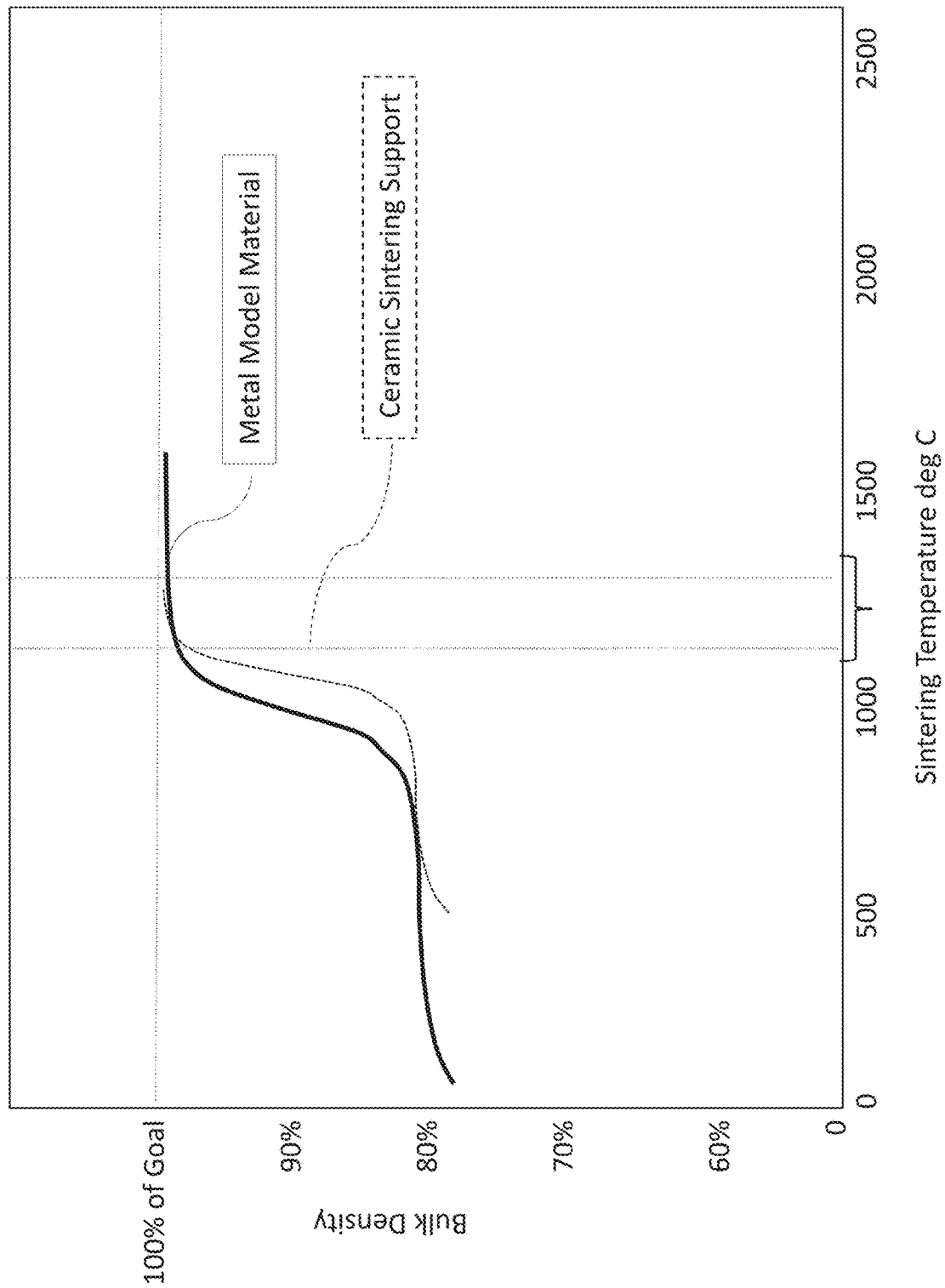
FIG. 32 shows a chart in which the amount of shrinkage of the ceramic sintering support material should be less than that of the part model material until the final shrinkage amount is reached.

As shown in FIGS. 32 and 33A-33D, companion ceramic sintering supports may be printed using a ceramic composite material that behaves dimensionally similarly to the metal model material but does not sinter together with it. As a part and its companion ceramic sintering supports CSS may sinter according to any particular temperature profile suitable for sintering the part's model material, the material of the ceramic sintering support shrinks by a particular amount and in some cases along a particular density profile (e.g., starting and ending density, starting and ending temperatures, shape of the curve between) according to at least the composition of the ceramic sintering support material. To match the sintering behavior of the ceramic sintering supports to that of the part model material, as noted, the amount of final shrinkage should be the same. As shown in FIG. 32, optionally, the amount of shrinkage of the ceramic sintering support material should be less than that of the part model material until the final shrinkage amount is reached. Further optionally, the ceramic sintering support material may begin to shrink at a lower temperature or earlier at the same temperature.

In general, the substantial temperature ramp and environmental conditions (such as gases) for sintering a target metal part model material is presumed to be the temperature ramp to be used, because the part must sinter adequately with or without supports. Exceptions are possible (e.g., minor changes to the part model sintering temperature ramp to allow the supports to function better). Under these conditions (e.g., given a temperature ramp suitable for sintering a metal part model material), a candidate first ceramic material, e.g., α-alumina or other alumina, having a sintering temperature above that of the part model material may have its sintering temperature lowered and/or its shrinkage amount changed by (i) reducing average particle size ("APS") or (ii) mixing in a compatible second or third lower temperature sintering material (e.g., silica, or yttria-silica-zirconia). These mixed materials would also be sintered. In addition, or in the alternative, a non-sintering filler that sinters at a significantly higher temperature may be mixed (which will generally decrease the amount of shrinking or densification). In general, homogeneous materials having a smaller APS will start densifying at lower temperatures and will attain a full density at a lower temperature than the larger APS materials.

In addition, or in the alternative, the sintering temperature, shrinking amount or the degree of densification can be changed by changing the particle size distribution ("PSD", e.g., for the same average particle size, a different proportion or composition of larger and smaller particles). In addition, or in the alternative, when materials that may react are mixed, the sintering temperature, shrinking amount or the degree of densification of the mixture can be changed by using component mixing that may densify at a lower temperature than a chemical reaction, e.g., combining alumina and silica in a manner that densifies (sinters) at a temperature lower than that which forms mullite. For example, alumina-silica powder may be generated as alumina powder particles each forming an alumina core with a shell of silica, where the mixture first densifies/sinters between, e.g., 1150 and 1300 deg C., and converts to mullite only at higher temperatures, e.g., 1300-1600 degrees C.

In addition, or in the alternative, the sintering temperature, shrinking amount or the degree of densification can be changed by changing a degree of homogenization (molecular, nano-scale, core-shell structures) of dissimilar components. In the case of part shapes including either or both of convex or concave shapes (protrusions, cavities, or contours), as shown in FIGS. 33A-33D, a sintering support made of a material having a different shrinkage rate or shrinkage amount can cause either or both of slumping or interference that can could cause the shape to deform. It should be noted that FIGS. 33A-33D are exaggerated in scale.

An appropriate sintering support material may have a final shrinkage amount over the same time-temperature sintering profile as the model material, as discussed herein. However, perfect matching of rate and final shrinkage percentage is not necessary. For example, the sintering support material should not shrink at a slower rate than the model material, or concave shapes on the part may be deformed and may not be restored by gravity. However, should the sintering support material shrink at a faster rate than the model material, printed sintering supports may not interfere with many concave shapes of the part (e.g., as shown in FIG. 33B). In addition, for a faster shrinking sintering support, the printed supports may be split, and gaps printed into sintering supports, to avoid interfering with and/or deforming either convex shapes or certain concave shapes. In this case, gravity and some elastic behavior at sintering temperatures,—even if the sintering support material shrinks at a faster rate than the model material—will permit the part and the sintering supports to "match up" at the final sintering shrinkage amount.

As shown in FIGS. 33C and 33D gaps may be printed side-to-side, in the vertical direction or horizontal direction, together with green body supports and/or a separation layer between each ceramic sintering support and the part (including between adjacent ceramic sintering supports). Gaps may be printed adjacent convex or concave part shapes or contours. In addition, gaps may be printed adjacent convex or concave part shapes or contours where a surface of the part and a surface of a ceramic support follow respective paths that would, without the gap, interfere during shrinking. In the case of vertical gaps, a small amount (e.g., a few mm) of unsupported span of part material is stiff enough to resists gravity-caused slump during sintering. In the case of horizontal or diagonal gaps, a separation layer in the gap including remnant powder (spheres) following debinding will permit substantially free horizontal or diagonal sliding of the ceramic support during sintering.

However, as shown in FIGS. 33A-33D, even when the ceramic sintering supports shrink/sinter earlier than and/or faster than and/or equal to the metal part material until the target density, substantially differing shrink rates or other differences in bulk density curve over time (e.g. differing starting or ending positions, differing curve shapes) may require some rearranging of some sintering supports following debinding, such that the shrink rate profile of the model material to the sintering support material be matched to within 5 percent of the bulk density of the model material over rising and constant temperature portions of a sintering temperature ramp.

Figure 34A:
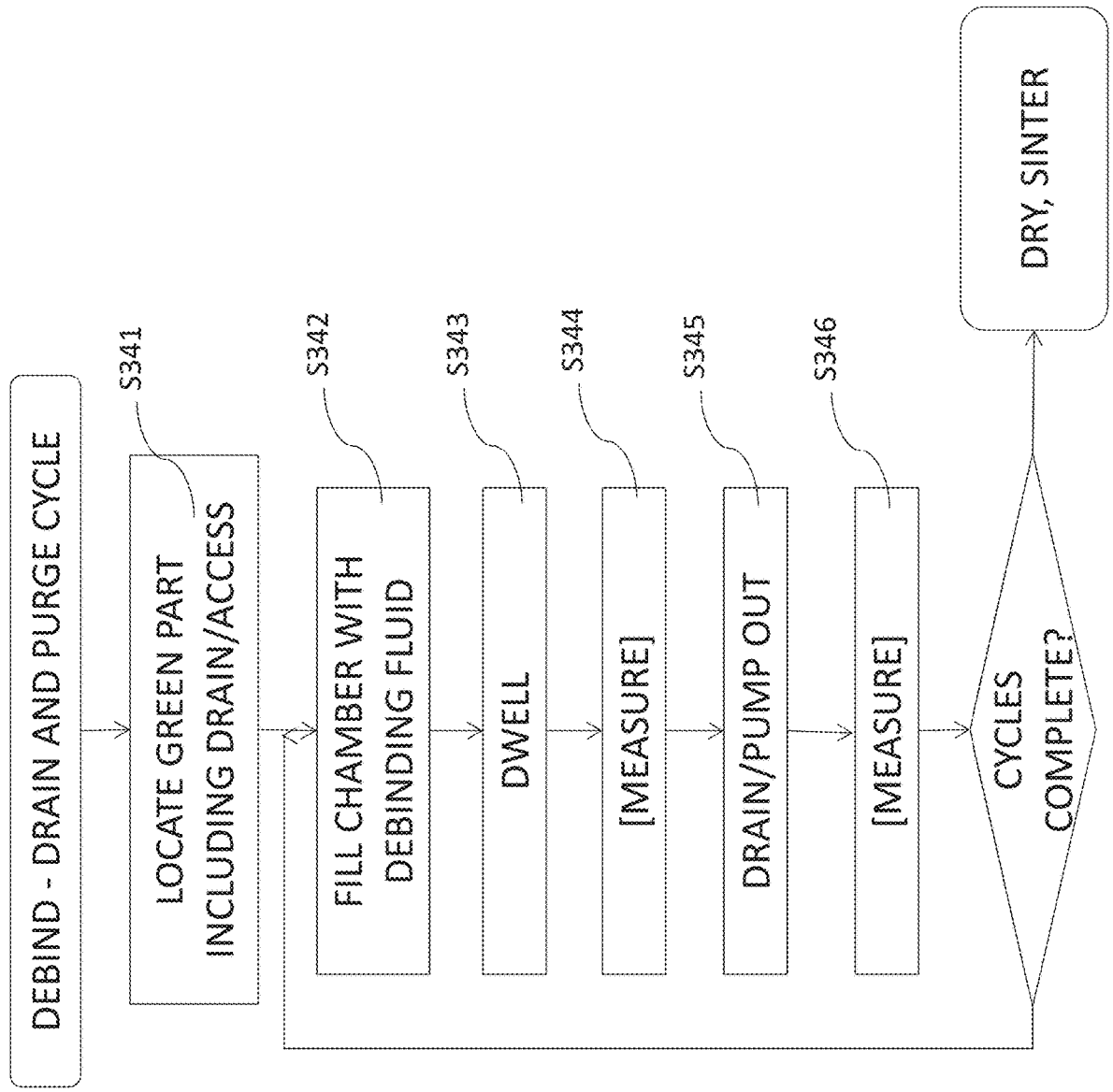
FIGS. 34A and 34B show a flowchart and schematic, respectively, of a gravity-aided debinding process useful with parts as described herein.
Figure 34B:
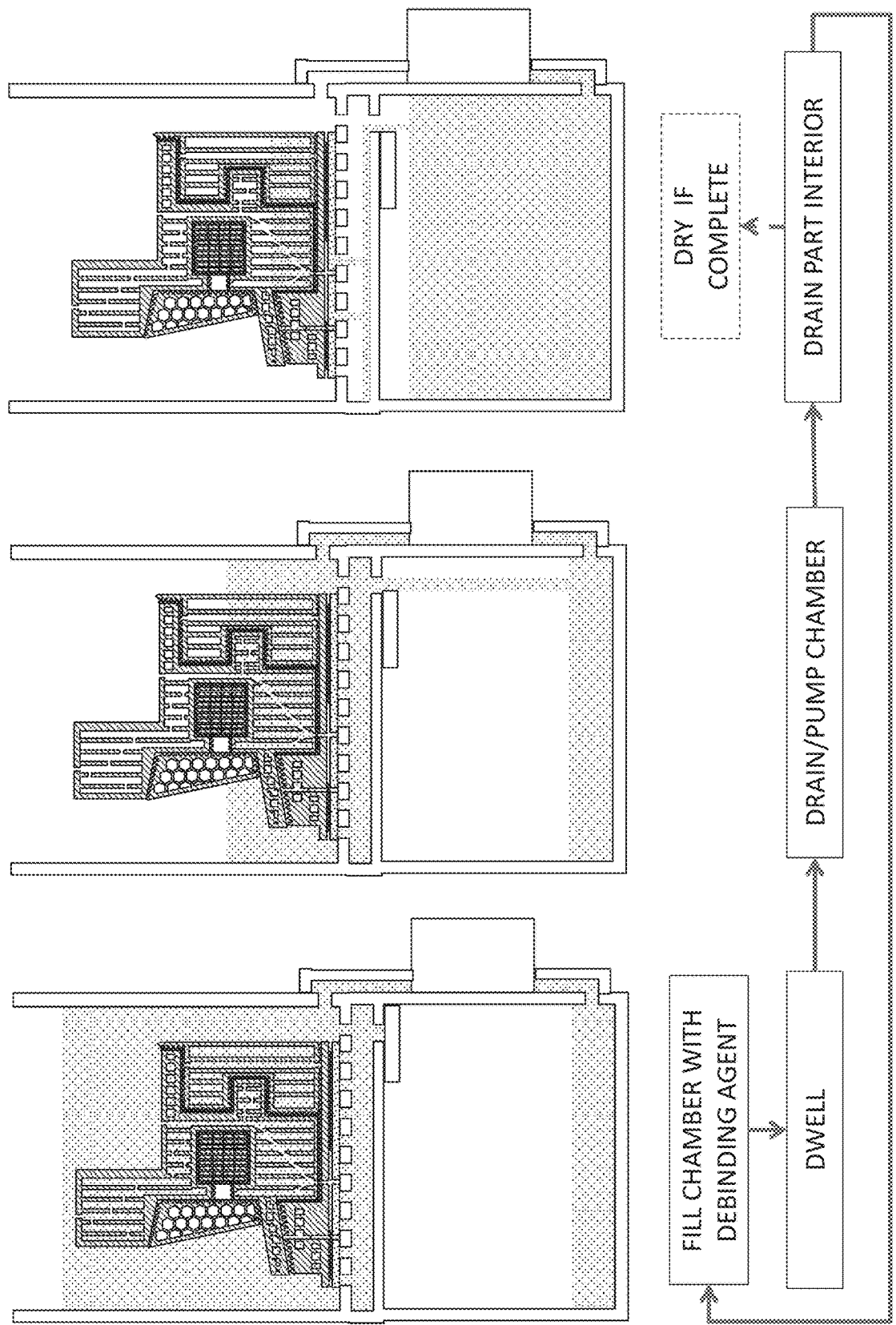

FIGS. 34A and 34B show a flowchart and schematic, respectively, that show a gravity-aided debinding process useful with parts as described herein printed with channels CH1, CH2, and/or CH3 (or even in some cases without). FIGS. 34A and 34B are described and shown using the cross-sectional structure of FIG. 29 (having such channels) as an example. As shown in FIGS. 34A and 34B, access, routing, and distribution channels permit fluid to enter the part interior to more quickly debind the green part to a brown part. Debinding as a solvent based (including with thermal assistance, or thermal debinding with solvent assistance) or catalytic process may take hours, sufficient time to permit fill-purge fluid cycles. In one exemplary process, as shown in FIGS. 34A and 34B, a part with access, distribution, and/or routing channels is placed in a debinding chamber, container or facility in step S341. As shown in FIG. 34B, the part may be suspended or put on a porous rack or otherwise held in a manner that leaves at least top and bottom channel inlets and outlets relatively clear of obstructions to gravity based fluid flow.

In Step S342, the chamber may be filled with solvent or other debinding agent (alternatively, or in addition, the part is lowered or otherwise placed into a pre-filled bath). In Step S343 the part is kept in the debinding agent for a predetermined, modeled, calculated, or measured dwell time. The dwell time may be sufficient for, e.g., the debinding agent to permeate the channels. The dwell time may be additionally or alternatively sufficient for, e.g., the debinding agent to debind the first matrix material by a first effective amount (e.g., 5-30% or higher by volume of matrix material removal). The dwell time or period in Step S343 may be enhanced by, as shown in FIG. 34B, by agitation (e.g., mechanical members, entire chamber, bubbles, etc.), vibration and/or circulation. In optional step S344, a property or characteristic representative of the state of debinding may be detected and/or measured, and optionally used as a trigger to start a draining process to purge or drain debinding agent and removed material in preparation for a next cycle (there may be only one cycle in some cases of measurement). Exemplary measurements would be (i) via an optical or electromagnetic sensor, measuring a property such as opacity, color, capacitance, inductance representative of an amount of material debound (ii) via a mechanical or fluid-responsive sensor (optionally connected to an optical or electromagnetic element), measuring a property such as natural frequency, viscosity, or density or (iii) via a chemical sensor (optionally connected to an optical or electromagnetic element) measuring a chemical change such as pH, oxygen content, or the like.

In step S345, and as shown in FIG. 34B, the debinding chamber may be drained via gravity into a reservoir. Given sufficient time, and optionally aided by agitation, heating, circulation, or other thermomechanical processes, internal debinding agent fluid-filled channels (such as distribution and access channels) within the part also drain. The reservoir may include a filter, baffles, or other cleaner for removing debound material, and/or catalytic, chemical, magnetic, electrical or thermomechanical agent(s) for precipitating or otherwise gathering or removing debound material from the debinding agent. Alternatively, or in addition, the reservoir may include a valve for effecting the drain from the debinding chamber, and/or a pump for recirculating debinding agent back into the debinding chamber. Alternatively, or in addition, the reservoir may be integrated in the debinding chamber (e.g., recirculated in the debinding chamber after material removal).

In step S346, and as shown in FIG. 34B, post draining or partial draining, a measurement may be taken to gauge to progress of debinding and set a subsequent stage trigger or instruction for the next cycle. The sensor applicable may be similar or the same as that described with reference to step S344. In addition, or in the alternative, the part weight may be measured (before and after a debinding cycle) via a load cell, etc. In a case where the number of cycles of filling and draining the chamber is relatively low (e.g., 2-10 cycles), the changing part weight may be recorded (e.g., as a profile) and used to determine the time, temperature, and/or agitation of a subsequent cycle. In a case where the cycle count is 2-10 or higher (e.g., including continuous recycling and/or fill/drain), the profile of weight change may also be employed to model an exponential decay constant relating to the maximum removable binder per part weight and set a termination cycle count or time based on the exponential decay constant (e.g., terminating at a time or cycle count for 90-95% removed material by weight based on the exponential decay rate).

Figure 35:
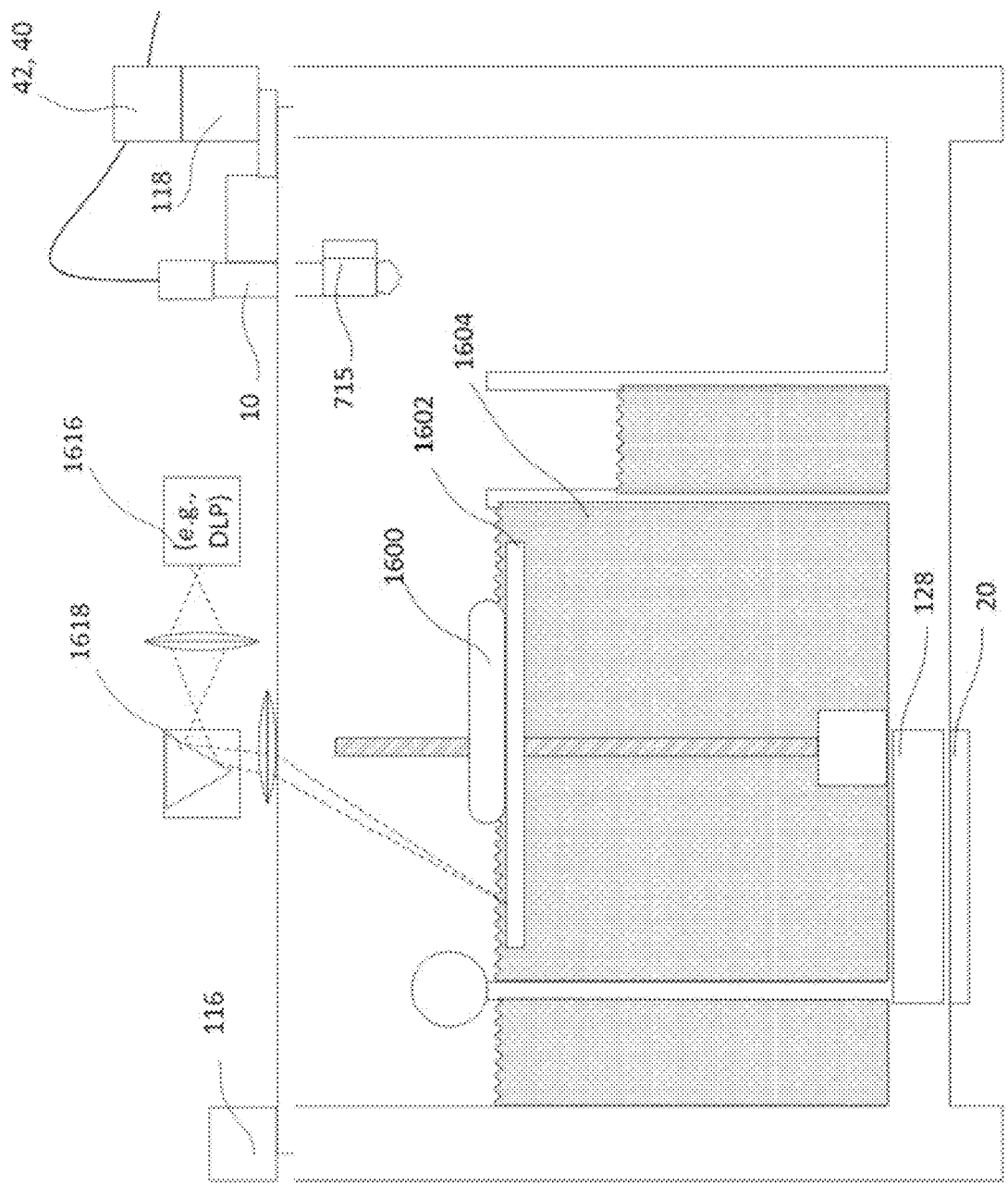
FIG. 35 shows a 3D printer for forming green parts from a curable or debindable photopolymer.

In step S347, and as shown in FIG. 34B, cycles may repeat until complete ("N CYCLES" being determined by predetermined count or time, by direct or indirect measured feedback as described above, or other modeling). When the cycles of debinding via gravity-based fill/drain cycles are complete, the green part has become a brown part, and may be actively or passively dried or otherwise post-processed in preparation for sintering. As shown in FIG. 35, and noted herein, the green parts may be formed from a curable and/or debindable photopolymer including a sinterable powder, as well as optionally a second stage binder (either a debindable, e.g., pyrolysing photopolymer or thermoplastic). As noted in the CFF patent applications and other prior patent applications incorporated herein, different additive manufacturing processes can include a matrix in liquid (e.g., SLA) or powder (e.g., SLS) form to manufacture a composite material including a matrix (e.g., debindable plastic) solidified around the core materials (e.g., metal powder). Many methods described herein can also be applied to Selective Laser Sintering which is analogous to stereolithography but uses a powdered resin for the construction medium as the matrix as compared to a liquid resin. The reinforcement might be used for structural, electrical conductivity, optical conductivity, and/or fluidic conductivity properties. As described in the CFF patent applications and other prior patent applications incorporated herein, and as shown in FIG. 35, a stereolithography process is used to form a three-dimensional part, the layer to be printed being covered with resin, cured with UV light or a laser of a specified wavelength, the light used to cure the resin sweeping over the surface of the part to selectively harden the resin (matrix) and bond it to the previous underlying layer.

FIG. 35 depicts an embodiment of the stereolithography process described above. Description of FIGS. 1A and 1B herein would be recognized by one of skill in the art as consistent with FIG. 35 (despite differences in reference numbers). As depicted in the figure, a part 1600 is being built on a platen 1602 using stereolithography. The part 1600 is immersed in a liquid resin material 1604 contained in a tray 1606. The liquid resin material may be any appropriate photopolymer (e.g., debindable composite including a primary debindable component and optionally a secondary debindable component and a sinterable powder). In addition to the resin bath, during formation of the part 1600, the platen 1602 is moved to sequentially lower positions corresponding to the thickness of a layer after the formation of each layer to keep the part 1600 submerged in the liquid resin material 1604. In the depicted embodiment, a laser, or other appropriate type of electromagnetic radiation, is directed to cure the resin. The laser may be generated by a source 1616 and is directed by a controllable mirror 1618.

Extrusion type and other deposition 3D printers employ various printing approaches for completing perimeters, in particular for reducing seams resulting from extruding a closed perimeter path. Any path point not on a perimeter path is in an interior region, because the perimeter path constitutes the outermost path points (e.g., a new path that forms part of the outer perimeter renders previous paths to be interior regions). Accordingly, printing paths may form a seam with a butt joint or other than a butt joint (or example, overlapping, self-crossing, interlocking). Generally, one segment and one seam is preferred because fewer seams tend to have superior aesthetics, sealing, and dimensional stability. Further, wall or shell contour paths (in contrast to "raster" fill paths) have been deposited in a same rotational direction—either clockwise or counterclockwise. Paths are printed in the same clockwise or counterclockwise direction even if a perimeter path branches to the interior. This simplifies and speeds printing as perimeter paths can be continuously printed without reflex angle turns (e.g., turns of less than 180 degrees) from the current heading.

In the case where a printer deposits a composite feedstock intended to be debound then sintered, and a second stage binder in place during sintering includes retaining polymers of a common molecular lengths, deposition may create stress along the polymer molecule chains (e.g., HDPE etc.) within at least the second stage binder aligned to some extent along the deposition paths. In the green or brown state, the stresses may not have any particular effect on dimensional stability. However, as the part is heated in the sintering process, the stresses may relax or pull in each layer, cumulatively changing the shape of the part if many small changes add up in the many layers of the part.

In such a case, brown parts may be dimensionally consistent with the deposited green part, but may display a twist around a vertical axis after sintering. In a case where heating a brown part to mild levels (e.g., 150-200 C) causes twist, the second stage polymer binder may be considered to be heated to a level where residual stress can relax, causing the twist, as deposition stress built into the brown part is relaxed. As the printer deposits a layer, long chain molecules that compose the second stage binder polymer (the part of the binder that is left after the primary debind) may be strained along the printing direction. When heated to a relaxing temperature, the molecules may pull back, potentially causing a macroscopic twist in the part as pulls among many layers accumulate.

One countermeasure for twist is to print roads in a counteracting or retrograde direction. The three most common categories of roads are shells or walls, which are printed to form the perimeter of a sliced interior or exterior contour; "raster" fill, which is printed to fill interior volume in a solid manner, and infill honeycomb, which is printed to fill interior volume in a honeycomb. In addition, interior volume may be filled in any coverage pattern including non-raster or non-boustrophedon fills that cross road and/or are parallel or adjacent other roads or contours (e.g., random fill, wall-following fill, spiral fill, Zamboni-pattern fill, or the like), and may be filled in variable size, randomized, anisotropic, foam-like, sponge-like, 3-dimensional, or other versions of regular and irregular cellular (cell walls and low density or atmosphere cell interior) fills. For shells or walls, many or most parts are not formed from vertical prism shapes and through-holes, so layer to layer the shape of a slice and the shape of the shell or all incrementally changes for different wall slopes, concavities and convexities. Close to upper and lower surfaces, the incremental change in wall or shell shape may be more significant.

At a topmost horizontal or substantially horizontal flat layer with, e.g., protrusions or another shape beginning in the layer above, the shape of shells or walls may change completely from one layer to the next. Accordingly, it is optionally advantageous to print first and second sets of opposing direction walls or shells within one layer, so as to avoid layer-to layer comparison which may be more complex. One approach is to print each outer perimeter or negative contour inner perimeter with a companion, parallel, adjacent wall or shell road. In such a case, the length of the companion or offsetting road is not necessarily precisely the same, especially for small positive and negative contours (e.g., for a 3 mm diameter feature, the length of the perimeter road vs. a companion road may differ by 25 or 30%, while at 30 mm the length of the companion road may be 5% or less difference). In such a case an amount of overlap determined according to the difference in perimeter lengths may be effective at removing twist.

For raster fill within the shells or walls, a twisting effect from the relaxation of residual stress may not be as pronounced because raster rows may include some retrograde paths. However, as the filled interior area becomes smaller, differences in path length among raster rows and turns may be more pronounced. Overlap determined according to a difference in directional lengths (e.g., including straight rows as well as end-of-row turns) may be used to offset a length difference. In addition, raster-like or cellular patterns may be printed in tile patterns that each include main paths and parallel retrograde paths to relieve twisting stress relaxation within the tile and/or among tiles.

Figure 36A:
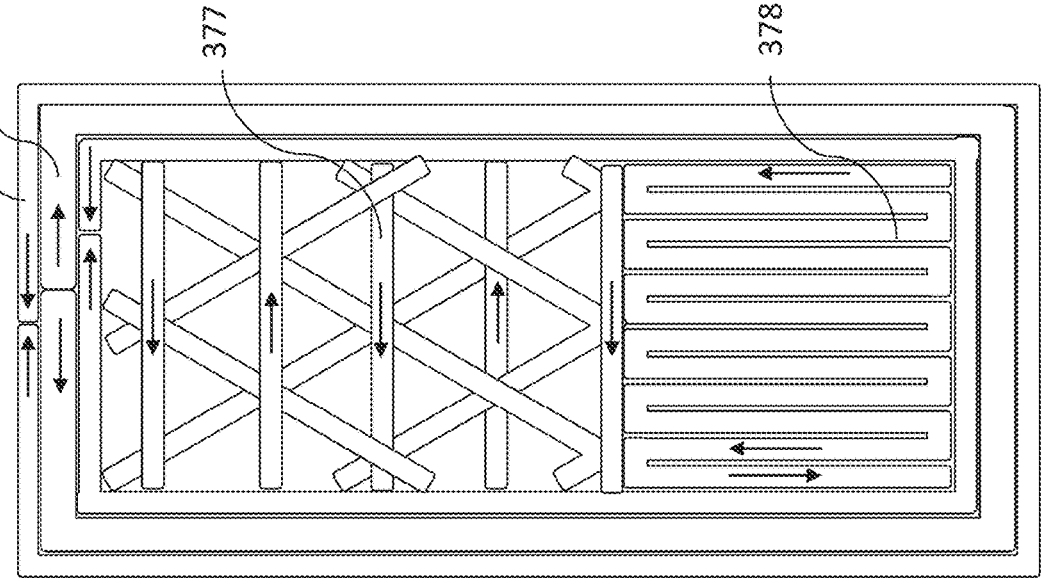
FIGS. 36A and 36B show schematics representing deposition direction of deposition paths in retrograde patterns.

In one example of such an embodiment or expression of the invention, as shown in FIG. 36A, where deposition direction is shown with an arrow within a deposition path, a method for building a part with a deposition-based additive manufacturing system, may include depositing, in a first direction (as indicated by an internal arrow), a polymer-including material along a first contour tool path to form a perimeter path 371 of a layer of a green part and to define an interior region within the perimeter path. The material is also deposited in a second direction retrograde the first direction on a second contour tool path to form an adjacent path 372 in the interior region adjacent the perimeter path 371. The deposition of the adjacent path 372 in the second direction stresses polymer chains in the material in a direction opposite to stresses in polymer chains in the material in the perimeter path 371, and reduces part twist caused by relaxation of the polymer chains in the part.

Figure 36B:
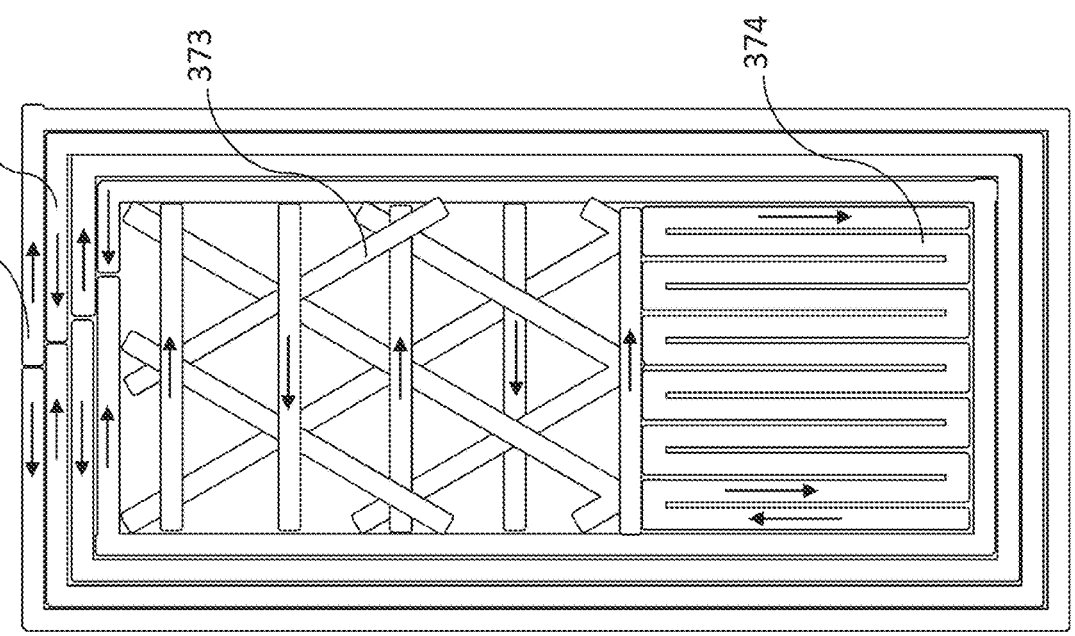

FIG. 36B may be considered a different version of the layer of FIG. 36A, or may be considered to depict an adjacent layer (FIG. 36B is depicted a smaller outer perimeter than FIG. 36A, such as would be the case for an adjacent layer sloping to a peak). As shown, an adjacent perimeter path 376 in an adjacent layer may be alternatively or also deposited in a retrograde direction with respect to the perimeter path 371, and other paths such as raster fill 378 or honeycomb infill 377 may also be printed in a retrograde direction with respect to parallel paths in an adjacent layer 374, 373 respectively. Also as shown in FIG. 36B, an adjacent road or deposition 376 may be deposited wider or at a higher rate than a perimeter path 375 (or narrower). When an odd number of walls is deposited at a perimeter, the changed width or deposition rate may offset the twist tendency of two adjacent depositions (on either side) in the same layer.

Figure 37A:
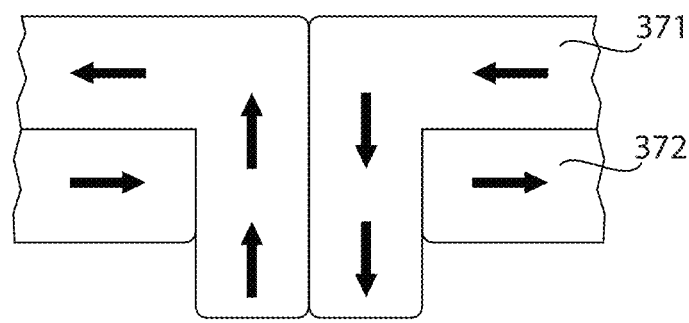
FIGS. 37A-37H, 37J are schematic views representing seam and joint interaction in deposition walls and honeycombs.
Figure 37B:
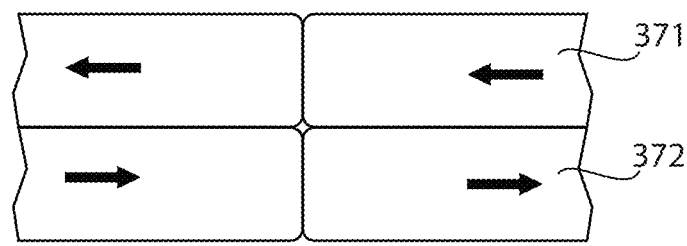
Figure 37C:
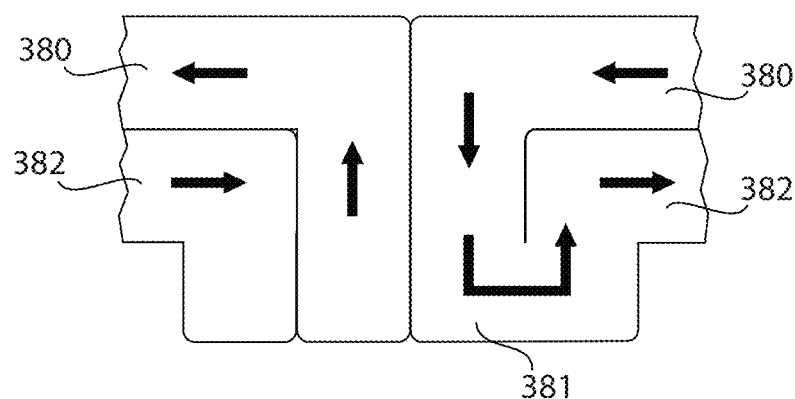
Figure 37D:
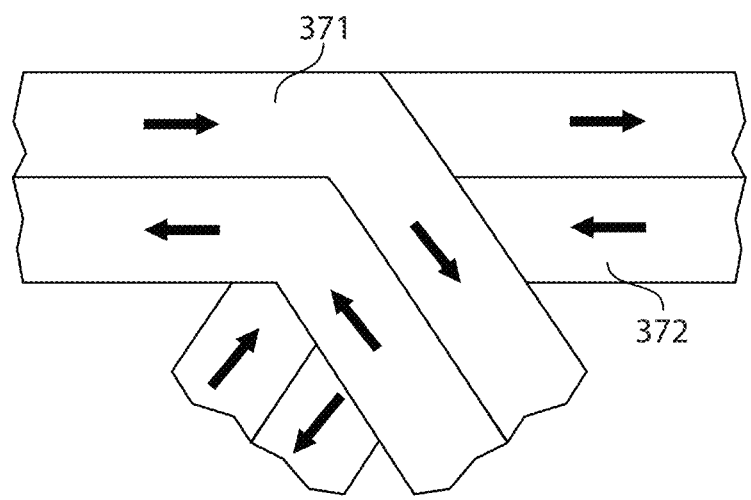
Figure 37E:
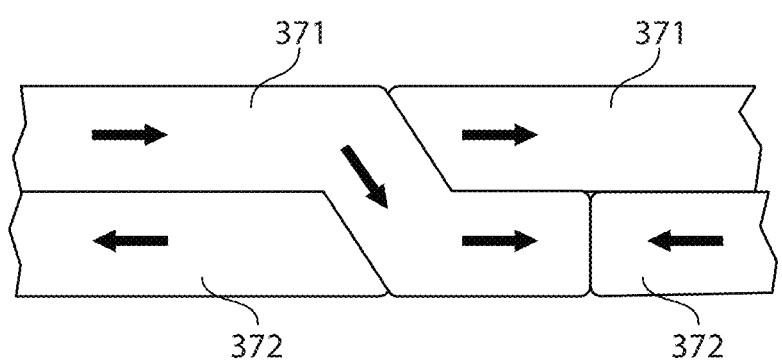
Figure 37F:
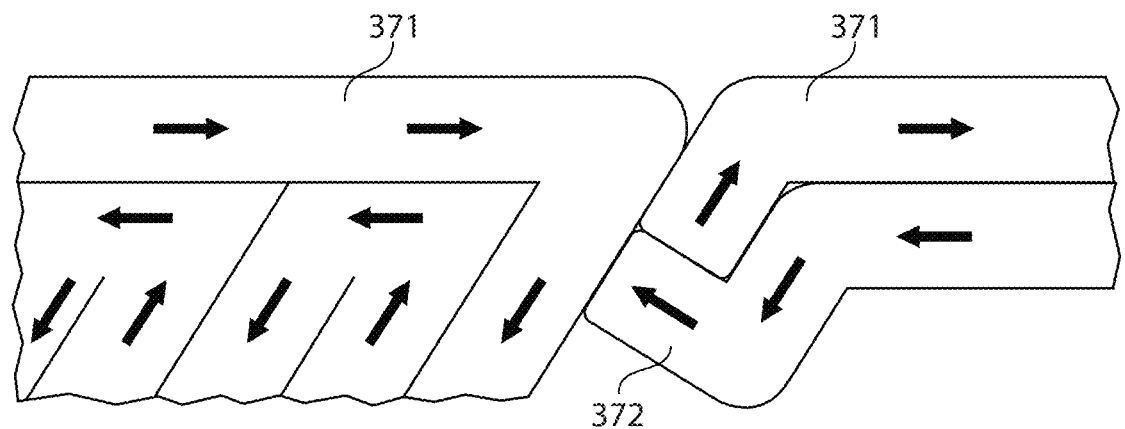
Figure 37G:
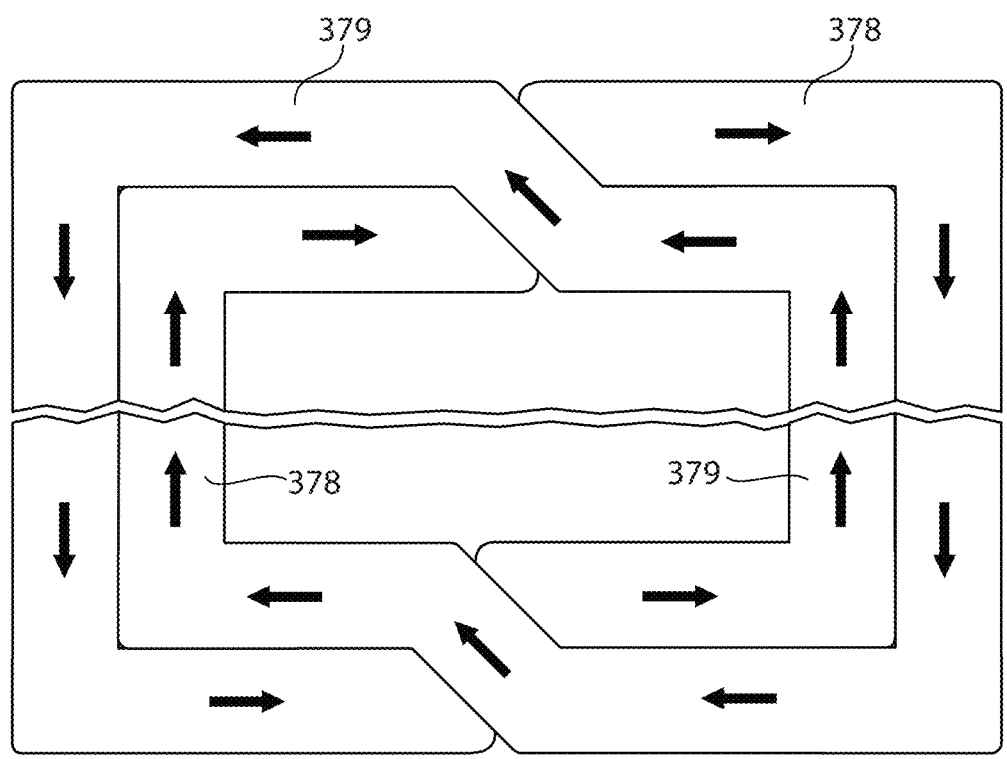
Figure 37H:
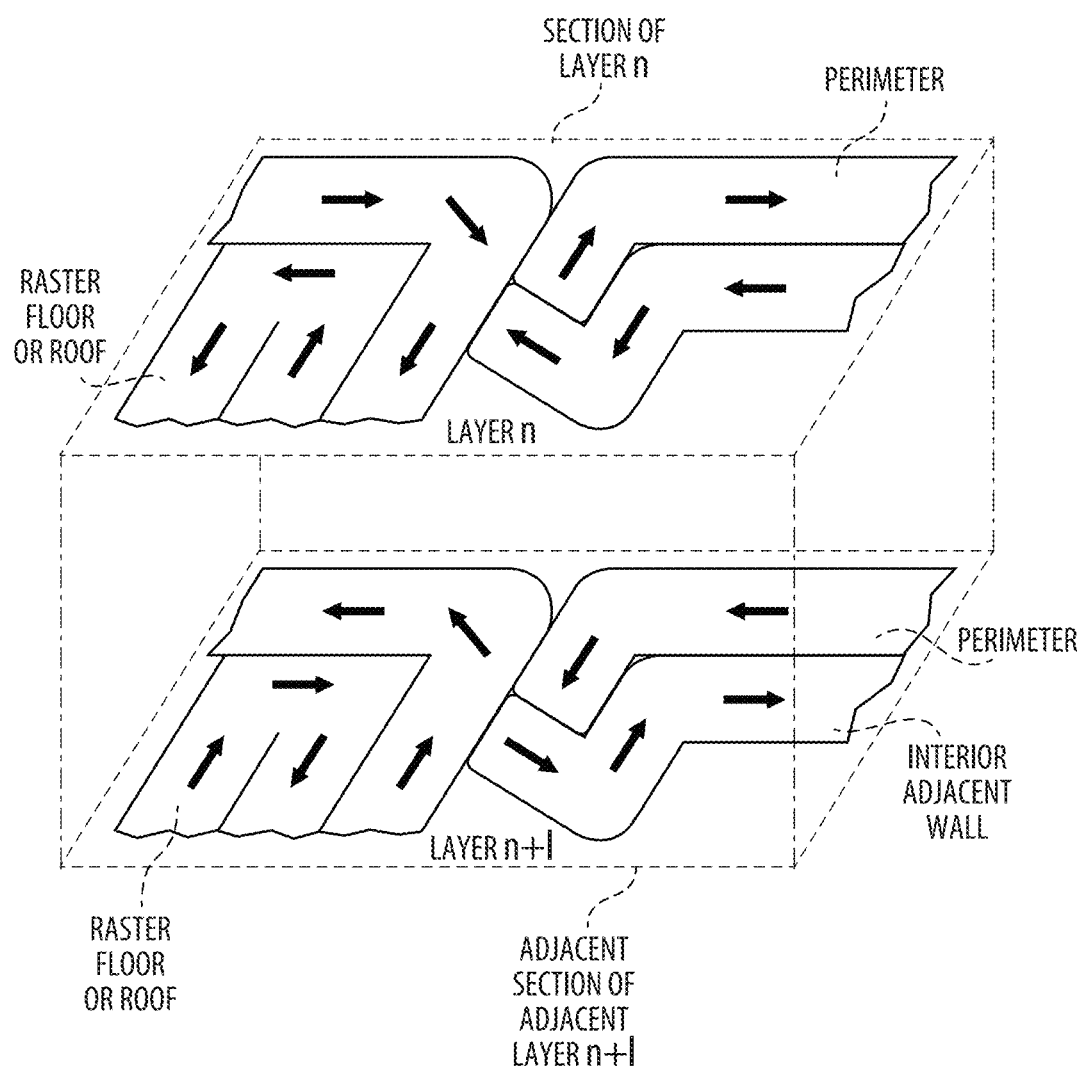
Figure 37J:
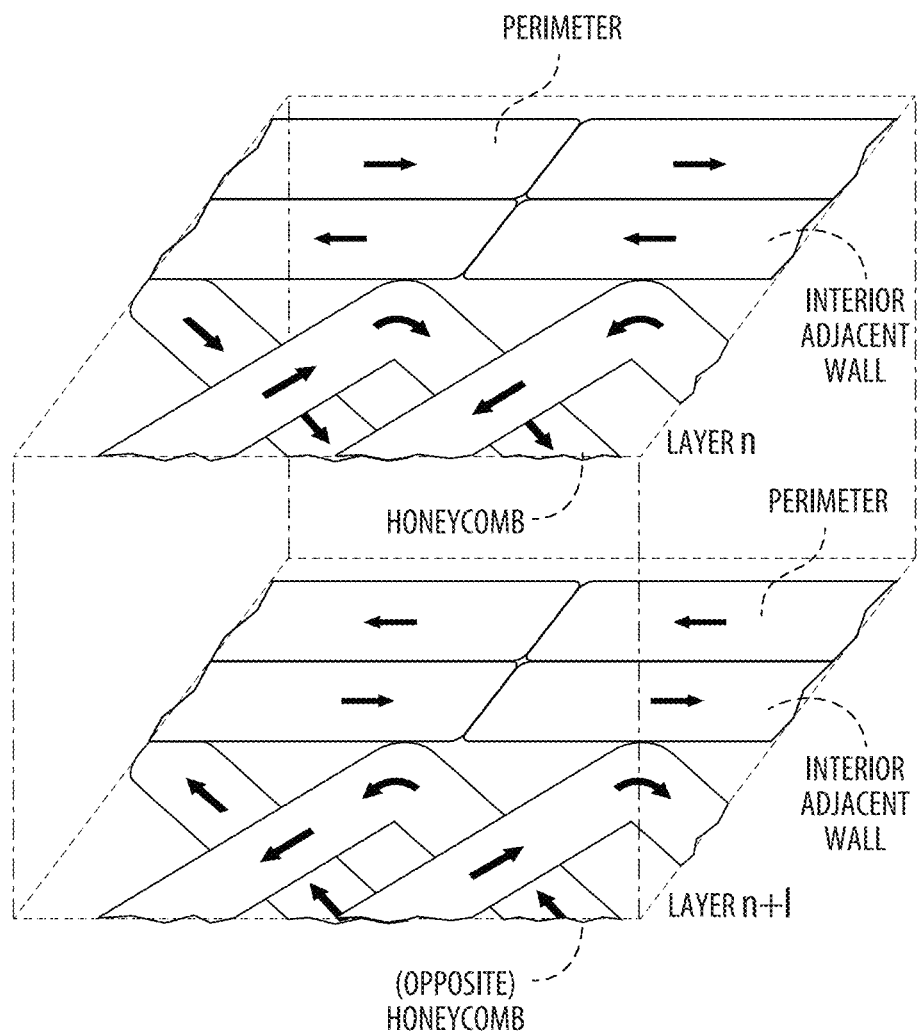

While a butt joint as shown in FIG. 37B or 37J is one of the simplest seams (e.g., butt joints in adjacent roads or depositions may be aligned, rotationally offset, or in distant rotational positions), one of a start of deposition or a stop of deposition to be located within the interior region of the layer as shown in FIG. 37A, or 37C through 37H. As shown in FIGS. 37A through 37H, the locations of the start point and the stop point may be configured to define various joints, overlaps and interlocks. As shown in FIGS. 37H and 37J, a contour tool path between a path's start point and the stop point may define a raster path that at least partially fills the interior region.

In another example of such an embodiment or expression of the invention, as shown in FIGS. 36A-36B, 37A-37H, and 37J, in building a part with a deposition-based additive manufacturing system having a deposition head and a controller 20, a first tool path for a layer of the part may be received by the controller, the received first tool path including a perimeter contour segment 371. A second tool path 372 may be receive for a layer of the part by the controller, including an interior region segment adjacent the perimeter contour segment. The deposition head may be moved (including directed movement of a beam or ray of light or electromagnetic energy) in a pattern that follows the perimeter contour segment of the received first tool path to produce a perimeter path 371 of a debindable composite including sinterable powder, and in a pattern that follows the interior region segment of the received second tool path to produce an interior adjacent path 372 of the debindable composite, wherein the perimeter path 371 and the adjacent path 372 are deposited in retrograde directions so that directions of residual stress within a binder of the debindable composite are opposite in the perimeter path and the adjacent path. As shown in FIGS. 37A-37H and 37J, this may also apply between adjacent layers, where the adjacent path 376 is in an adjacent layer.

In another example of such an embodiment or expression of the invention, as shown in FIGS. 36A-36B, 37A-37H, and 37J, in building a part with a deposition-based additive manufacturing system, a digital solid model may be received for the part (e.g., a 3D mesh such as an STL file or a 3D solid such as a NURBS, parasolid, IGES file). The digital solid model may be sliced (by, e.g., a computer or a cloud-based computing service) into a plurality of layers. A perimeter contour tool path 371 may be generated based upon a perimeter of a layer of the plurality of layers, wherein the generated perimeter contour tool path defines an interior region of the layer. An interior adjacent path 372 may be generated based on the perimeter contour tool path within the interior region. A debindable composite may be deposited including sinterable powder in a first direction based on the perimeter contour tool path to form a perimeter 371 of the debindable composite for the layer. The debindable composite may be extruded in a second direction based on the perimeter contour tool path to form an interior adjacent path 372 of the debindable composite for the layer. The deposition of the perimeter contour tool path 371 and the interior adjacent path 372 may be traced in retrograde directions to one another so that directions of residual stress within a binder of the debindable composite are opposite in the perimeter contour tool path 371 and the interior adjacent path 372. Optionally, as shown in FIGS. 37A and 37C-37H, a start point of the perimeter contour tool path 371 and a stop point of the perimeter contour tool path 371 may be adjusted to locations within the interior region.

In another example of such an embodiment or expression of the invention, as shown in FIGS. 36A-36B, 37A-37H, and 37J, building a part with a deposition-based additive manufacturing system having a deposition head and a controller may include receiving a first tool path for a layer of the part by the controller, wherein the received first tool path comprises a contour segment. A second tool path may be received for a layer of the part by the controller, and wherein the received second tool path overlaps the first tool path over more than 70 percent, preferably at least 90 percent of a continuous deposition length of the second tool path. The deposition head may be moved in a pattern that follows the first tool path to produce a perimeter path 371 of a debindable composite for the layer, and also moved in a pattern that follows the second tool path in a retrograde direction to the first tool path to produce a stress-offsetting path 372 adjacent the perimeter path of debindable composite. Directions of residual stress within a binder of the debindable composite may be opposite in the perimeter path 371 and the stress-offsetting path 372.

Optionally, the second tool path may be continuously adjacent or overlap the first tool path within the same layer, and may include interior region path within the same layer. Alternatively, or in addition, the second tool path is continuously adjacent over at least 90 percent of the first tool path within an adjacent layer, and may include a perimeter path of the adjacent layer.

In another example of such an embodiment or expression of the invention, as shown in FIGS. 36A-36B, 37A-37H, and 37J, in a method for building a part with a deposition-based additive manufacturing system having a deposition head and a controller, the method includes generating a tool path with a computer. Instructions may be generated for the generated tool path to the controller. A debindable composite may be deposited from the deposition head while moving the deposition head along the generated tool path to form a perimeter path of a layer of the part. As shown in FIG. 37G, the perimeter path may include a first contour road portion 378, and a second contour road portion 379, each of the first contour road portion and the second contour road portion crossing one another with an even number of X-patterns, forming an even number of concealed seams for the layer.

In another example of such an embodiment or expression of the invention, as shown in FIGS. 36A-36B, 37A-37H, and 37J, a deposition-based additive manufacturing system having a deposition head and a controller may move the deposition head along a first tool path segment 380 to form a perimeter road portion 371 for a layer of the part. As shown in FIG. 37C, the deposition head may be moved along a direction changing tool path segment 381; and moved along a second tool path segment 382 to form a stress-balancing road portion 372 adjacent to the perimeter road portion 371. As shown in FIG. 37C, the direction changing tool path segment 381 may include a reflex angle continuation (e.g., between 180 and 360 degrees) between the first tool path segment 380 and the second tool path segment 382 within the same layer.

As shown in FIGS. 38A, 38B, 39A, 39B, and 40 nozzle structure can be used to improve printing properties of the metal powder composite feedstocks discussed herein. Metal powder composite feedstocks such as MIM (Metal Injection Molding) feedstocks, are a composite material, as discussed herein, including sinterable metal powder and a binder, may be designed to facilitate MIM-specific processes. As discovered by various authors in the last twenty years, certain feedstocks can be adapted for extrusion-type 3D printing, e.g., Fused Deposition Modeling or Fused Filament Fabrication ("FDM" or "FFF", terms for generic extrusion-type 3D printing). Traditional extrusion feedstocks are not formed in the same manner as MIM feedstocks, and include thermoplastic material that melts or softens. In the case of MIM feedstocks, other materials intended for injection molding or the green-to-brown part process are often included in the feedstock—typically waxes, but including other low melting point and low viscosity materials. The higher viscosity (vs. lower viscosity of wax-including MIM feedstocks) and lower thermal conductivity (vs. high metal powder content of MIM feedstocks) of FDM/FFF thermoplastic filament may require a larger melt zone to get the material to a suitable temperature and thus suitable viscosity to flow.

If the melting point is low enough, or the material reactive enough, small bubbles or other discontinuities can form in the fluidized feedstock during the extrusion process when using ordinary extrusion-type nozzles, heat breaks, and heating. The bubbles create printing problems in several ways—for example, uneven printing in both gaps and drips, or uneven printing of adjacent roads or roads in different parts of the layer or part. The present disclosure provides a solution specifically for promoting even printing. Bubbles may be formed in many ways—for example gas dissolution from the solid phase, i.e. small amounts of moisture making steam. Alternatively, or in addition, micro bubbles may coalesce in the nozzle that entered the feedstock filament in a feedstock manufacturing phase—e.g., bubbles in pellet material converted into filament that are not removed during this process, or bubbles introduced during filament production. Alternatively, or in addition, air may be pulled into the system during a retract step following steady printing (an extrusion type 3D printer may be set to "retract", i.e., reverse the filament drive direction, by a small amount—e.g., 1-5 mm—following steady printing or during a non-printing nozzle translation to relieve pressure in the melt zone). In addition, or in the alternative, bubbles may be caused by deformation due to the filament extruder hob (e.g., caused by any of grabbing teeth, pressure, or heating)

An additional benefit of the present system is decreasing the volume of melt for a practically sized heater block and nozzle system, providing more responsive extrusion control. Additional back pressure may also give better extrusion control given the very low viscosity of some MIM materials. In one implementation, for example for a MIM material which begins to melt or liquefy at around 130-150 C, the material may be heated in the print head to 180-230 C to promote adhesion. In this alternative, instead of reducing the volume of the melt zone using a long, thin melt channel (e.g., 1:10 width-height aspect ratio for diameter and a volume of 20 mm^3, the melt zone may be a short 1:2 aspect ratio and a volume of 20 mm^3—e.g., 3 mm of melt zone height, 1.5 mm of melt zone diameter. The longer, thin melt channel however allows more heating length for exposure to a heating element (e.g., as shown in the Figures, a short melt zone cannot necessarily accommodate a large and powerful heating cartridge). A reduced filament diameter (e.g. instead of a customary 3 mm or 1.75 mm, a 1 mm diameter filament) may permit a smaller bend radius for a given temperature, and better control over an amount extruded—for a given step size on the extruder, less material is extruded.

With respect to advised or advantageous dimensions, below a 10:1 nozzle to particle diameter ratio jamming may begin. Jamming is exacerbated by less spherical particles (e.g., platelets or flakes, which can be created during mixing or screw extrusion). Traditional MIM (or CIM) materials may be between 55% and 65% metal (or ceramic) powder loading by volume, but at this level of loading, separation layer material in small powder sizes (e.g., less than 1 um diameter) of alumina ceramic may tend to sinter at steel sintering temperatures. As the size of powder increases slightly to 2 um, the separation layer may become chalk-like. Accordingly, 15-35% powder by volume with a powder diameter of 5 um or higher for alumina or similar ceramic powder loaded in a MIM binder (e.g., wax-polyethylene, as discussed herein) may perform well as a separation layer. Alternatively, 10-20% powder by volume with a powder diameter of 2 um or lower (or 1 um or lower) for alumina or similar ceramic powder loaded in a MIM binder may perform well as a separation layer. Further, these may be combined (e.g., some particles smaller than 1 um and some particles larger than 5 um).

A conventional FDM/FFF filament or melt chamber may be approximately 1.7-3 mm, and in the present invention the melt chamber may be 0.6-1 mm in diameter for a tip outlet diameter of 0.1-0.4 mm (for a filament diameter of 1.0-2 mm). The volume of the melt chamber (the heated substantially cylindrical chamber of constant diameter extending from adjacent the nozzle tip to a melt interface) the may be approximately 15-25 mm^3 vs. a melt chamber in conventional FDM/FFF of approximately 70 mm^3.

Figure 38A:
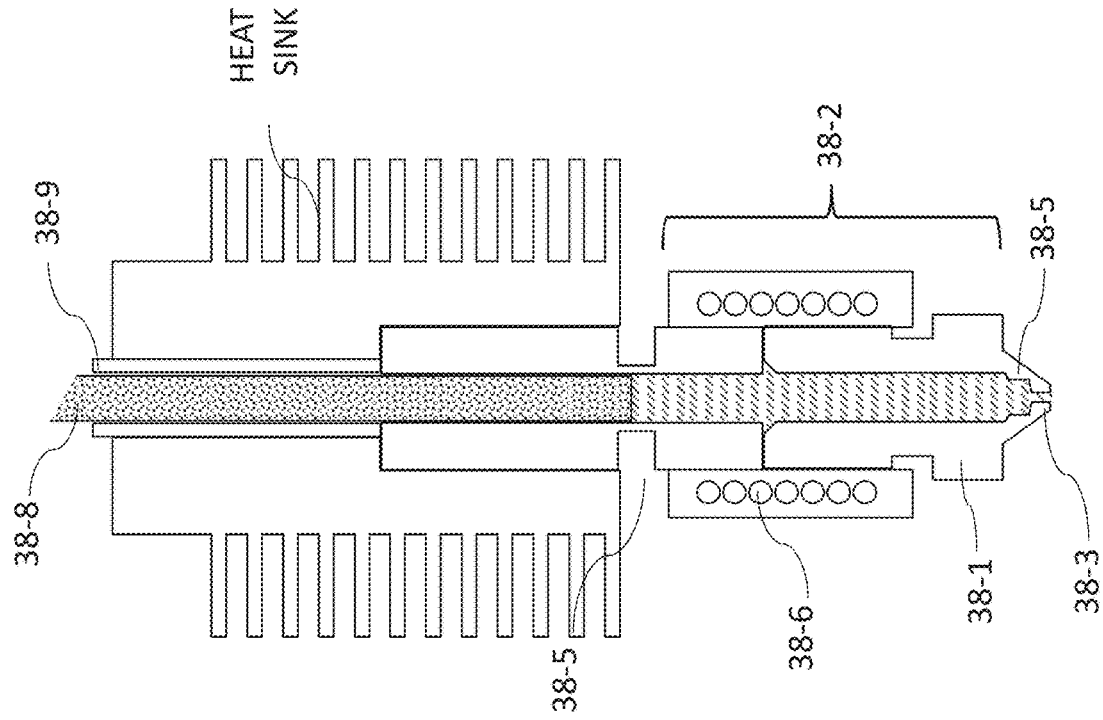
FIGS. 38A and 38B show FDM/FFF nozzle assemblies in cross section.
Figure 38B:
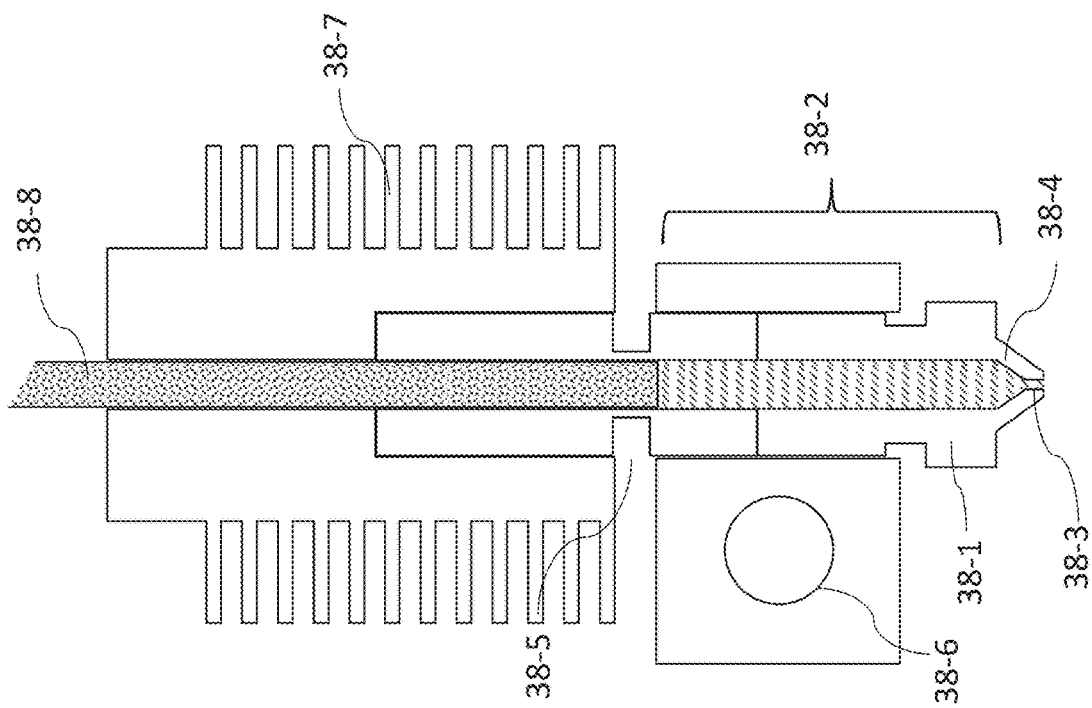

As shown in FIGS. 38A and 38B, an FDM/FFF nozzle assembly may include a nozzle 38-1 including part of the cylindrical melt chamber 38-2 having a larger diameter and a transition to the nozzle outlet 38-3. The transition may be smooth (tapered 38-4, as in FIG. 38A) or stepped 38-5 (as in FIG. 38B). Both the nozzle 38-1 and a heat break 38-5 are tightened (e.g., screwed) into a heater 38-6 block to abut one another, the heat break 38-5 including the remainder of the cylindrical melt chamber. The heat break 38-5 includes a narrow waist made of a lower heat conductivity material (e.g., stainless steel) to provide the melt interface via a sharp temperature transition between the top portion of the heat break 38-5 (which is cooled via the heat sink 38-7) and the lower, conductively heated portion of the heat break 38-5. The melt interface between the solid filament 38-8 and the liquefied material in the melt chamber 38-2 is typically near the narrow waist (adjacent above or below, or within). As shown in each of FIGS. 38A and 38B, an FDM/FFF nozzle assembly may include a melt chamber of approximately 1.8 mm diameter and 10 mm height, a volume of about 70 mm^3, vs. a nozzle outlet of approximately 0.25-0.4 mm diameter. As shown, a cartridge heater 38-6 (in FIG. 38A) or a coiled inductive heater 38-6 (in FIG. 38B) are suitable. As shown, in some cases a PTFE insert 38-9 may provide resistance to filament jamming.

As shown in FIGS. 39A and 39B, a MIM material extrusion nozzle assembly may be structurally similar—e.g., with a smooth or stepped transition in the nozzle 39-1, a heat break 39-5 including a narrow waist, and other components as previously described (e.g., with reference numbers 39-# corresponding to numbers 38-# previously employed). A solid-state Peltier cooler may be used on or adjacent the heat break 39-5, and may be adhered to the heat break 39-5 by heat transfer cement or other high heat conductivity interface. As shown in each of FIGS. 39A and 39B, a MIM material extrusion nozzle assembly may include a melt chamber 39-2 of approximately 0.6-1 mm diameter and 10 mm height, a volume of about 20 mm^, vs. a nozzle outlet 39-3 of approximately 0.1-0.4 mm diameter. As shown in FIG. 39B, a narrowing insert 39-11 may be used to convert an FDM nozzle for MIM material extrusion (e.g., the melt chamber volume vs. nozzle outlet size or filament relationships described herein are related to MIM material dimensions during extrusion, not necessarily the specific nozzle, heat break, or insert parts). As shown in FIG. 40, a MIM material extrusion nozzle assembly may include a melt chamber 39-2 of approximately 1.7-3 mm diameter and 1-4 mm height, a volume of about 20 mm^, vs. a nozzle outlet of approximately 0.1-0.4 mm diameter.

With respect to the binder jetting example shown in FIG. 1B, in all of the preceding examples in which an extruder using filament is not required, the binder jetting example printer 1000J and associated processes may be used. In a 3D printer for making desired 3D green parts, a binder may be jetted as a succession of adjacent 2D layer shapes onto a sinterable metal or ceramic powder bed in successive layers of powder feedstock, the powder bed being refilled with new or recycled feedstock and releveled/wiped for each successive layer. The 3D shape of the desired 3D green part and associated sintering supports or underlying shrinking platform (for holding unsupported spans of the 3D green part in place vs. gravity during sintering and maintaining an overall shape of the 3D green part) are built up as a bound composite including the sinterable powder and the binder, embedded in a volume of loose powder. The 3D green part and its sintering supports will later be debound and then sintered, and the sintering supports removed.

In some layers, differing amounts of binder may be jetted depending on whether a 2D layer shape segment being formed is an external wall, internal wall, or honeycomb wall, or internal bulk material (or depending on the printing location relative to such perimeters or areas). This results in differing (optionally a continuous or stepwise gradient) of volume fraction proportions of binder to powder, e.g., from 90% binder to 100% powder through 50:50 up to 10% binder to 90% powder. For example, a higher volume fraction of binder may be located on an outer shell (and/or inner shell), progressively reducing inward toward, e.g., area centroids.

In some layers, a release material (including another powder that does not sinter at the sintering temperature of the feedstock powder) may also be applied in a complementary 2D shape (e.g., jetted in a binder, extruded in a binder) for example, intervening between a support shape in a lower layer and a part shape in a layer two above.

In some layers, placeholder material (without either the green part powder or the release material powder) may also be applied in a complementary 2D shape of desired free space within the green part and/or sintering supports (e.g., jetted or extruded). In some layers, the placeholder material may also or alternatively be applied in a wall or "mold" shape, e.g., occupying external free space to the part shape, capturing unbound sinterable powder inside the mold shape. In other words, an external shell (e.g., wax) may be formed of the placeholder material. The external shell 2D shapes are deposited in each candidate layer on top of the preceding powder (e.g., bound powder, unbound powder, and/or release material) layer, then a subsequent layer of unbound powder feedstock is wiped on. As shown in FIG. 1B, a doctor blade 138 may be used to slice the top of the 2D shell shape off (leveling) or a silicon roller/blade 138 may be used to slice the top of the 2D shell shape off—the silicon roller/blade may accept some deformation, e.g., deform to accommodate the bump of the plastic tolerance above the printing plane.

The binder may be jetted into roofs, floors, lattice, honeycomb, or skeletal reinforcement shapes within the mold shape (e.g., starting spaced away from the mold shape) to help hold the unbound sinterable powder versus gravity, or mechanical disturbance during downstream processes such as leveling or moving the part from station to station. For example, in some 2D layers, an internal holding pattern such as hexagon, triangle, or as previously describe lower density or high volume fraction of binder may be used as a holder, in combination with either an outer shell formed from bound composite, an outer shell formed from high volume fraction binder bound composite (e.g., 70% binder), and/or a mold shape formed from the placeholder material. As noted, this may help prevent motion of parts during printing/or during layer re-application.

Further, in some layers, the placeholder material may also or alternatively be applied in a complementary 2D shape of adhesive between, e.g., the shrinking platform formed from bound powder and the underlying build platform, or between a plurality of adjacent or stacked 3D green parts and associated sintering supports to allow multiple parts to be built up per run. The adhesive function may, again, help hold the any of the shapes versus mechanical disturbance during downstream processes such as leveling or moving the part from station to station. It should be noted that the binder jetting into sinterable powder may also be used to form adhering tacks as described herein between the shrinking platform and build platform, as well as or alternatively between a plurality of adjacent or stacked 3D green parts and associated sintering supports. In other words, the part may be anchored part with (e.g., solvent removed) binder to a ground plane (e.g., build plate) and/or parts to each other (e.g., in the Z axis, when printing one on top of another).

After each layer, the powder bed is refilled and releveled/wiped (with a doctor blade 138, roller, wheel or other powder leveling mechanism) flush with the green part shape, the release material shape, and/or the free space placeholder material shape. Optionally, a surface finishing mechanism flattens or shapes (rolling, shaving, ironing, abrading, milling) a recent or a most recent layer of green part shape, release material shape, and/or placeholder material shape before the powder bed is refilled about them.

The 3D shapes of each of the green part, sintering supports, intervening release material, and placeholder free space material are built up in successive layers, and in 3D space may take essentially any interlocking 3D forms. In many cases, the green part is formed as a recognizable 3D object, with separation material forming planes, arches, hemispheres, organic shapes or the like separating the 3D object from columns of sintering supports below, leading down to a shrinking platform as described herein, which is adhered to a build platform via placeholder material and/or bound composite tacks. Optionally, as described, within the recognizable 3D object, desired free space may be filled with placeholder material and/or unbound sinterable powder. Among the placeholder material and/or unbound sinterable powder may be deposited bound composite honeycomb or lattice or the like containing or entraining either or both of the placeholder material or unbound sinterable powder. Optionally, as described, about the recognizable 3D object, a mold shape defining the outer skin of the 3D object may be formed of the placeholder material. Additionally, or in the alternative, a skin shape forming the outer skin of the 3D object may be formed of the bound composite.

Subsequently, the 3D green part(s) together with sintering supports, release shapes, and placeholder or adhesive shapes is removed from the powder, and cleaned of remaining unbound powder. Unbound powder may be removed from the surroundings of the 3D green part(s) and sintering supports via outlets formed in the bound composite, or left entrained within the desired green part. Subsequently, the green part and its sintering supports may be handled as otherwise described in this disclosure. Bound composite outer and inner walls and internal honeycomb walls will be debound as described to form the brown part assembly. Release material will be debound as described, become separation powder for removing the sintering supports, and is retained for sintering and removed following sintering. Placeholder material may be debound (including in a solvent, catalytic, or thermal process) or even, if a different material from the binder, removed before or after debinding. In some cases, high temperature placeholder material that retains its shape at high heat but may be disassembled by further vibration, mechanical, radiation, or electrical processing (e.g., carbon or ceramic composite) may be retained through sintering.

Alternatively, the debinding step may not be necessary, for the green part shape and/or sintering supports if a single stage binder can be pyrolysed in a sintering furnace. In such a case, the green part assembly is taken directly to the furnace. Bound composite outer and inner walls and internal honeycomb walls are debound and sintered in an integrated process. Release material may be debound prior to the integrated debinding and sintering in the furnace, or at may be debound in the furnace as well. Placeholder material may be debound (including in a solvent, catalytic, or thermal process) prior to the integrated debinding and sintering in the furnace, or at may be debound in the furnace as well.

A material may be supplied (pellet extruded, filament extruded, jetted or cured) containing a removable binder as discussed herein (two or one stage) and greater than 50% volume fraction of a powdered metal having a melting point greater than 1200 degrees C. (including various steels, such as stainless steels or tool steels). The powdered metal may have which more than 50 percent of powder particles of a diameter less than 10 microns, and advantageously more than 90 percent of powder particles of a diameter less than 8 microns. The average particle size may be 3-6 microns diameter, and the substantial maximum (e.g., more than the span of +/−3 standard deviations or 99.7 percent) of 6-10 microns diameter.

Smaller, e.g., 90 percent of less than 8 microns, particle sizes may lower the sintering temperature as a result of various effects including increased surface area and surface contact among particles. In some cases, especially for stainless and tool steel, this may result in the sintering temperature being within the operating range of a fused tube furnace using a tube of amorphous silica, e.g., below 1200 degrees C. Smaller diameter powder material may be additively deposited in successive layers to form a green body as discussed herein, and the binder removed to form a brown body (in any example of deposition and/or debinding discussed herein).

As discussed above, a deposition head may be moved in a pattern that follows a first tool path in a layer of a green body part and also moved in a pattern that follows a second tool path in a retrograde direction to the first tool path in an adjacent layer of the green body part to produce offsetting stresses in each path. In another embodiment, a composite material can be extruded and the direction of deposition paths can be reversed with each subsequent layer. Such a process of introducing offsetting stresses in a printed part can be utilized to minimize deformations/twisting due to debinding and/or sintering.

For example, various types of 3D printing utilize thermal and/or pressurized post-processing processes that affect the surface geometries. For example, a green body may be formed from a 3D printing material that includes one or more binders and a powdered or spherized metal or ceramic sintering material that is additively deposited in successive layers. The binder material is then removed from the green body (for example, using a solvent, catalysis, pyrolysis) to form a brown body. The brown body is then sintered at high temperature and/or pressure in a sintering oven. When the brown body is sintered at high temperature and/or pressure, remaining or second stage binder may pyrolyse away and the brown body contracts as it sinters. Application of heat (and optionally) pressure can eliminate internal pores, voids and microporosity between and within the metal or ceramic beads of the sintering material through at least diffusion bonding and/or atomic diffusion.

The process of printing a green body by extruding part material can achieve high levels of dimensional accuracy, but can often result in embedded stresses in the green body which relax during the debinding and/or sintering process. The relaxation of these embedded stresses can lead to deformations and twisting in the corresponding brown body upon debinding and/or sintering.

Figure 41:
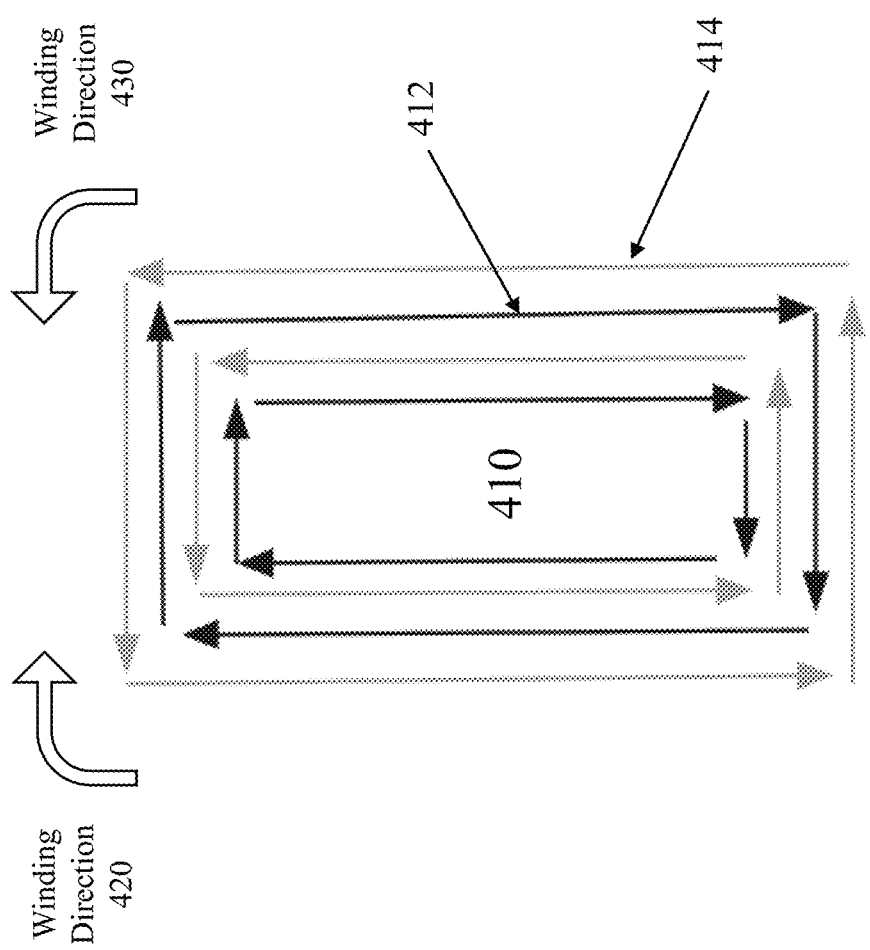
FIG. 41 is a diagram illustrating a conventional approach for printing a three-dimensional part.

FIG. 41 is a diagram illustrating one example of a slice/layer 410 of a green body printed using a conventional approach. The slice 410 is printed using a first winding direction 420 and second winding direction 430. During the printing process, for each toolpath the print head alternates between the first winding direction and the second winding direction. The print head alternates winding directions such that each toolpath within the slice 410 is printed with a different winding direction than the adjacent toolpath. For example, toolpath 412 is printed using the first winding direction 420 and the adjacent toolpath 414 is printed using the second winding direction 430. During post-processing of the green body, embedded stresses resulting from the printing process can relax causing twists and deformations. By alternating winding directions for adjacent toolpaths in each slice, part twists and deformations from embedded stresses can be reduced.

A method for printing three-dimensional parts is provided herein where the three-dimensional parts are printed by counter-winding slices/layers of a part. More specifically, adjacent slices/layers of a part are wound in alternating directions to produce a stored torque in each slice which offset during the debinding and sintering process. By counter-winding slices/layers, a greater reduction of part twists and deformations can be achieved.

Figure 42:
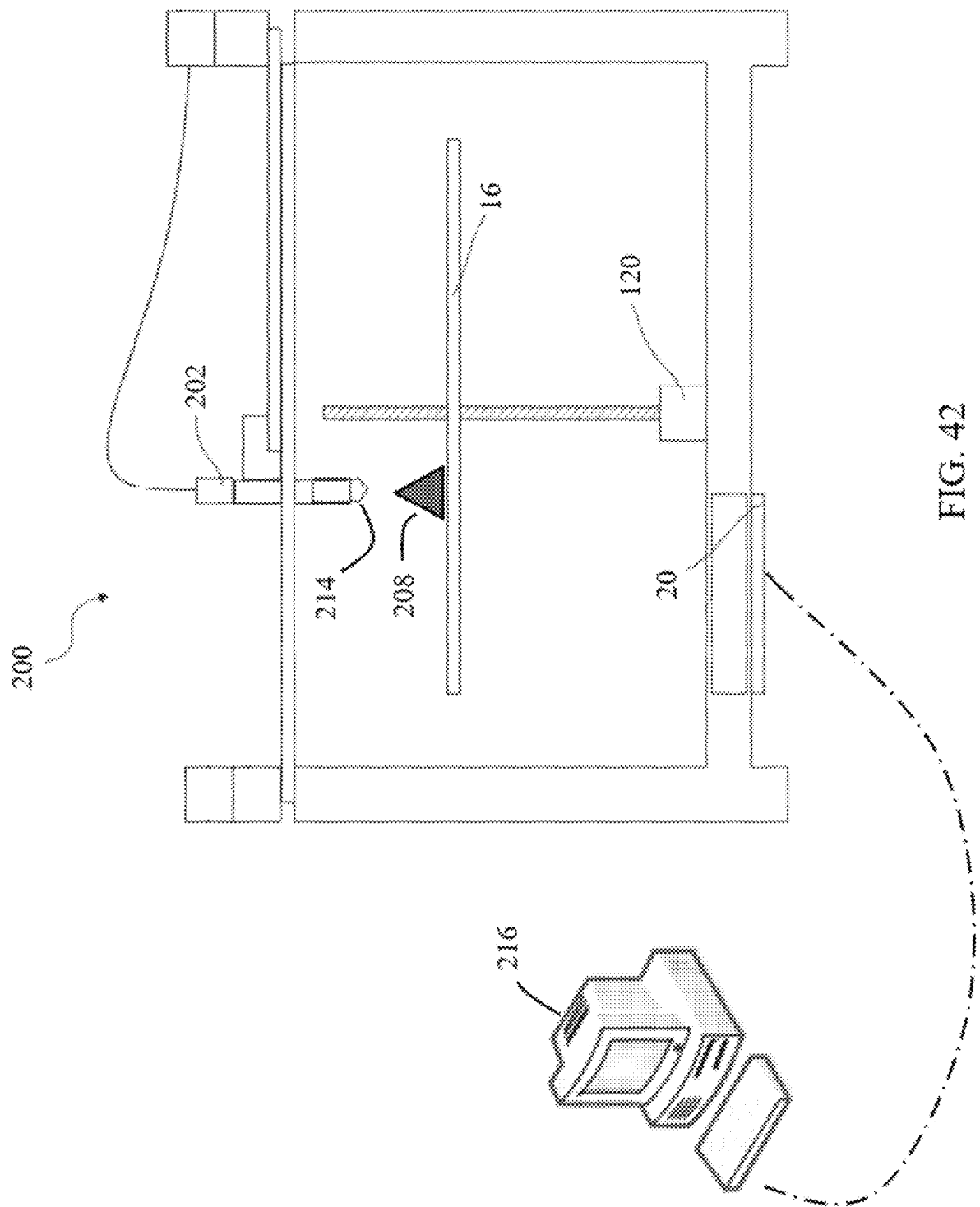
FIG. 42 is a functional diagram illustrating a three-dimensional printer in accordance with at least one embodiment of the present invention.

FIG. 42 is a schematic representation of one embodiment of a three-dimensional printer 200. The printer 200 includes a print head 202, a build plate 16, and a controller 20 for controlling the print head 202 and the build plate 16. The relative positions and/or orientations of the print head 202 and the build plate 16 are controlled by the controller 20 such that material can be deposited by the print head 202 in desired locations and directions to support the printing of a three-dimensional part 208.

Although FIG. 42 shows a Cartesian arrangement for relatively moving the print head 202 and build plate 16 in three orthogonal translation directions, other arrangements are considered within the scope of, and expressly described by, a drive system operated by controller 20 that may relatively move the print head 202 and the build plate 16 supporting a 3D printed part in at least three degrees of freedom. In another embodiment, the drive system may relatively move the print head 202 and the build plate 16 in four or more degrees of freedom.

The print head 202 is configured to deposit a composite material including metal or ceramic dispersed spheres or powder as well as a matrix of binding polymers, waxes, and/or other components. In other embodiments, the composite material may include plastic dispersed spheres or powder. The print head 202 includes an extrusion nozzle 214, or tip, designed to control the direction or characteristics of the flow of the composite material, for example to increase velocity and/or restrict cross-sectional area, as the composite material is extruded from the print head 202. In some embodiments, the composite material may be heated and converted to a flowable state before being deposited by the print head 202 via the extrusion tip 214. In various embodiments, the printer 200 may include additional print heads for depositing optional materials, such as, for example, a fiber reinforcement filament.

A 3D part 208 can be printed from a digital representation of the 3D part in a slice-by-slice manner by extruding the composite material in segments which make up each slice. Each segment corresponds to a "toolpath" which is a linear row, road, or rank having a beginning and an end, which may be open or closed, a line, a loop, curved, straight, etc. Each segment (i.e., toolpath) begins when the print head 202 begins a continuous deposit of composite material and terminates when the print head 202 stops depositing. Each slice is a single layer, shell or lamina to be printed in the printer 200, and each slice may include one segment, many segments, lattice fill of cells, different materials, and/or a combination of fiber-embedded filament segments and pure polymer segments.

A computer system 216 is configured to build, process, and manage a digital representation or model of the 3D part 208. The computer system 216 can be externally located to printer 200. In another embodiment, the computer 216 is internally located within printer 200. In some embodiments, a user may operate the computer system 216 to create and/or modify the 3D part model. The computer system 216 processes the 3D part model to generate corresponding slices, which are then printed in slice-by-slice manner to build the 3D part 208. The computer system 216 communicates with controller 20 to provide instructions for controlling the print head 202 and the build plate 16 to carry out the printing of each slice. In some embodiments, the computer system 216 may be configured to communicate with the controller 20 over a wireless connection; however, in other embodiments the computer system 216 may communicate with the controller 20 over a wired connection.

Figure 43:
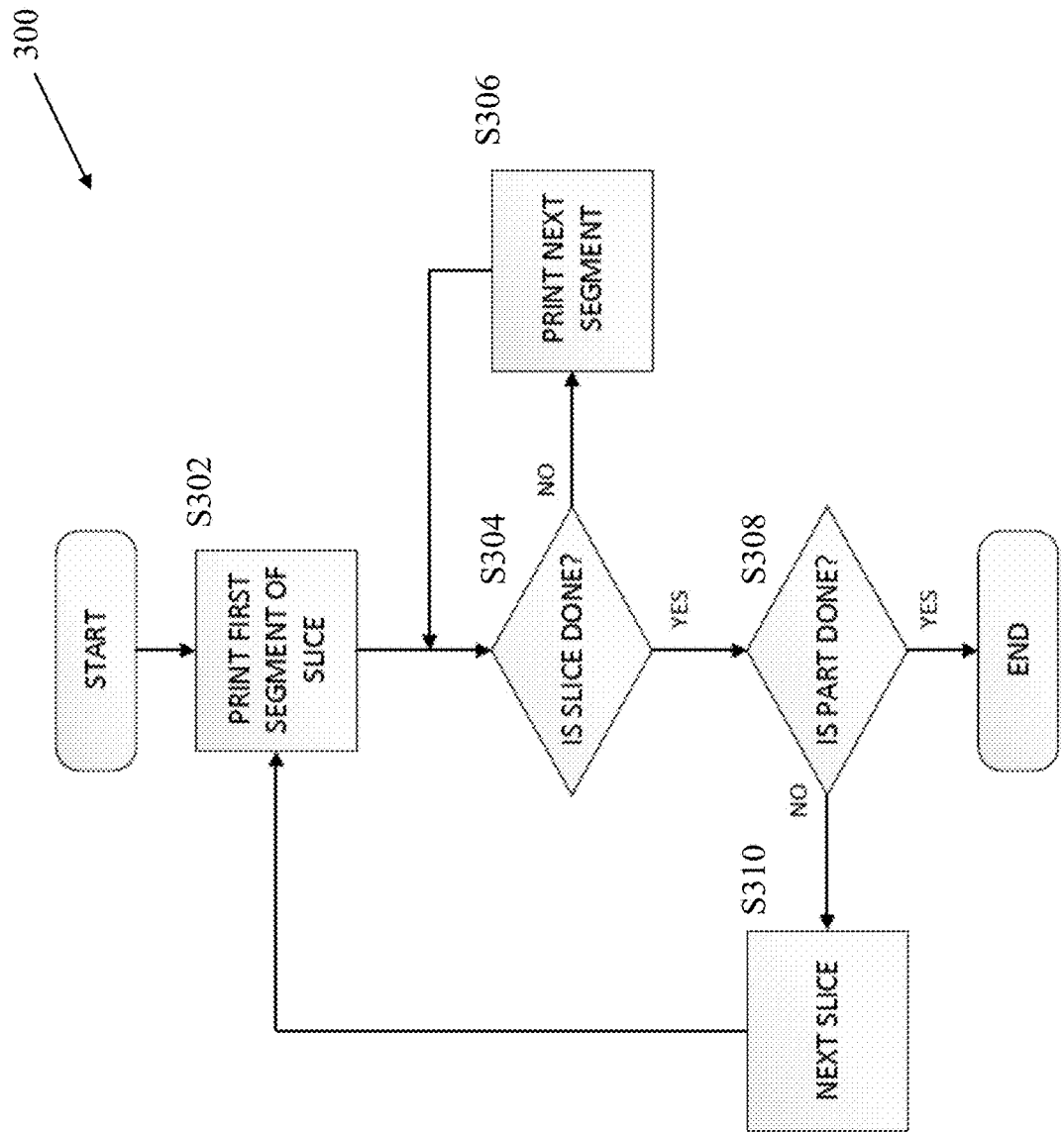
FIG. 43 is a flow diagram illustrating a process for controlling a three-dimensional printer to print a three-dimensional part in accordance with one embodiment of the present invention.

FIG. 43 depicts a flowchart showing one example of a printing routine 300 in which segments are printed to form slices which build up a 3D part. At step S302, the routine begins by printing a first segment (e.g., toolpath) of a first slice/layer. The routine 300 checks for slice completion at step S304, and if segments remain to be printed within the slice, increments to the next planned segment at step S306. Similarly, after slice completion at step 304, if slices remain at step S308, the routine increments at step S310 to the next planned slice until the part is completed.

Each slice printed may include embedded stresses as a result of the printing process. As the composite material is extruded in segments from the print head 202, stresses are induced in the composite material, and remain stored in the material after fusing to previously deposited part material. The embedded stresses in the part may then relax during debinding and/or sintering processes. In a conventional printing process, the relaxation of such embedded stresses can result in twists and deformations during debinding and/or sintering. According to at least one embodiment of the method described herein, a part can be printed with counter-wound slices to account for the relaxation of stresses.

Figure 44:
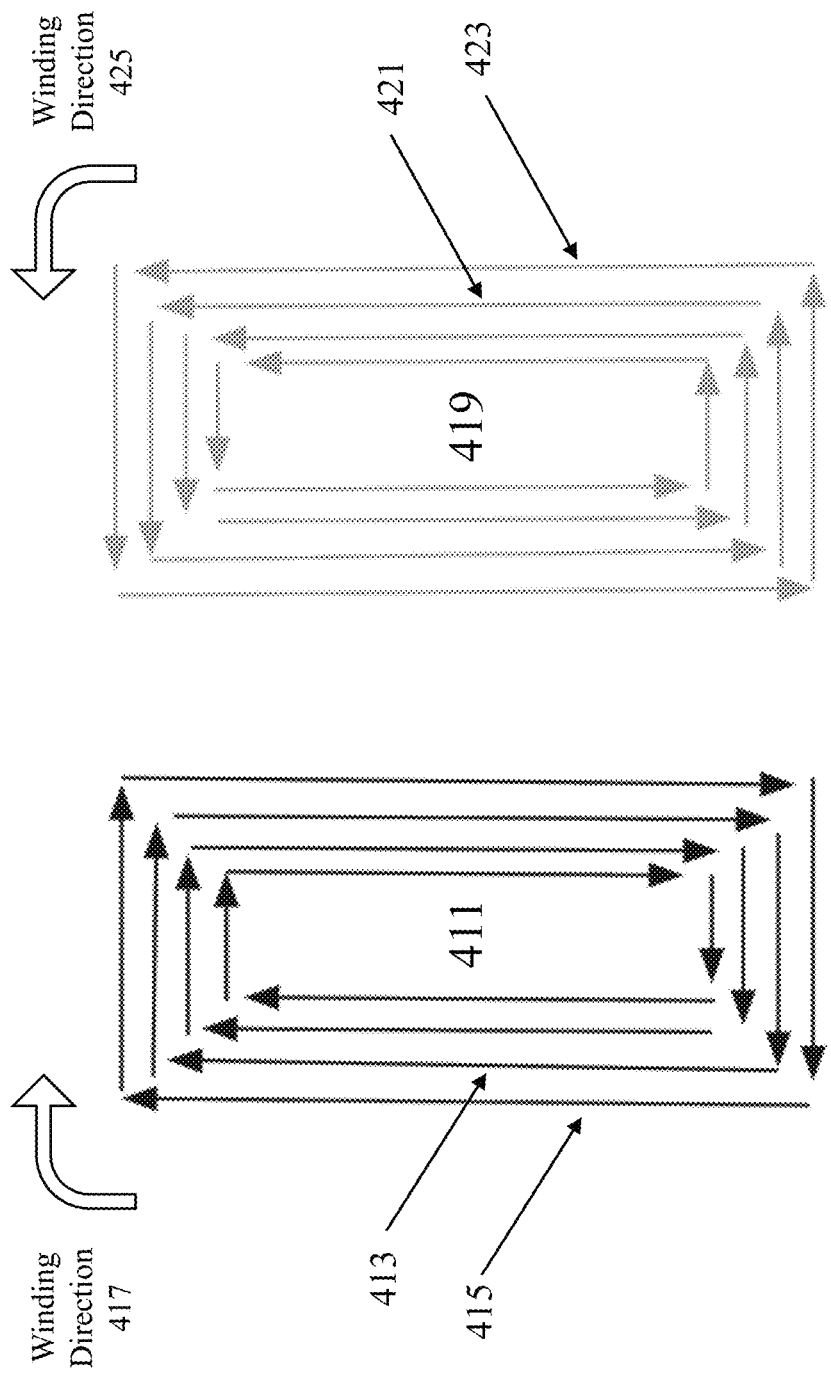
FIG. 44 is a diagram illustrating a process for printing a three-dimensional part in accordance with one embodiment of the present invention.

FIG. 44 is a diagram illustrating one example of counter-wound slices of a printed part, according to embodiments described herein. As shown, slice 411 has a first winding direction 417 and slice 419 has a second winding direction 425, the second winding direction 425 being a retrograde direction to the first winding direction 417. For example, the first winding direction 417 may be a clockwise direction, and the second winding direction 425 may be a counterclockwise direction. During the printing process, for each slice, the print head 202 moves in one of the first winding direction 417 or the second winding direction 425. The print head 202 moves in the same winding direction within the slice such that each toolpath of the slice is printed with the same winding direction. For example, toolpath 413 of slice 411 is printed using the first winding direction 417 and the adjacent toolpath 415 is also printed using the first winding direction 417. Likewise, toolpath 421 of slice 420 is printed using the second winding direction 425 and the adjacent toolpath 423 is also printed using the second winding direction 425.

Both slice 411 and slice 419 contain a corresponding amount of stored torque embedded during the printing process. Being that the first winding direction 417 and the second winding direction 425 are in retrograde directions, the stored torque in slices 411 and 419 can offset during post-processing (e.g., debinding and/or sintering). Slices 411 and 419 are printed in an adjacent manner and the offsetting torque stored in slices 411 and 419 balance, neutralize, and/or cancel one another during the debinding and/or the sintering process. In some embodiments, green body parts may be printed with adjacent counter-wound slices to minimize deformations or twisting of the brown body part post-sintering.

A three-dimensional part may be printed with any number of counter-wound slices. In one embodiment, all slices of a part are counter-wound; however, in other embodiments only specific slices of a part may be counter-wound. In some embodiments, specific slices of a part may be counter-wound and other slices may be printed using the conventional approach shown in FIG. 41. In at least one embodiment, slices may be the same, or substantially the same size; however, in other embodiments slices may have differing sizes. The rectangular shape of slices 411 and 419 shown in FIG. 44 is merely for illustrative purposes. The slices may be printed in any shape or form needed for the printing of a three-dimensional part. In some embodiments, entire adjacent slices are printed with counter-winding. In other embodiments, only specific portions of adjacent slices are printed with counter-winding. For example, in some embodiments, only the perimeter of each adjacent slice is counter-wound.

Figure 45:
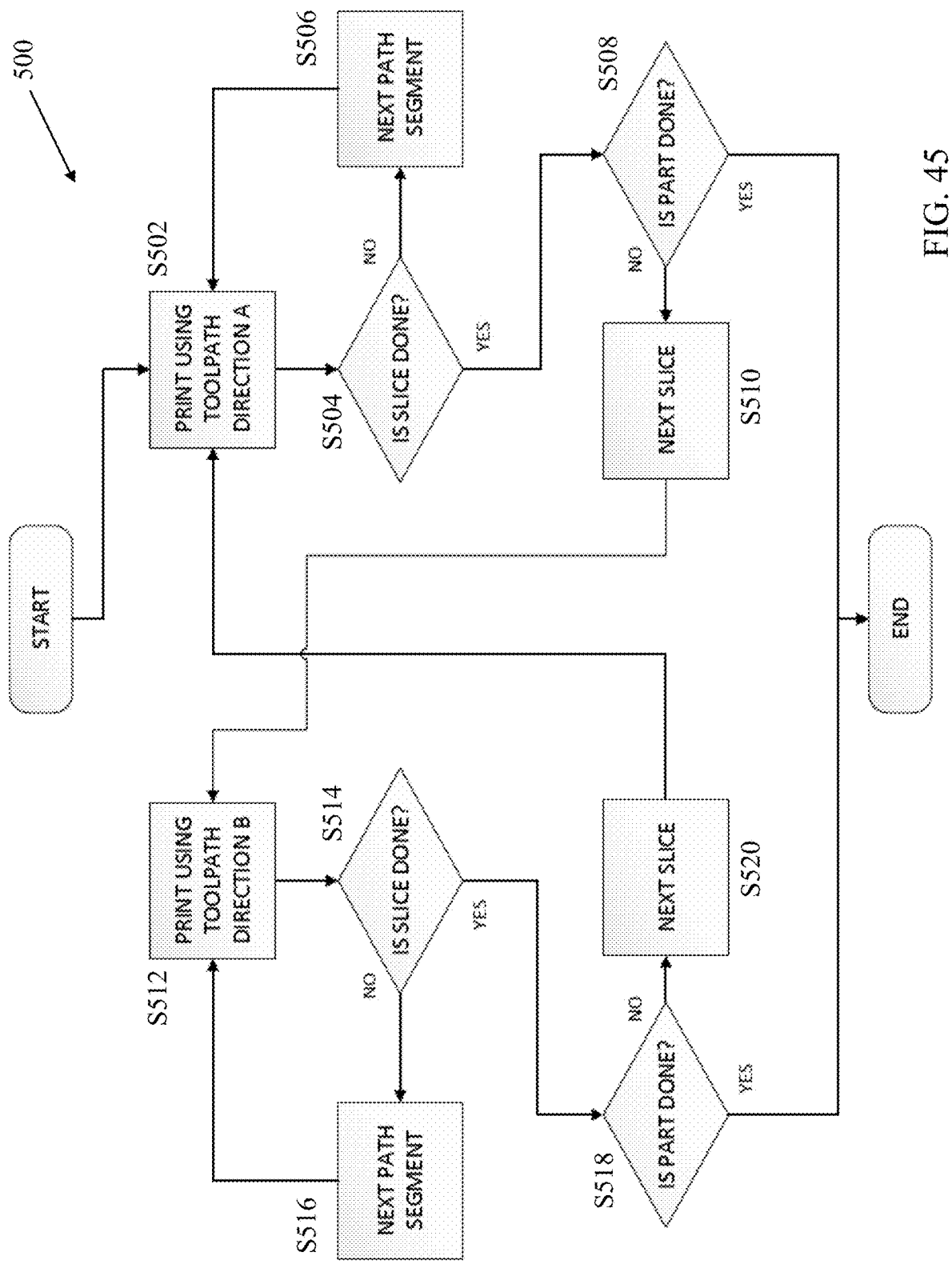
FIG. 45 is a diagram illustrating a process for controlling a three-dimensional printer to print a three-dimensional part in accordance with one embodiment of the present invention.

FIG. 45 illustrates a process 500 of controlling a printer (e.g., the printer 200 shown in FIG. 42) to print a three-dimensional part according to at least one embodiment. In the process 500, slices are counter-wound to produce the three-dimensional part. In one embodiment, the process 500 may be carried out by a controller configured to operate the printer (e.g., the controller 20 shown in FIG. 42). At step S502, the controller 20 controls the print head 202 to move in a winding direction A (e.g., winding direction 417) to extrude composite material in a pattern that follows a first segment (i.e., toolpath 413) of a first slice. At step S504, once the segment is completed, the controller 20 checks if the slice has been completed. If the slice has not been completed, the process continues to step S506 where the controller 20 determines the next segment (i.e., toolpath 415) of the current slice. The process then returns to step S502 and the controller 20 operates the printer 200 to begin printing the next segment by moving the print head 202 in the same winding direction A. At step S504, once the controller 20 determines the slice is completed, the process continues to step S508 where the controller 20 checks if the part has been completed. If the part has been completed, the process ends, otherwise the process continues to step S510 where the controller 20 determines the next slice of the part to be printed before continuing to step S512.

At step S512, the controller 20 controls the print head 202 to move in a winding direction B (e.g., winding direction 425) to extrude composite material in a pattern that follows the first segment (i.e., toolpath 421) of the next slice, the winding direction B being a retrograde direction to winding direction A. At step S514, once the segment is completed, the controller 20 checks if the slice has been completed. If the slice has not been completed, the process continues to step S516 where the controller 20 determines the next segment (i.e., toolpath 423) of the current slice. The process then returns to step S512 and the controller 20 operates the printer 200 to begin printing the next segment by moving the print head 202 in the same winding direction B. At step S514, once the controller 20 determines the slice is completed, the process continues to step S518 where the controller 20 checks if the part has been completed. If the part has been completed, the process ends, otherwise the process continues to step S520 where the controller 20 determines the next slice of the part to be printed before returning to step S502.

The process 500 describes printing adjacent slices (e.g., slices 411 and 419) using opposing or retrograde winding directions (e.g., winding directions 417 and 425) to produce a stored torque in each respective slice, where the stored torque of slice 411 offsets with the stored torque of slice 419. During the debinding and/or sintering process, the stored torque of slice 419 neutralizes or cancels the stored torque of slice 411. By producing the offsetting stored torques in adjacent slices 411 and 419, part twists and deformations during post-processing (e.g., debinding and/or sintering) can be further reduced when compared to the conventional printing approach of FIG. 41.

Additionally, in some embodiments, the counter-winding of slices as described in the process 500 may compensate for part deformations related to alignment issues. For example, by alternating winding directions between adjacent slices, position-related defects can be mitigated to minor surface roughness rather than a gap or void in the slice and/or part.

As discussed above, the controller 20 is configured to monitor and control operation of the printer 200. Using data stored in associated memory, the controller 206 is operable to execute one or more instructions that may result in the operation of one or more subsystems of the printer 200. In some examples, the controller 206 can include one or more processors or other types of controllers. The controller 206 may perform a portion of the functions discussed herein on a processor, and perform another portion using an Application-Specific Integrated Circuit (ASIC) tailored to perform particular operations. Examples in accordance with the present invention may perform the operations described herein using many specific combinations of hardware and software and the invention is not limited to any particular combination of hardware and software components.

As described above, an improved method for printing three-dimensional parts is provided herein. The method includes building a three-dimensional part by printing counter-wound slices. By winding adjacent slices in alternating directions, offsetting stored torques can be produced for each printed slice. The stored torques then neutralize one another during the debinding and sintering process, reducing part twists and deformations.

Having thus described several aspects of at least one embodiment of this invention, it is to be appreciated various alterations, modifications, and improvements will readily occur to those skilled in the art. Such alterations, modifica- tions, and improvements are intended to be part of this disclosure and are intended to be within the spirit of and scope of this invention. Accordingly, the foregoing description and drawings are by way of example only.

Definitions

A "sintering temperature" of a material is a temperature range at which the material is sintered in industry, and is typically a lowest temperature range at which the material reaches the expected bulk density by sintering, e.g., 90 percent or higher of the peak bulk density it is expected to reach in a sintering furnace.

"Honeycomb" includes any regular or repeatable tessellation for sparse fill of an area (and thereby of a volume as layers are stacked), including three-sided, six-sided, four-sided, complementary shape (e.g., hexagons combined with triangles) interlocking shape, or cellular. "Cells" may be vertical or otherwise columns in a geometric prism shape akin to a true honeycomb (a central cavity and the surrounding walls extending as a column), or may be Archimedean or other space-filling honeycomb, interlocking polyhedra or varied shape "bubbles" with a central cavity and the surrounding walls being arranged stacked in all directions in three dimensions. Cells may be of the same size, of differing but repeated sizes, or of variable size.

"Extrusion" may mean a process in which a stock material is pressed through a die to take on a specific shape of a lower cross-sectional area than the stock material. Fused Filament Fabrication ("FFF"), sometimes called Fused Deposition Manufacturing ("FDM"), is an extrusion process. Similarly, "extrusion nozzle" shall mean a device designed to control the direction or characteristics of an extrusion fluid flow, especially to increase velocity and/or restrict cross-sectional area, as the fluid flow exits (or enters) an enclosed chamber.

"Shell" and "layer" are used in many cases interchangeably, a "layer" being one or both of a subset of a "shell" (e.g., a layer is an 2.5D limited version of a shell, a lamina extending in any direction in 3D space) or superset of a "shell" (e.g., a shell is a layer wrapped around a 3D surface). Shells or layers are deposited as 2.5D successive surfaces with 3 degrees of freedom (which may be Cartesian, polar, or expressed "delta"); and as 3D successive surfaces with 4-6 or more degrees of freedom.

In the present disclosure, "3D printer" is inclusive of both discrete printers and/or toolhead accessories to manufacturing machinery which carry out an additive manufacturing sub-process within a larger process. A 3D printer is controlled by a motion controller 20 which interprets dedicated G-code and drives various actuators of the 3D printer in accordance with the G-code. "Fill material" includes composite material formed of a debindable material and a sinterable powder, e.g., before debinding.

"Fill material" includes material that may be deposited in substantially homogenous form as extrudate, fluid, or powder material, and is solidified, e.g., by hardening, crystallizing, or curing. "Substantially homogenous" includes powders, fluids, blends, dispersions, colloids, suspensions and mixtures.

"3D printer" meaning includes discrete printers and/or toolhead accessories to manufacturing machinery which carry out an additive manufacturing sub-process within a larger process. A 3D printer is controlled by a motion controller 20 which interprets dedicated G-code (toolpath instructions) and drives various actuators of the 3D printer in accordance with the G-code.

"Deposition head" may include jet nozzles, spray nozzles, extrusion nozzles, conduit nozzles, and/or hybrid nozzles.

"Filament" generally may refer to the entire cross-sectional area of a (e.g., spooled) build material.

What is claimed is:

1. A method for building a green part with a deposition-based additive manufacturing system, the method comprising the steps of:
   depositing a first layer of the green part in a first winding direction along at least one first toolpath, the first layer including a polymer and a powdered sinterable metal, each first toolpath in the first layer being deposited in the first winding direction and producing a tendency to twist about a vertical axis; and
   depositing a second layer of the green part in a second winding direction opposite to the first winding direction and along at least one second toolpath, the second layer including the polymer and the powdered sinterable metal, each second toolpath in the second layer being deposited in the second winding direction,
   wherein depositing the second layer of the green part includes depositing the second layer of the green part in the second winding direction such that, when the polymer is removed from the first layer and the second layer permitting the first and second layers to relax, a directional stress in the second layer offsets a directional stress in the first layer offsetting the tendency to twist about the vertical axis.

2. The method of claim 1, further comprising debinding the polymer of the green part to form a shape-retaining brown part and sintering the shape-retaining brown part to densify the shape-retaining brown part.

3. The method of claim 2, further comprising neutralizing, during the sintering of the shape-retaining brown part, the directional stress in the first layer with the directional stress in the second layer as the shape-retaining brown part relaxes.

4. The method of claim 3, comprising depositing a ceramic powder release material onto the build plate before depositing the first layer of the green part.

5. The method of claim 1, comprising depositing a third layer of the green part in the first winding direction in a pattern that follows at least one third toolpath in the third layer of the part, the third layer being adjacent to the second layer.

6. The method of claim 5, wherein depositing the third layer in the pattern that follows the at least one third toolpath produces a directional stress in the third layer, producing a tendency to twist about the vertical axis and offsetting the directional stress in the second layer.

7. The method of claim 1, comprising depositing a fourth layer in the second winding direction in a pattern that follows at least one fourth toolpath in the fourth layer of the part, the fourth layer being adjacent to the third layer.

8. The method of claim 7, wherein depositing the fourth layer in the pattern that follows the at least one fourth toolpath produces a directional stress in the fourth layer, producing a tendency to twist about the vertical axis offsetting the directional stress in the third layer.

9. The method of claim 1, wherein depositing the first layer of the green part along the at least one first toolpath forms an outer perimeter of the first layer.

10. The method of claim 9, wherein depositing the second layer of the green part along the at least one second toolpath forms an outer perimeter of the second layer.

* * * * *